(12) United States Patent
Clark

(10) Patent No.: US 9,291,739 B2
(45) Date of Patent: *Mar. 22, 2016

(54) SYSTEMS AND METHODS FOR WELL POSITIONING USING A TRANSVERSE ROTATING MAGNETIC SOURCE

(75) Inventor: Brian Clark, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 709 days.

This patent is subject to a terminal disclaimer.

(21) Appl. No.: 13/128,667

(22) PCT Filed: Apr. 7, 2009

(86) PCT No.: PCT/US2009/039775
§ 371 (c)(1),
(2), (4) Date: Jul. 29, 2011

(87) PCT Pub. No.: WO2010/059263
PCT Pub. Date: May 27, 2010

(65) Prior Publication Data
US 2011/0282583 A1 Nov. 17, 2011

Related U.S. Application Data

(60) Provisional application No. 61/116,566, filed on Nov. 20, 2008.

(51) Int. Cl.
*G01V 1/40* (2006.01)
*G01V 3/18* (2006.01)
(Continued)

(52) U.S. Cl.
CPC ............ *G01V 3/26* (2013.01); *E21B 47/02216* (2013.01)

(58) Field of Classification Search
CPC ............................ E21B 47/02216; G01V 3/26
USPC ........ 702/6–9; 175/45; 174/45; 324/324, 326
See application file for complete search history.

(56) References Cited

U.S. PATENT DOCUMENTS 5,012,412 A * 4/1991 Helm ................................ 702/9
5,589,775 A 12/1996 Kuckes
(Continued)

FOREIGN PATENT DOCUMENTS

WO 03040762 A1 5/2003

OTHER PUBLICATIONS

Nekut, A. G. et al, "Rotating Magnet Ranging—a new drilling guidance technology", presented at the 8th One Day Conference on Horizontal Well Technology, Canadian Section SPE, Nov. 7, 2001, pp. 1-8.

*Primary Examiner* — Gregory J Toatley
*Assistant Examiner* — Eman Alkafawi
(74) *Attorney, Agent, or Firm* — Kimberly Ballew

(57) ABSTRACT

Systems and methods for well-drilling operations involving magnetic ranging with a rotating magnetic dipole are provided. In one embodiment, a system for determining a relative location of a magnetic dipole includes a three-axis magnetometer configured to obtain measurements of a time-dependent magnetic field caused by the magnetic source rotating about an axis and data processing circuitry configured to determine a transverse angle of rotation of the measurements such that one of two transverse components is in phase with one axial component when the transverse angle of rotation is used to transform the measurements. The data processing circuitry may determine a spatial relationship between the magnetic source and the three-axis magnetometer based at least in part on the transverse angle of rotation.

20 Claims, 24 Drawing Sheets

(51) Int. Cl.
*G01V 3/26* (2006.01)
*E21B 47/022* (2012.01)

(56) References Cited

U.S. PATENT DOCUMENTS

| | | |
|---|---|---|
| 6,347,282 B2 | 2/2002 | Estes et al. |
| 6,736,222 B2 | 5/2004 | Kuckes et al. |
| 7,209,093 B2 | 4/2007 | Brune et al. |
| 8,278,928 B2 * | 10/2012 | Bespalov ................... 324/326 |
| 2001/0041963 A1 | 11/2001 | Estes et al. |
| 2002/0008521 A1 * | 1/2002 | Clark et al. .................. 324/338 |
| 2005/0083063 A1 * | 4/2005 | Omeragic et al. ............ 324/338 |
| 2006/0131013 A1 * | 6/2006 | McElhinney ............ 166/250.01 |
| 2007/0126426 A1 * | 6/2007 | Clark et al. .................. 324/326 |
| 2007/0203651 A1 * | 8/2007 | Blanz et al. ...................... 702/6 |
| 2008/0000686 A1 * | 1/2008 | Kuckes et al. .................. 175/24 |
| 2008/0177475 A1 * | 7/2008 | McElhinney et al. ............ 702/6 |

* cited by examiner

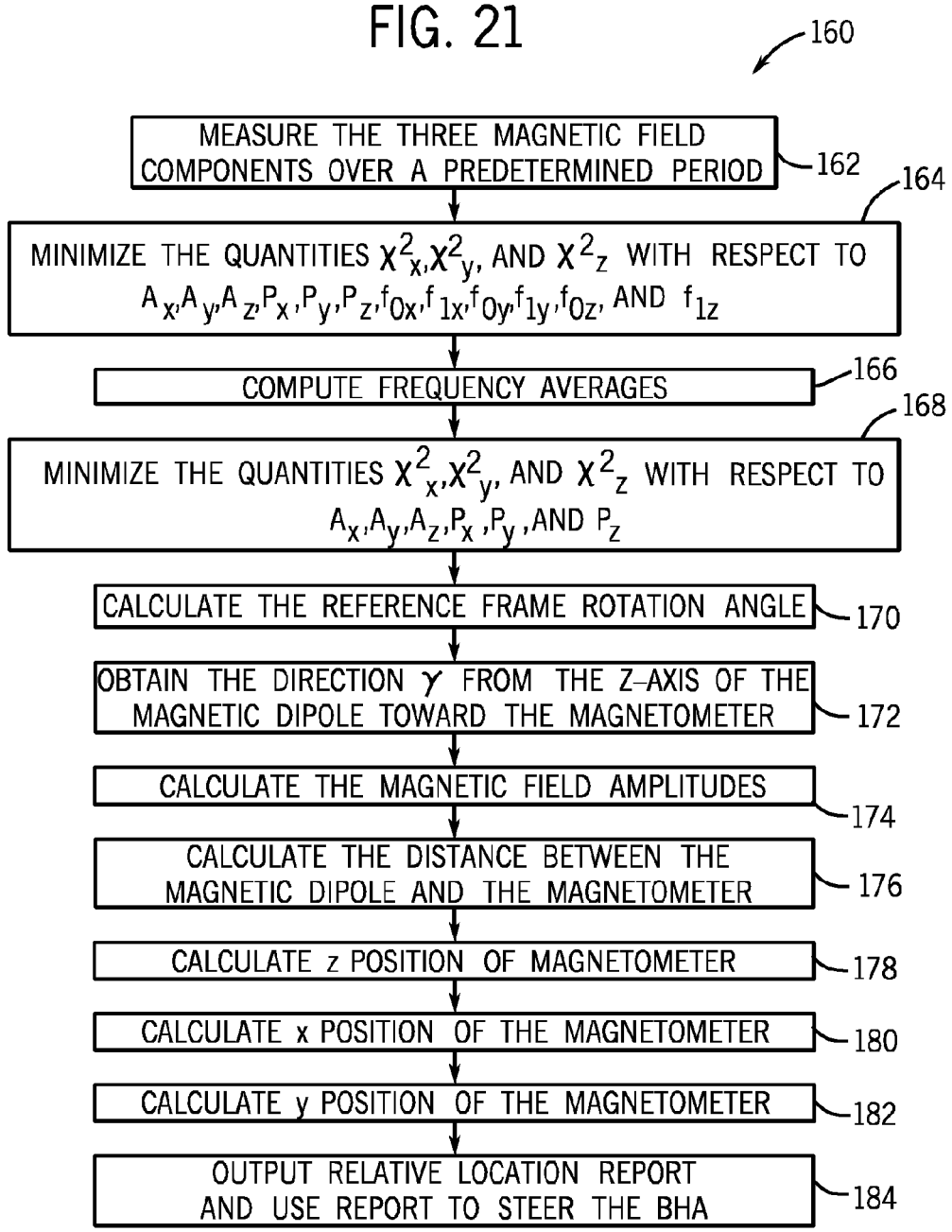

SYSTEMS AND METHODS FOR WELL POSITIONING USING A TRANSVERSE ROTATING MAGNETIC SOURCE

BACKGROUND

The present disclosure relates generally to well drilling operations and, more particularly, to well drilling operations involving magnetic ranging using a rotating magnetic source.

To access certain hydrocarbons in the earth, two or more wells or boreholes may be drilled with a certain spatial relationship with respect to one another; specifically, one borehole may be drilled such that it has a specific location relative to a previously drilled borehole. For example, heavy oil may be too viscous in its natural state to be produced from a conventional well, and, thus, an arrangement of cooperative wells and well features may be utilized to produce such oil. Indeed, to produce heavy oil, a variety of techniques may be employed, including, for example, Steam Assisted Gravity Drainage (SAGD), Cross Well Steam Assisted Gravity Drainage (X-SAGD), or Toe to Heel Air Injection (THAI). All such techniques may benefit by determining a borehole assembly (BHA) location relative to an existing well.

SAGD may generally involve two parallel wells separated by an approximately constant vertical separation distance (e.g., 4 to 6 m) and an approximately constant transverse horizontal separation distance (e.g., within 1 m) over a horizontal distance of roughly 500 m to 1500 m. The upper well in a SAGD well pair may be known as an "injector well." The injector well may inject superheated steam into a heavy oil zone formation, creating a steam chamber to heat the heavy oil contained therewithin. The lower well in a SAGD well pair may be known as a "producer well." When the heated heavy oil becomes less viscous, gravity may pull the oil into the producer well below, from which the oil may be extracted.

Conventional measurement while drilling (MWD) survey data may not provide sufficient accuracy to maintain a consistent separation distance between the injector well and the producer well. Indeed, the direction of a horizontal well may be measured and controlled to approximately +/−3°, and the inclination may be measured and controlled to approximately +/−1°, using conventional MWD sensors and good directional steering practices. However, such relatively small angles may produce large errors in the position of a long horizontal well. For example, a horizontal well with a 1000 meter length having a 3° drift may have a 52 meter lateral error at the toe of the well. If the same horizontal well has a 1° drift in inclination, the well may also have a 17 meter vertical error.

To drill one well, such as an injector well, with a certain spatial relationship with respect to an existing well, such as a producer well, conventional magnetic ranging techniques may be employed. However, determining a position of a BHA in the injector well relative to a magnetometer in the producer well may involve many time-consuming measurements using conventional magnetic ranging. For example, measurements may be taken at several distinct locations within one or the other well, and the magnetometer may be moved forward or backward a specified distance before taking each measurement. Additionally, such conventional techniques may necessitate that the two wells be essentially parallel, and may not provide a relative location until the BHA has drilled a distance at least equal to the inter-well separation distance.

SUMMARY

Certain aspects commensurate in scope with the originally claimed embodiments are set forth below. It should be understood that these aspects are presented merely to provide the reader with a brief summary of certain forms the disclosed embodiments might take and that these aspects are not intended to limit the scope of the invention. Indeed, the invention may encompass a variety of aspects that may not be set forth below.

The present disclosure relates to systems and methods for drilling a well involving magnetic ranging using a rotating magnetic source. In one embodiment, a system for determining a relative location of a magnetic dipole includes a three-axis magnetometer configured to obtain measurements of a time-dependent magnetic field caused by the magnetic source rotating about an axis and data processing circuitry configured to determine a transverse angle of rotation of the measurements such that one of two transverse components is in phase with one axial component when the transverse angle of rotation is used to transform the measurements. The data processing circuitry may determine a spatial relationship between the magnetic source and the three-axis magnetometer based at least in part on the transverse angle of rotation.

BRIEF DESCRIPTION OF THE DRAWINGS

Advantages of the invention may become apparent upon reading the following detailed description and upon reference to the drawings in which:

FIG. 21 is a flowchart describing a method of determining a relative location between a magnetometer and a magnetic dipole rotating at an increasing or decreasing frequency by transforming magnetic field measurements into a rotated reference frame, in accordance with an embodiment;

DETAILED DESCRIPTION OF SPECIFIC EMBODIMENTS

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Additionally, as used herein, the terms "up" and "down," "upper" and "lower," and other like terms indicating relative positions to a given point or element are utilized to more clearly describe some elements of the embodiments of the invention. Commonly, these terms relate to a reference point at the surface from which drilling operations are initiated as being the top point and the total depth of the well being the lowest point, whether or not the drilled well continues in a true downward direction.

Figure 1:
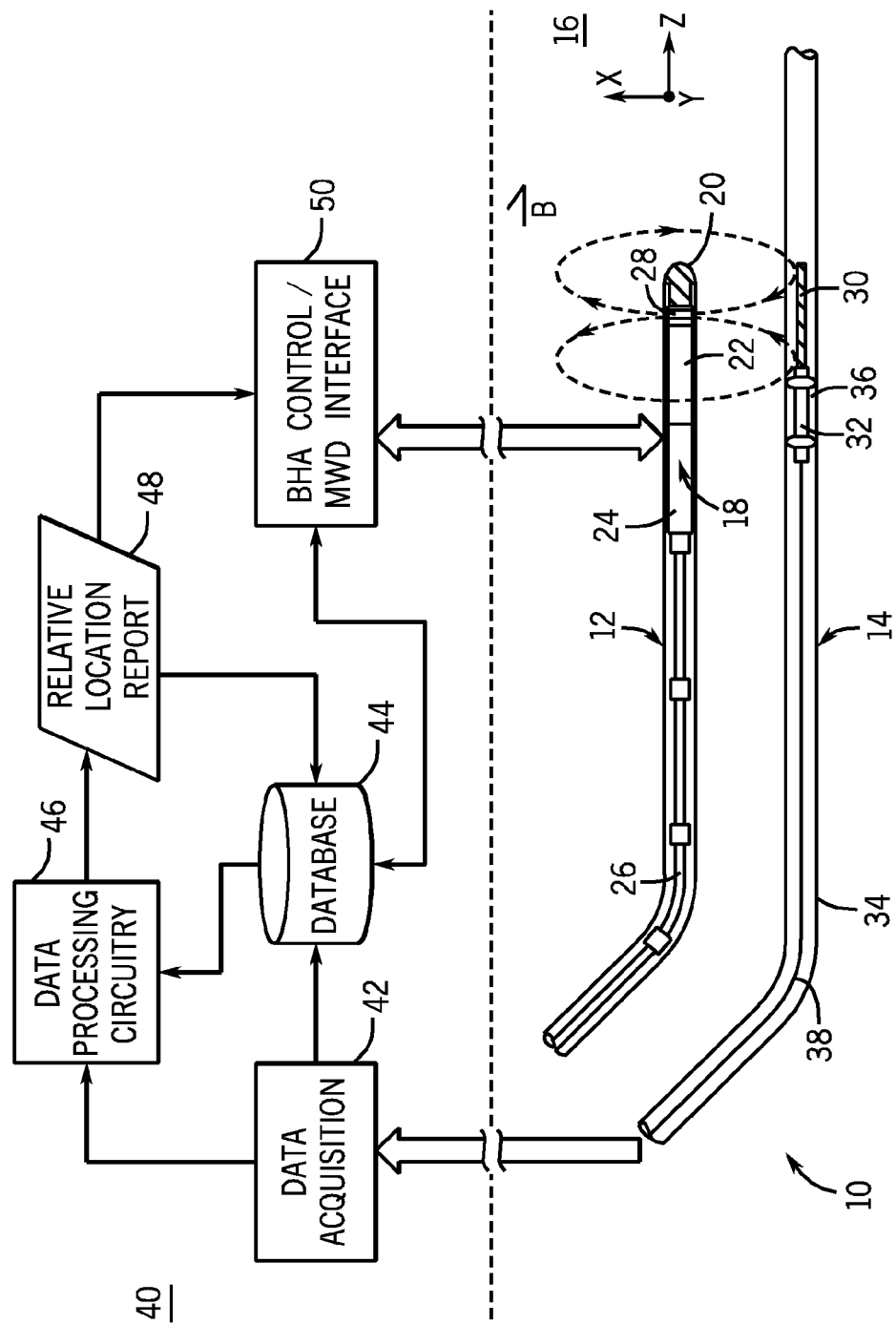
FIG. 1 is a schematic of a well-drilling operation involving magnetic ranging in accordance with an embodiment.

FIG. 1 illustrates a well drilling system 10 for drilling a new well such that the new well has a particular spatial relationship with a prior-drilled well. Particularly, FIG. 1 presents an example involving parallel Steam Assisted Gravity Drainage (SAGD) wells; however, the well drilling system 10 may be used to drill any new well such that the new well has a particular spatial relationship with respect to an existing, prior-drilled well. As illustrated in FIG. 1, a SAGD well pair may be formed when an injector well 12 is drilled approximately constant vertical separation distance (e.g., 4 to 6 m) and an approximately constant transverse horizontal separation distance (e.g., within 1 m) over a horizontal distance of roughly 500 m to 1500 m above a prior-drilled producer well 14 in a heavy oil zone formation 16. However, the well drilling operation 10 and the techniques disclosed herein may be employed to drill a new well having any desired spatial relationship to any existing well. For example, the well drilling operation 10 and the techniques disclosed herein may be employed to drill Cross Well Steam Assisted Gravity Drainage (X-SAGD) wells, Toe to Heel Air Injection (THAI) wells, and/or to avoid collisions with existing wells while drilling in a field having existing wells.

To drill the injector well 12, a borehole assembly (BHA) 18 may include, among other things, a drill bit 20, a steerable system 22 to set the direction of the drill bit 20, and/or one or more measurement while drilling (MWD) or logging while drilling (LWD) tools 24. Drill pipe 26 may provide drilling mud and/or communication to the BHA 18 from the surface. The steerable system 22 may be a rotary steerable system, such as PowerDrive, which may receive downlinked commands and drill ahead in a specified trajectory of direction and inclination. Alternatively, the steerable system 22 may be a mud motor with a bent sub; however, such an arrangement may be less efficient, as it may rely on manual orientations of the bent sub by a driller at the surface to control the direction and inclination of the drill bit 20.

The BHA 18 may further include a magnetic dipole 28 coupled such that the north-south axis of the magnetic dipole 28 is essentially perpendicular to the axis of the BHA 18. As the BHA 18 rotates, the magnetic dipole 28 may rotate accordingly, which may produce a time-dependent magnetic field, illustrated in FIG. 1 as a magnetic field $\vec{B}$. The magnetic dipole 28 may produce the time-dependent magnetic field $\vec{B}$ using a permanent magnet or one or more solenoids. If the magnetic dipole 28 is formed by one or more solenoids, the electric currents driving the solenoids may be direct current (DC), and the BHA 18 may rotate to produce the time-dependent magnetic field $\vec{B}$. Alternatively, the currents driving the solenoids may be alternating current (AC), and the BHA 18 may remain still to produce the time-dependent magnetic field $\vec{B}$. The direction and inclination of the first well may be known, as determined using inclinometer and/or data from the MWD tool 24. Because the north-south axis of the magnetic dipole 28 is essentially perpendicular to the axis of the BHA 18, a coordinate system (x,y,z) may be centered on the magnetic dipole 28, where the z-axis is aligned with the borehole axis, the x-axis points upwards, and the y-axis is horizontal.

A three-axis magnetometer 30 capable of measuring low-frequency AC magnetic fields may be deployed to measure the magnetic field $\vec{B}$ on a wireline tractor 32 inside the producer well 14, which may or may not be cased with magnetic or non-magnetic casing 34. The tractor 32 may also carry a three-axis inclinometer 36, which may enable determination of the gravity tool face (i.e., up, or the high side of the hole). The tractor 32 may move the magnetometer 30 along inside the producer well 14. However, rather than move the magnetometer 30 to take measurements at multiple points along the length of the producer well 14, the tractor 32 may move the magnetometer 30 only occasionally. For reasons discussed below, measurements of the magnetic field $\vec{B}$ over time, observed from a single location in the producer well 14, may provide sufficient information to determine a relative location between the magnetometer 30 in the producer well 14 and the magnetic dipole 28 in the BHA 18. As such, the three-axis magnetometer 30 may take readings of the magnetic field $\vec{B}$ over a predetermined time (e.g., approximately 1-2 seconds or one or more periods of rotation of the magnetic dipole 28), from which the relative location may be determined in accordance with techniques disclosed herein. The BHA 18 may typically rotate at approximately 60 to 180 RPM, while the rate of penetration through the formation 16 may be significantly slower, at approximately 50 to 200 feet per hour. As such, obtaining measurements of the magnetic field $\vec{B}$ from a single configuration may substantially increase the efficiency of magnetic ranging.

Measurements of the magnetic field $\vec{B}$ may be transmitted from the magnetometer 30 over a cable 38 to the surface 40 for processing. As such, the measurements may be received by data acquisition circuitry 42. The data acquisition circuitry 42 may represent a stand-alone, special-purpose data acquisition module associated with the magnetometer 30, or may represent an input device for a general processor-based system that may be employed for processing the measurements in accordance with the present techniques. A database 44 and data processing circuitry 46 may also represent components of a general processor-based system. Such a processor-based system may be a general-purpose computer, such as a personal computer, configured to run a variety of software, including software implementing all or part of the present technique. Alternatively, the processor-based system may include, among other things, a mainframe computer, a distributed computing system, or an application-specific computer or workstation configured to implement all or part of the present technique based on specialized software and/or hardware provided as part of the system. Further, the processor-based system may include either a single processor or a plurality of processors to facilitate implementation of the presently disclosed functionality.

In general, the processor-based system that may encompass all or part of the data acquisition circuitry 42, database 44, and/or data processing circuitry 46 may include a microcontroller or microprocessor, such as a central processing unit (CPU), which may execute various routines and processing functions. For example, the microprocessor may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the microprocessor may process data provided as inputs for various routines or software programs, such as data provided as part of the present techniques in computer-based implementations.

Such data associated with the present techniques may be stored in, or provided by, the memory or mass storage device of the processor-based system that may encompass all or part of the data acquisition circuitry 42, database 44, and/or data processing circuitry 46. Alternatively, such data may be provided to the microprocessor of the processor-based system via one or more input devices. In one embodiment, the data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the processor-based system may exchange data and communicate with other networked electronic systems, whether proximate to or remote from the system. The network may include various components that facilitate communication, including switches, routers, servers or other computers, network adapters, communications cables, and so forth.

Processing in accordance with techniques of the present disclosure may begin when the measurements of the magnetic field $\vec{B}$, obtained by the magnetometer 30, are received at the surface 40 by the data acquisition circuitry 42. As noted above, the magnetometer 30 may obtain three-axis measurements of the magnetic field $\vec{B}$; though the three axes of the magnetometer 30 may not generally be aligned with the (x,y,z) coordinate system of the magnetic dipole 28, the data acquisition circuitry 42 or the data processing circuitry 46 may rotate the three-axis magnetometer 30 readings into the (x,y,z) coordinate system using known survey information for the two wells and a reading from the inclinometer 36. Henceforth, the three magnetic field components may be understood to have been transformed into the (x,y,z) coordinate system associated with the BHA 18 of the injector well 12.

After receiving the measurements of the magnetic field $\vec{B}$, the data acquisition circuitry 42 may store the measurements in the database 44 or transmit the measurements to the data processing circuitry 46. In accordance with one or more stored routines, the data processing circuitry 46 may employ the measurements of the magnetic field $\vec{B}$, in conjunction with MWD and/or LWD survey data, to ascertain the relative location of the magnetometer 30 to the rotating magnetic dipole 28 in the BHA 18. The data processing circuitry 46 may thereafter output a relative location report 48, which may be stored in the database 44 or transmitted to a BHA control/MWD interface 50. The relative location report 48 may indicate the location of the magnetometer 30 relative to the magnetic dipole 28 of the BHA 18 in the (x,y,z) coordinate system. Additionally or alternatively, the relative location report 48 may be provided to an operator via one or more output devices, such as an electronic display and/or a printer.

The BHA control/MWD interface 50 may communicate with the BHA 18 using E-Pulse™-based electric pulse telemetry, mud pulse telemetry, or any other telemetry system communication downlink. Through the communication downlink, the BHA control/MWD interface 50 may control the BHA 18, as well as receive data obtained by the MWD and/or LWD tool 24; such received data may be stored in the database 44 for use by the data processing circuitry 46. In the presently illustrated embodiment, the BHA control/MWD interface 50 may automatically steer the drill bit 20 based on the relative location report 48. Additionally or alternatively, an operator in control of the BHA control/MWD interface 50 may steer the drill bit 20 based on the printed or electronically displayed relative location report 48.

Figure 2:
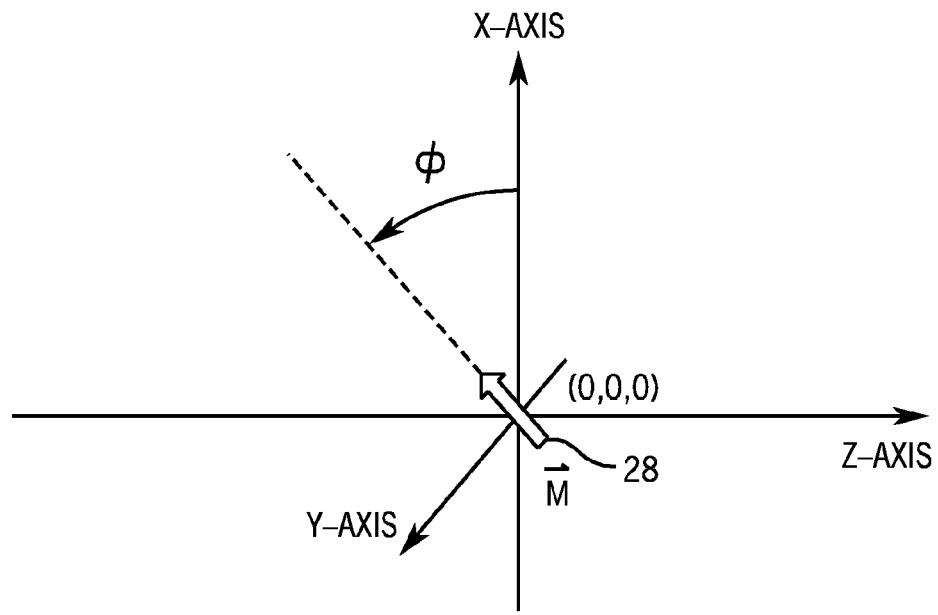
FIG. 2 is a schematic illustrating geometry associated with a rotating magnetic dipole in accordance with an embodiment.
Figure 3:
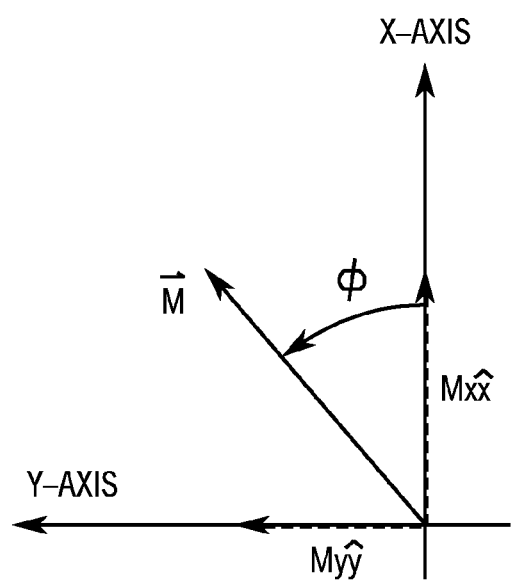
FIG. 3 is a schematic further illustrating the geometry described by FIG. 2.
Figure 4:
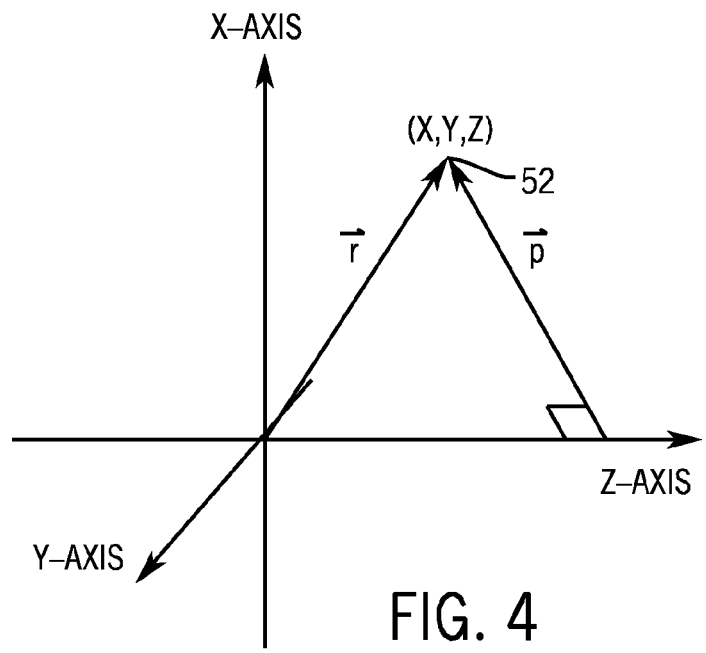
FIG. 4 is a schematic illustrating a spatial relationship between two vectors to an observation point in accordance with an embodiment.
Figure 5:
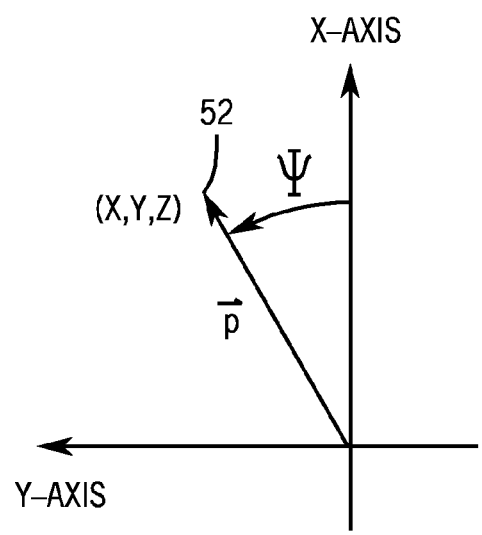
FIG. 5 is a schematic illustrating geometry associated with a transverse vector to the observation point of FIG. 4.

FIGS. 2-7 generally illustrate the geometrical and magnetic relationships between the rotating magnetic dipole 28 in the BHA 18 and the magnetometer 30. Particularly, FIGS. 2 and 3 illustrate the disposition of the magnetic dipole 28 in the (x,y,z) coordinate system and the resultant magnetic moments; FIGS. 4 and 5 illustrate geometrical relationships between vectors to an observation point, from which the magnetic field $\vec{B}$ caused by the magnetic dipole 28 may be measured; and FIGS. 6A-C and 7A-C respectively illustrate the components of the magnetic field $\vec{B}$ due to the x and y components of the magnetic dipole as the magnetic dipole rotates.

Turning to FIG. 2, the magnetic dipole 28 can be modeled as a magnetic dipole $\vec{M}$ located in the BHA 18. A coordinate system (x,y,z) may be understood to attach to the BHA 18, such that the z-direction is along the axis of the BHA 18 which is generally horizontal, the x direction is generally up, and the y-direction is generally horizontal. Accordingly, in FIG. 2, the magnetic dipole 28 (illustrated as a magnetic dipole $\vec{M}$) is located at the origin of this coordinate system (x,y,z)=(0,0,0). The magnetic dipole $\vec{M}$ is transverse to the z-axis and makes an angle $\phi$ with respect to the x-axis. Note that $\phi$ is a function of time, which will be included later in the analysis. The BHA 18 may typically rotate at approximately 60 to 180 RPM, while the rate of penetration through the formation 16 may be significantly slower, at approximately 50 to 200 feet per hour. As such, the position of the BHA 18 may be assumed to be constant during the time of the measurement, such that time dependence is only in $\phi$. As shown in FIG. 3, the magnetic dipole $\vec{M}$ can be written as the sum of two components, $$\vec{M} = M_x x + M_y y \qquad (1),$$

where $M_x = M \cos \phi$ and $M_y = M \sin \phi$.

FIGS. 4 and 5 describe relationships between vectors to an observation point 52, from which the magnetometer 30 may take readings of the magnetic field $\vec{B}$ arising from the magnetic dipole 28 (illustrated in FIGS. 2 and 3 as magnetic dipole $\vec{M}$). Particularly, FIG. 4 illustrates a vector $\vec{r}$, located at an observation point (x,y,z) (x, y, z) relative to the magnetic dipole $\vec{M}$ at the origin, and a corresponding transverse vector $\vec{\rho}$. Notably, FIG. 4 provides the relationship between $\vec{r}$ and $\vec{\rho}$ in three-dimensional space. Similarly, FIG. 5 illustrates the geometry of transverse vector $\vec{\rho}$ in the x-y plane; the transverse vector $\vec{\rho}$ may be understood to rotate an angle $\psi$ from the x-axis toward the y-axis. The geometry illustrated by FIGS. 4 and 5 may be described using the following mathematical relationships. As noted above, the magnetic field due to the magnetic dipole $\vec{M}$ can be written as the sum of the magnetic fields due to the two components $M_x$ and $M_y$. The static magnetic field at an observation point $\vec{r}$ due to a magnetic dipole $\vec{m}$ may be given by $$\vec{B}(\vec{r}) = \frac{\mu_0}{4\pi r^3} [3\hat{r}(\hat{r}\vec{m}) - \vec{m}], \qquad (2)$$

where $\mu_0 = 4\pi \cdot 10^{-7}$ Henry/m, $\vec{r} = xx + yy + z\hat{z}$, and x, y, and $\hat{z}$ are unit vectors in the x, y, and z directions. The magnitude of $\vec{r}$ is thus $r = \sqrt{x^2 + y^2 + z^2}$ and the unit vector pointing in the $\vec{r}$ direction is $\hat{r} = \vec{r}/r$. In addition, the transverse vector $\vec{\rho}$ may be defined as $\vec{\rho} = xx + yy$, where $\rho = \sqrt{x^2 + y^2}$ and $\hat{\rho} = \vec{\rho}/\rho$.

Figure 6A:
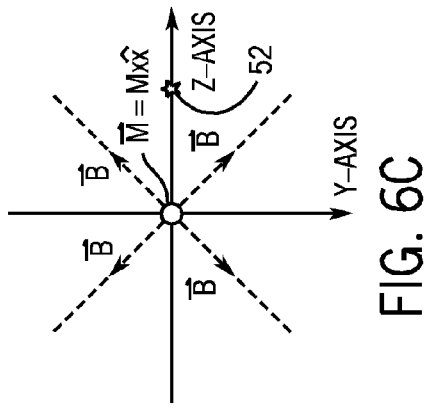
FIGS. 6A-C illustrate components of a magnetic field resulting from a magnetic dipole rotating about the z axis in the x-y plane, at the instant it is pointing in the +x direction, in accordance with an embodiment.
Figure 7A:
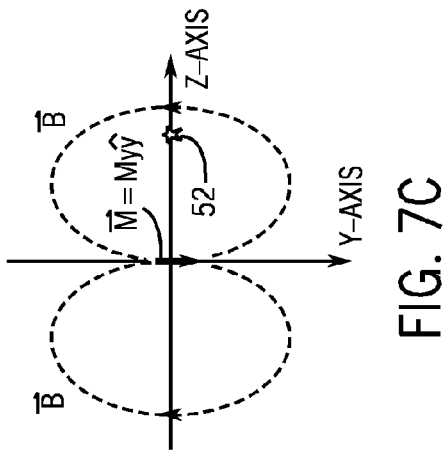
FIGS. 7A-C illustrate components of a magnetic field resulting from a magnetic dipole rotating about the z-axis in the x-y plane, at the instant it is pointing in the +y direction, in accordance with an embodiment.
Figure 6B:
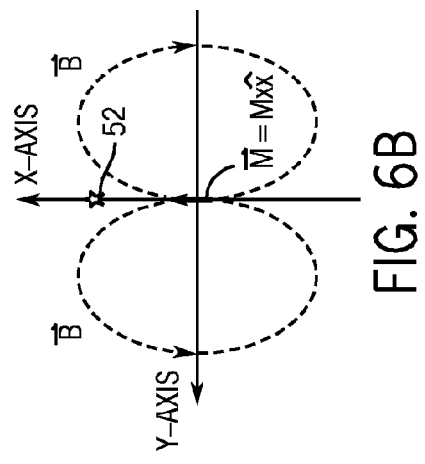
Figure 7B:
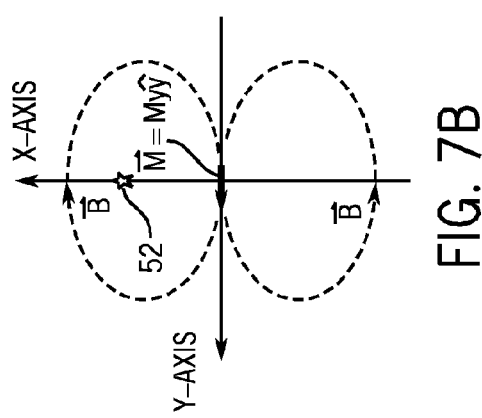
Figure 6C:
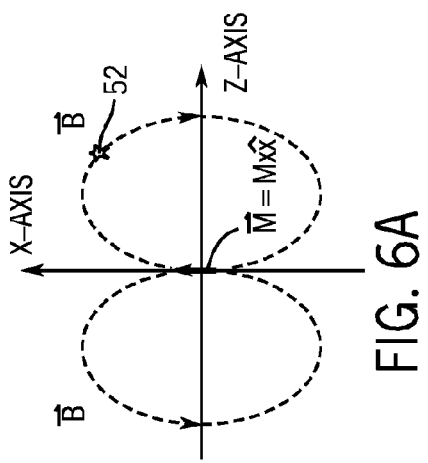
Figure 7C:
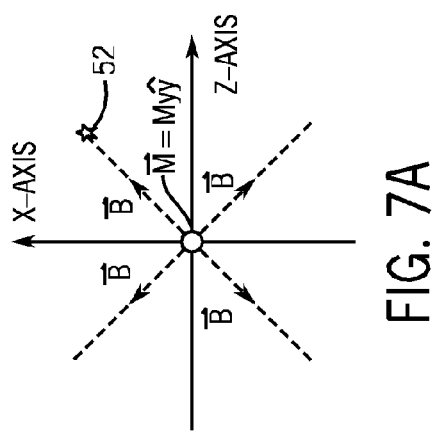

FIGS. 6A-C and 7A-C respectively illustrate the components of the magnetic field $\vec{B}$ due to the x and y components of the magnetic dipole $\vec{M}$ as the magnetic dipole $\vec{M}$ rotates. As discussed above with reference to FIG. 1, the magnetic dipole 28 or other magnetic source (the magnetic dipole $\vec{M}$) may rotate with the BHA 18, and thus may rotate around the z-axis in the x-y plane. As such, the magnetic field $\vec{B}$, as measured from the observation point 52, may vary with the rotation of the magnetic dipole $\vec{M}$ over time. Particularly, FIGS. 6A-C illustrate the magnetic field $\vec{B}$ at a point in time when the magnetic dipole $\vec{M}$ has rotated into alignment with the x-axis, and FIGS. 7A-C illustrate the magnetic field $\vec{B}$ at a point in time when the magnetic dipole $\vec{M}$ has rotated into alignment with the y-axis. In FIGS. 6A-C and 7A-C, the observation point 52, from which the magnetic field $\vec{B}$ may be measured by the magnetometer 30, is located in the upper right quadrant of the x-z plane.

Referring first to FIGS. 6A-C, because the magnetic dipole $\vec{M}$ has rotated into alignment with the x-axis, the magnetic field $\vec{B}$ due to the magnetic dipole $\vec{M}$ may be entirely due to the dipole component $M_x$. The magnetic field due to the dipole component $M_x$ may be calculated as follows. Substituting $\vec{m} = M_x x = M \cos \phi x$ into Equation (2) produces the results:

$$\vec{B}_x(\vec{r}) = B_{xx}(\vec{r})x + B_{xy}(\vec{r})y + B_{xz}(\vec{r})\hat{z}; \qquad (3a)$$

$$B_{xx}(\vec{r}) = \frac{3\mu_0 M \cos\phi}{4\pi r^5}(x^2 - r^2/3); \qquad (3b)$$

$$B_{xy}(\vec{r}) = \frac{3\mu_0 M \cos\phi}{4\pi r^5}(xy); \text{ and} \qquad (3c)$$

$$B_{xz}(\vec{r}) = \frac{3\mu_0 M \cos\phi}{4\pi r^5}(xz). \qquad (3d)$$

The first subscript (x) in Equations (3a) to (3d) refers to the magnetic dipole component, while the second subscript (x, y, or z) refers to the magnetic field component. From Equations (3a)-(3d), the magnetic field $\vec{B}$ due to the dipole component $M_x$ may be shown from three perspective views in FIGS. 6A-C; in all FIGS. 6A-C, the magnetic dipole $\vec{M}$ is aligned with the x-axis. FIG. 6A illustrates the magnetic field $\vec{B}$ due to the dipole component $M_x$ in the x-z plane; FIG. 6B illustrates the magnetic field $\vec{B}$ due to the dipole component $M_x$ in the x-y plane; and FIG. 6C illustrates the magnetic field $\vec{B}$ due to the dipole component $M_x$ in the y-z plane. As shown in FIG. 6A, the observation point 52 is located in the upper right quadrant of the x-z plane, and $B_{xx}$ and $B_{xz}$ are clearly nonzero as measured from the observation point 52. In fact, as described by Equations (3b) and (3d) above, the amplitudes of $B_{xx}$ and $B_{xz}$ are maxima at the observation point 52 when the magnetic dipole $\vec{M}$ has rotated into alignment with the x-axis and $\phi$ is zero. In contrast, as shown in FIG. 6B, $B_{xy}$ is zero as measured at the observation point 52. This is also apparent from Equation (3c) with y=0. These conclusions are valid for any quadrant in the x-z plane. Thus, when the observation point 52 is in the x-z plane and the magnetic dipole $\vec{M}$ has rotated into alignment with the x-axis, the amplitudes of $B_{xx}$ and $B_{xz}$ maxima, while $B_{xy}$ is zero.

Referring next to FIGS. 7A-C, because the magnetic dipole $\vec{M}$ has rotated into alignment with the y-axis, the magnetic field $\vec{B}$ due to the magnetic dipole $\vec{M}$ may be entirely due to the dipole component $M_y$. The magnetic field due to the dipole component $M_y$ may be calculated as follows. Substituting $\vec{m}=M_y y=M \sin \phi y$ into Equation (2) produces the results:

$$\vec{B}_y(\vec{r}) = B_{yx}(\vec{r})x + B_{yy}(\vec{r})y + B_{yz}(\vec{r})\hat{z}; \quad (4a)$$

$$B_{yx}(\vec{r}) = \frac{3\mu_0 M \sin\phi}{4\pi r^5}(xy); \quad (4b)$$

$$B_{yy}(\vec{r}) = \frac{3\mu_0 M \sin\phi}{4\pi r^5}(y^2 - r^2/3); \text{ and} \quad (4c)$$

$$B_{yz}(\vec{r}) = \frac{3\mu_0 M \sin\phi}{4\pi r^5}(yz). \quad (4d)$$

The first subscript (y) in Equations (4a)-(4d) refers to the magnetic dipole component, while the second subscript (x, y, or z) refers to the magnetic field component. From Equations (4a)-(4d3a)-(3d), the magnetic field $\vec{B}$ due to the dipole component $M_y$ may be shown from three perspective views in FIGS. 7A-C; in all FIGS. 7A-C, the magnetic dipole $\vec{M}$ is aligned with the y-axis. FIG. 7A illustrates the magnetic field $\vec{B}$ due to the dipole component $M_y$ in the x-z plane; FIG. 7B illustrates the magnetic field $\vec{B}$ due to the dipole component $M_y$ in the x-y plane; and FIG. 7C illustrates the magnetic field $\vec{B}$ due to the dipole component $M_y$ in the y-z plane. As shown in FIGS. 7B and 7C, $B_{yx}$ and $B_{yz}$ are clearly zero as measured from the observation point 52. As described by Equations (4b)-(4d) above, $B_{yx}$ and $B_{yz}$ are zero when the magnetic dipole $\vec{M}$ has rotated into alignment with the y-axis and $\phi$ is $\pi/2$. This may also be seen from Equations (4b) and (4d) with y=0. When the magnetic dipole $\vec{M}$ is in the same location, the amplitude of $B_{yy}$ reaches a maximum, as measured from the observation point 52. Thus, when the observation point 52 is in the x-z plane and the magnetic dipole $\vec{M}$ has rotated into alignment with the y-axis, $B_{yy}$ reaches a maximum, while $B_{yx}$ and $B_{yz}$ are zero.

The total magnetic field for any angle $\phi$ of the magnetic dipole $\vec{M}$ may be given by adding the magnetic fields from each magnetic dipole component:

$$\vec{B}(\vec{r}) = B_x(\vec{r})x + B_y(\vec{r})y + B_z(\vec{r})\hat{z} = \vec{B}_x(\vec{r}) + \vec{B}_y(\vec{r}); \quad (5a)$$

$$B_x(\vec{r}) = \frac{3\mu_0 M}{4\pi r^5}[(x^2 - r^2/3)\cos\phi + (xy)\sin\phi]; \quad (5b)$$

$$B_y(\vec{r}) = \frac{3\mu_0 M}{4\pi r^5}[(xy)\cos\phi + (y^2 - r^2/3)\sin\phi]; \text{ and} \quad (5c)$$

$$B_z(\vec{r}) = \frac{3\mu_0 M}{4\pi r^5}[(xz)\cos\phi + (yz)\sin\phi]. \quad (5d)$$

For the situations shown in FIGS. 6A-C and 7A-C, the position of the observation point 52 relative to the magnetometer 30 can be deduced provided one knows when the magnetic dipole $\vec{M}$ is aligned with the x-axis and when it is aligned with the y-axis. As the magnetic dipole rotates about the z-axis, the magnetic field is measured at the observation point 52. Referring to FIGS. 6A-C, the amplitudes of the magnetic field components $|B_x(\vec{r})|$ and $|B_z(\vec{r})|$ achieve their maximum amplitudes when $\phi=0$, i.e. when the magnetic dipole $\vec{M}$ is aligned with the x-axis. At the same instant $B_y(\vec{r})$ is zero. Referring to FIGS. 7A-C, both magnetic field components $B_x(\vec{r})$ and $B_z(\vec{r})$ are zero when $\phi=\pi/2$, i.e. when the magnetic dipole $\vec{M}$ is aligned with the y-axis. At the same instant, $|B_y(\vec{r})|$ achieves its maximum value. Note that $B_x(\vec{r})$ and $B_z(\vec{r})$ are in-phase since they achieve their maximum and minimum amplitudes at the same times. Hence, by measuring the magnetic field components as the magnetic dipole $\vec{M}$ rotates, and by observing when the amplitudes of field components are maxima and minima, one can determine the two instants when $\phi=0$ and $\phi=\pi/2$.

Furthermore, once these two instants when $\phi=0$ and $\phi=\pi/2$ are determined, the magnetic field components can be used to deduce the position of the observation point 52. When $\phi=0$, the nonzero magnetic field components are $$B_x(\vec{r}) = \frac{3\mu_0 M}{4\pi r^5}[x^2 - r^2/3] \text{ and } B_z(\vec{r}) = \frac{3\mu_0 M}{4\pi r^5}[xz],$$

while the nonzero magnetic field component for $\phi=\pi/2$ is $$B_y(\vec{r}) = \frac{3\mu_0 M}{4\pi r^5}[r^2/3].$$

Once these three magnetic field components are measured, these equations can be solved for x and z, given that the value for M is known. As y=0 was initially assumed, the problem is over determined, i.e. only two measurements are needed to obtain the two unknown quantities, x and z.

Figure 8:
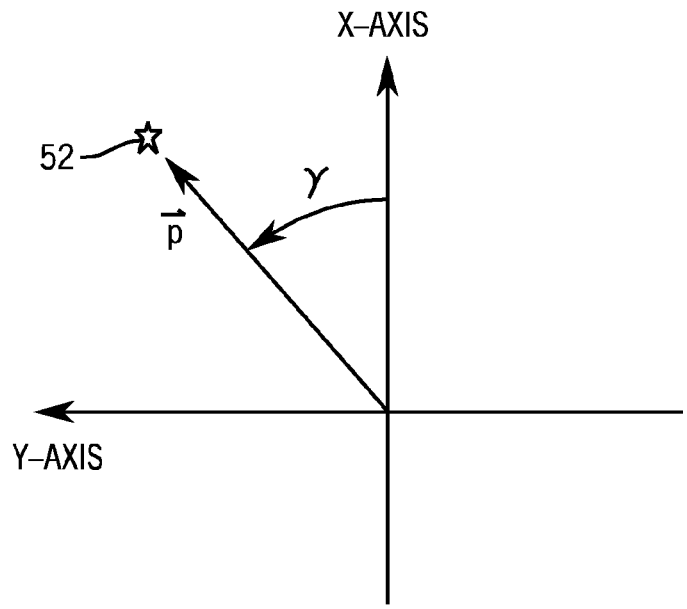
FIG. 8 is a schematic illustrating geometry associated with a transverse vector to an observation point where a magnetic field associated with a rotating magnetic dipole is measured, in accordance with an embodiment.
Figure 9:
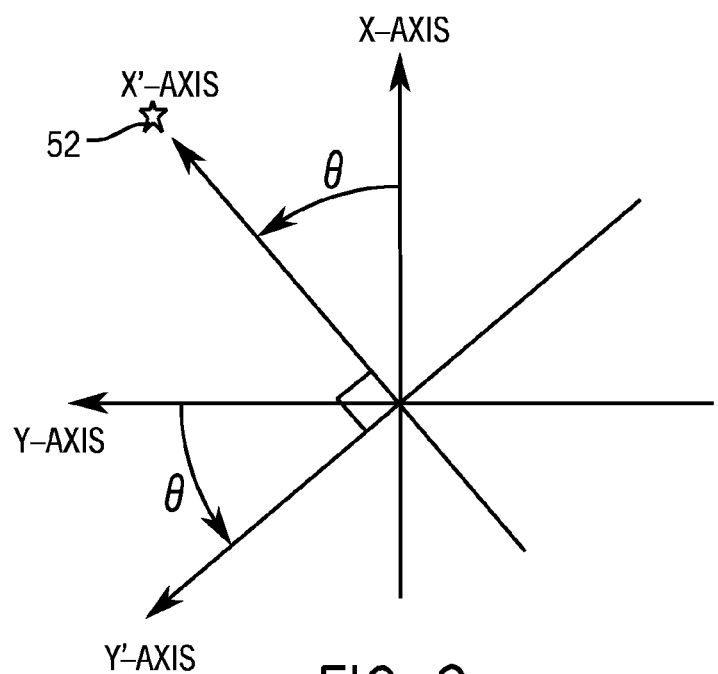
FIG. 9 is a schematic illustrating geometry associated with a rotated frame of reference for magnetic field measurements taken from an observation point, in accordance with an embodiment.

In the general case, the observation point may not be in the x-z plane and will have a nonzero value for y. Thus x, y and z are three unknown quantities and they must be determined from at least three measurements. From the previous paragraph, the three measured magnetic field components provide is sufficient information to determine these three unknown quantities. For any value of y, there is a plane that includes the z-axis and the observation point 52. Referring to FIGS. 8 and 9, this plane may be denoted by a primed coordinate system (x',y',z) where the x'-axis and the z-axis define the plane containing the observation point 52, and where the y'-axis is orthogonal to the plane. The x' and y' axes are obtained by rotation of the x and y axes by an angle θ about the z-axis. Since y'=0 in the rotated coordinate system, the situation in the rotated coordinate system is similar to that illustrated in FIGS. 6A-C and 7A-C, except that x is replaced by x' and y is replaced by y' in these figures.

Figure 10:
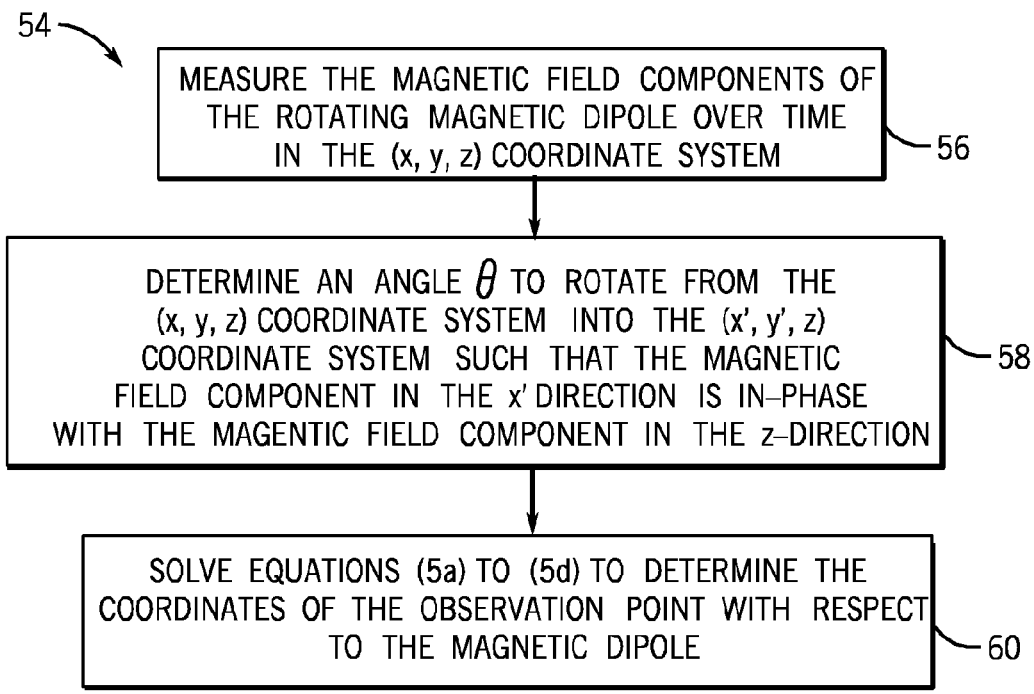
FIG. 10 is a flowchart describing a method of determining a relative location between a rotating magnetic dipole and a magnetometer, in accordance with an embodiment.

FIG. 10 is a flowchart 54 that sets forth a general method, based on the relationships illustrated in Equations (5a) to (5d) and in FIGS. 6A-C, 7A-C, 8 and 9 above, for determining the relative location of the observation point 52 to the origin. As noted above, the observation point 52 represents the location of the magnetometer 30, while the origin represents the location of the magnetic dipole 28. Equations (5a) to (5d) may be employed to determine the location of the observation point 52 with respect to the origin. Accordingly, the present disclosure provides techniques for processing the measurements of the magnetic field $\vec{B}$ obtained by the magnetometer 30. The flowchart 54 of FIG. 10 generally describes how such techniques may be used to determine the relative location of the magnetometer 30 to the magnetic dipole 28.

In a first step 56, the magnetometer 30 may take a series of measurements of the magnetic field $\vec{B}$ over a predetermined period of time (e.g., 1-2 seconds or one or more periods of rotation of the magnetic dipole 28). If the magnetometer 30 in the producer well 14 is not completely aligned with the (x,y,z) coordinate system of the magnetic dipole 28 in the injector well 12, the raw measurements from the magnetometer 30 may be transformed into the (x,y,z) coordinate system using known survey information for the two wells and a reading from the inclinometer 36.

In step 58, the data processing circuitry 46 may receive the measurements of the magnetic field $\vec{B}$ in the (x,y,z) coordinate system over the predetermined period of time. To take advantage of Equations (5a) to (5d), the data processing circuitry 46 may rotate the magnetic field measurements by an angle θ from the (x,y,z) coordinate system into the (x',y',z) coordinate system. The angle of rotation θ is determined by requiring the magnetic component in the x' direction be in-phase with the magnetic field component in the z direction. Equivalently, the angle of rotation θ is chosen such that the maxima and minima of the magnetic component in the x' direction and the z direction occur at the same instants. It should be appreciated that a variety of techniques may be employed to determine a proper angle of rotation of the reference frame, many of which are described in greater detail below.

In step 60, the relative location of the magnetometer 30 to the magnetic dipole 28 may be determined from the transformed measurements of the magnetic field $\vec{B}$ in the rotated frame of reference. Particularly, as will be described in greater detail below, the data processing circuitry 38 may determine the relative location based on the angle of rotation of the frame of reference and the amplitudes of the magnetic field $\vec{B}$ in the rotated frame of reference.

The rotation angle θ may be determined by measuring the three components of the magnetic field at the observation point 52 as a function of time. Since the magnetic dipole $\vec{M}$ is rotating, there will be instances where it is aligned with the x'-axis and times when it is aligned with the y'-axis. These instances may be determined by imposing conditions on the magnetic field components. For example, when the magnetic field component in the x' direction is in-phase with the magnetic field component in the z direction, the situation is analogous to FIGS. 6A-C. Here, in-phase means that the maximum amplitudes of the two field components occur at the same time, or that the minimum amplitudes of the two field components occur at the same time.

Figure 11:
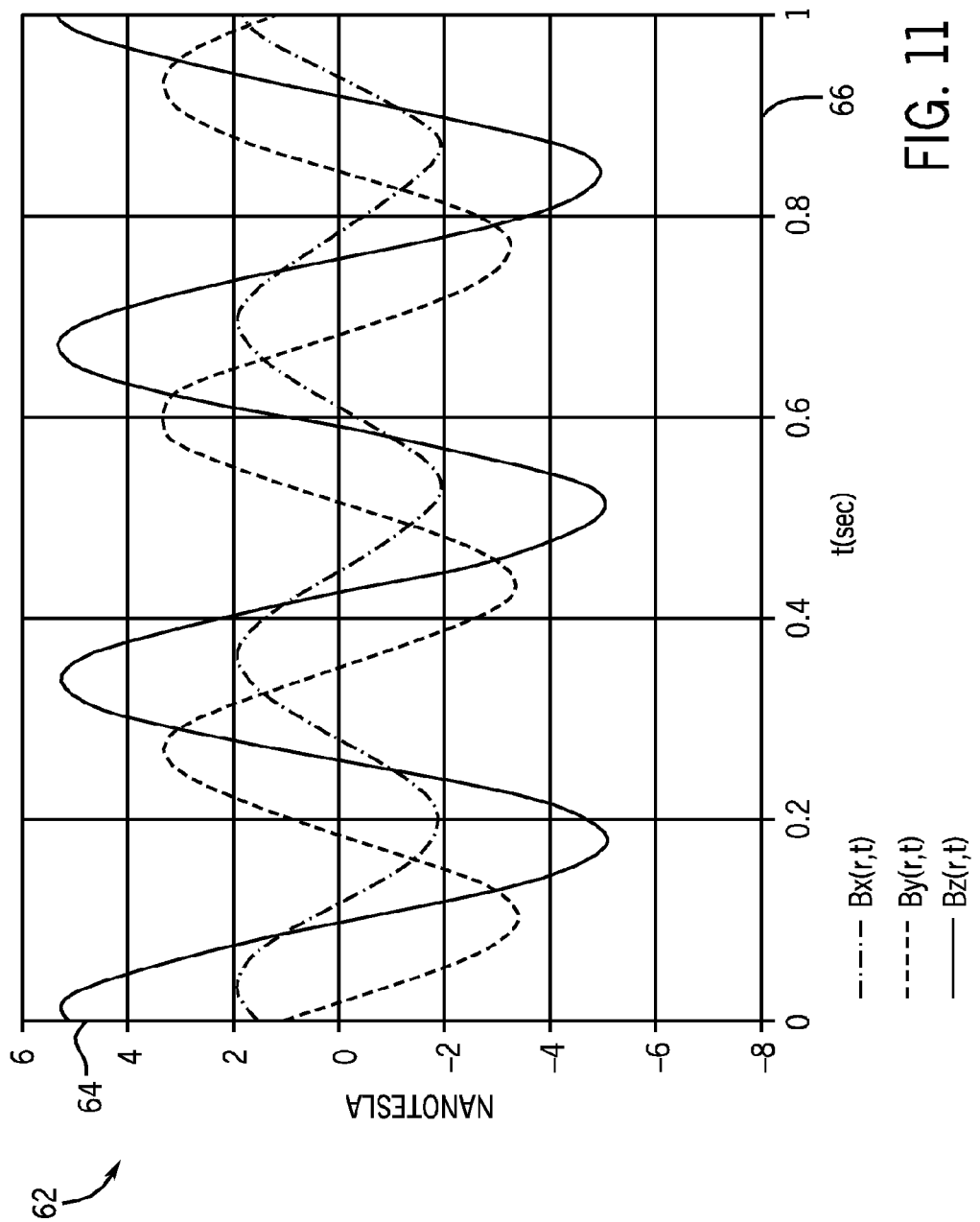
FIG. 11 is a plot simulating three-axis measurements of a magnetic dipole rotating at a constant frequency, in accordance with an embodiment.
Figure 12:
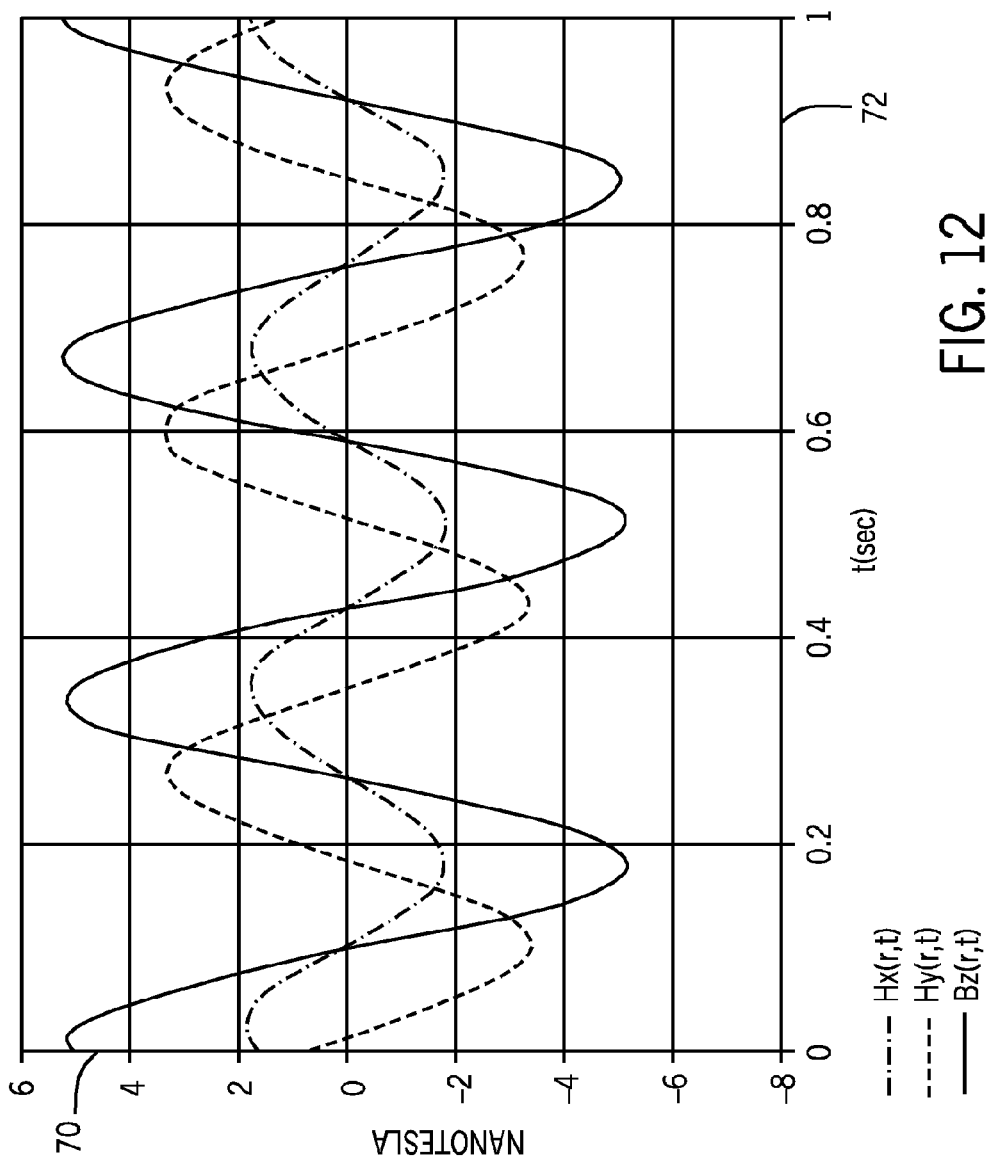
FIG. 12 is a plot in which the simulated measurements of FIG. 11 have been transformed into an a rotated frame of reference, in accordance with an embodiment.

FIGS. 11-12 illustrate an example for performing the general algorithm of FIG. 10 in an exemplary case when the magnetic dipole 28 rotates at a constant frequency. The following analysis from Equations (5)-(13) may provide a framework for understanding FIGS. 11-12, which are discussed in greater detail below Equations (5b), (5c), and (5d) can be recast in forms that explicitly display their phases. First, an angle α may be defined such that:

$$\cos\alpha = \frac{x^2 - r^3/3}{\sqrt{x^2 y^2 + (x^2 - r^2/3)^2}}; \tag{6a}$$

$$\sin\alpha = \frac{xy}{\sqrt{x^2 y^2 + (x^2 - r^2/3)^2}}; \text{ and} \tag{6b}$$

$$\tan\alpha = \frac{xy}{x^2 - r^2/3}. \tag{6c}$$

Equation (5b) can be rewritten as:

$$B_x(\vec{r}, t) = \frac{3\mu_0 M}{4\pi r^5} \sqrt{x^2 y^2 + (x^2 - r^2/3)^2} \ [\cos\alpha\cos\phi + \sin\alpha\sin\phi], \tag{7a}$$

or $$B_x(\vec{r}, t) = \frac{3\mu_0 M}{4\pi r^5} \sqrt{x^2 y^2 + (x^2 - r^2/3)^2} \ \cos(\phi - \alpha). \tag{7b}$$

An angle β may be defined such that:

$$\cos\beta = \frac{xy}{\sqrt{x^2 y^2 + (y^2 - r^2/3)^2}}; \tag{8a}$$

$$\sin\beta = \frac{y^2 - r^2/3}{\sqrt{x^2 y^2 + (y^2 - r^2/3)^2}}; \tag{8b}$$

and $$\tan\beta = \frac{y^2 - r^2/3}{xy}. \tag{8c}$$

Equation (5c) can be rewritten as:

$$B_y(\vec{r}, t) = \frac{3\mu_0 M}{4\pi r^5} \sqrt{x^2 y^2 + (y^2 - r^2/3)^2} \ \cos(\phi - \beta). \tag{9}$$

An angle γ may be defined such that:

$$\cos\gamma = \frac{x}{\sqrt{x^2 + y^2}}; \tag{10a}$$

$$\sin\gamma = \frac{y}{\sqrt{x^2 + y^2}}; \tag{10b}$$

and $$\tan\gamma = \frac{y}{x}. \tag{10c}$$

Equation (5d) can be rewritten as:

$$B_z(\vec{r}, t) = \frac{3\mu_0 M}{4\pi r^5} z\sqrt{x^2+y^2}\cos(\phi - \gamma). \quad (11)$$

In summary, the three magnetic field components are:

$$B_x(\vec{r}, t) = B_{ox}(\vec{r})\cos(\phi - \alpha), \quad (12a)$$
$$\text{where } B_{ox}(\vec{r}) = \frac{3\mu_0 M}{4\pi r^5}\sqrt{x^2y^2 + (x^2 - r^2/3)^2};$$

$$B_y(\vec{r}, t) = B_{oy}(\vec{r})\cos(\phi - \beta), \quad (12b)$$
$$\text{where } B_{oy}(\vec{r}) = \frac{3\mu_0 M}{4\pi r^5}\sqrt{x^2y^2 + (y^2 - r^2/3)^2};$$
and $$B_z(\vec{r}, t) = B_{oz}(\vec{r})\cos(\phi - \gamma), \quad (12c)$$
$$\text{where } B_{oz}(\vec{r}) = \frac{3\mu_0 M}{4\pi r^5} z\sqrt{x^2+y^2}.$$

As discussed above, the magnetic dipole 28 may be rotating about the z-axis at the origin in the x-y plane, and the z-axis is aligned with the axis of the BHA 18. When the magnetic dipole 28 rotates at an approximately constant frequency, $\phi(t)=(2\pi f)t=\omega t$, where f is the frequency of rotation, and where $\omega=2\pi f$ is the angular frequency. However, as will be discussed further below, the techniques disclosed herein are not limited to this special case of constant frequency, but rather may be employed as long as the magnetic dipole is not stationary about the z-axis in the x-y plane.

The magnetic dipole 28 may be assumed to point in the +x direction at time t=0, because the technique disclosed herein relies not on absolute phases, but rather relative phases, among the three magnetic field components. Because the magnetic dipole 28 rotates with time, the magnetic dipole 28 makes an angle $\phi(t)=\omega t$ with respect to the x-axis at time t. For frequencies at or below 100 Hz, the magnetic field can be accurately described as a quasi-static field. In other words, the time dependence is given by the following relationships:

$$B_x(\vec{r}, t) = B_{ox}(\vec{r})\cos(\omega t - \alpha) \text{ and} \quad (13a)$$
$$B_{ox}(\vec{r}) = \frac{3\mu_0 M}{4\pi r^5}\sqrt{x^2y^2 + (x^2 - r^2/3)^2};$$

$$B_y(\vec{r}, t) = B_{oy}(\vec{r})\cos(\omega t - \beta) \text{ and} \quad (13b)$$
$$B_{oy}(\vec{r}) = \frac{3\mu_0 M}{4\pi r^5}\sqrt{x^2y^2 + (y^2 - r^2/3)^2};$$
and $$B_z(\vec{r}, t) = B_{oz}(\vec{r})\cos(\omega t - \gamma) \text{ and } B_{oz}(\vec{r}) = \frac{3\mu_0 M}{4\pi r^5} z\sqrt{x^2+y^2}. \quad (13c)$$

As noted above, FIGS. 11-12 illustrate an example for performing the general algorithm of FIG. 10 in an exemplary case when the magnetic dipole 28 rotates at a constant frequency. In the example of FIGS. 11-12, f=3 Hz, M=100 Amp-m$^2$, and the coordinates of the observation point 52 are x=10 m, y=2 m, and z=10 m. Turning to FIG. 11, a plot 62 represents an idealized measurement of the magnetic field $\vec{B}$ over a period of one second based on the equations above. An ordinate 64 represents the ideal measurement of the magnetic field components of $\vec{B}$ in units of nanoTesla, and an abscissa 66 represents time in units of seconds. A dash-dotted line represents a measurement of $B_x(\vec{r},t)$, a dashed line represents a measurement of $B_y(\vec{r},t)$ and a solid line represents a measurement of $B_z(\vec{r},t)$. In the graph 62, the phases of the components are $\alpha$=0.559 radians, $\beta$=−1.268 radians, and $\gamma$=0.197 radians, and the amplitudes are $B_{ox}(\vec{r})$=1.91 nanoTesla, $B_{oy}(\vec{r})$=3.38 nanoTesla, and $B_{oz}(\vec{r})$=5.15 nanoTesla.

Because the observation point 52 may be located with respect to the magnetic dipole 28 using the three magnetic field components, measured as functions of time t, the values M, $B_x(\vec{r},t)$, $B_y(\vec{r},t)$, and $B_z(\vec{r},t)$ may be treated as known quantities, while the observation point $\vec{r}$ may be treated as an unknown and to be determined. Note that there are three unknown quantities, x, y, and z. The solution may be obtained by finding an angle of rotation around the z-axis such that $B_x(\vec{r},t)$ and $B_y(\vec{r},t)$ are transformed into magnetic field components $H_x(\vec{r},t)$ and $H_y(\vec{r},t)$ in which $H_x(\vec{r},t)$ is in phase with $B_z(\vec{r},t)$. Specifically, such a transverse angle of rotation $\theta$ may be defined according to the following equation:

$$\begin{bmatrix} H_x(\vec{r}, t) \\ H_y(\vec{r}, t) \end{bmatrix} = \begin{bmatrix} \cos\theta & \sin\theta \\ -\sin\theta & \cos\theta \end{bmatrix}\begin{bmatrix} B_x(\vec{r}, t) \\ B_y(\vec{r}, t) \end{bmatrix}, \quad (14)$$

such that $H_x(\vec{r},t)$ is in phase with $B_z(\vec{r},t)$.

In Equation (14), $H_x(\vec{r},t)$ and $H_y(\vec{r},t)$ denote magnetic field components in the rotated frame, while $B_x(\vec{r},t)$ and $B_y(\vec{r},t)$ represent magnetic field components in the original frame. Since the rotation is about the z-axis, the magnetic field component in the z direction is the same in both frames. $B_z(\vec{r},t)$ may be expanded as follows:

$$B_z(\vec{r},t) = B_{oz}(\vec{r})\cos(\omega t - \gamma) = B_{oz}(\vec{r})[\cos(\omega t)\cos\gamma + \sin(\omega t)\sin\gamma]$$

$$B_z(\vec{r},t) = B_{oz}(\vec{r})\cos\gamma\{\cos(\omega t) + \sin(\omega t)\tan\gamma\} \quad (15).$$

Substituting Equations (13a) and (13b) into Equation (14), the following relationship may be written:

$$H_x(\vec{r}, t) = \cos\theta\left\{\frac{3\mu_0 M}{4\pi r^5}\sqrt{x^2y^2 + (x^2 - r^2/3)^2}\cos(\omega t - \alpha)\right\} + \quad (16)$$
$$\sin\theta\left\{\frac{3\mu_0 M}{4\pi r^5}\sqrt{x^2y^2 + (y^2 - r^2/3)^2}\cos(\omega t - \beta)\right\}.$$

Based on a trigonometric identity and Equation (6), the following relationship may be written:

$$\cos(\omega t - \alpha) = \cos(\omega t)\cos\alpha + \sin(\omega t)\sin\alpha \quad (17)$$
$$\cos(\omega t - \alpha) =$$
$$\cos(\omega t)\frac{x^2 - r^2/3}{\sqrt{x^2y^2 + (x^2 - r^2/3)^2}} + \sin(\omega t)\frac{xy}{\sqrt{x^2y^2 + (x^2 - r^2/3)^2}}.$$

Similarly, using the same trigonometric identity and Equation (8), the following relationship may be written:

$$\cos(\omega t - \beta) = \qquad (18)$$

$$\cos(\omega t)\frac{xy}{\sqrt{x^2y^2 + (y^2 - r^2/3)^2}} + \sin(\omega t)\frac{x^2 - r^2/3}{\sqrt{x^2y^2 + (y^2 - r^2/3)^2}}.$$

Inserting Equations (17) and (18) into Equation (16) provides the following relationship:

$$H_x(\vec{r}, t) = \frac{3\mu_0 M}{4\pi r^5}\{\cos\theta[(x^2 - r^2/3)\cos(\omega t) + (xy)\sin(\omega t)] +$$
$$\sin\theta[(xy)\cos(\omega t) + (y^2 - r^2/3)\sin(\omega t)]\},$$

whose terms may be rearranged as follows:

$$H_x(\vec{r}, t) = \frac{3\mu_0 M}{4\pi r^5}\{\cos(\omega t)[(x^2 - r^2/3)\cos\theta + (xy)\sin\theta] +$$
$$\sin(\omega t)[(xy)\cos\theta + (y^2 - r^2/3)\sin\theta]\},$$

wherein the $\cos\theta$ term may be factored to produce the following:

$$H_x(\vec{r}, t) = \frac{3\mu_0 M}{4\pi r^5}\cos\theta \qquad (19)$$
$$\{\cos(\omega t)[(x^2 - r^2/3) + (xy)\tan\theta] + \sin(\omega t)[(xy) + (y^2 - r^2/3)\tan\theta]\}.$$

By factoring the first term of Equation (19) in square brackets, the following equation may be written:

$$H_x(\vec{r}, t) = \frac{3\mu_0 M}{4\pi r^5}\cos\theta[(x^2 - r^2/3) + (xy)\tan\theta] \cdot \qquad (20)$$
$$\left\{\cos(\omega t) + \sin(\omega t)\frac{[(xy) + (y^2 - r^2/3)\tan\theta]}{[(x^2 - r^2/3) + (xy)\tan\theta]}\right\}.$$

Comparing Equations (15) and (20), $H_x(\vec{r},t)$ will be in phase with $B_z(\vec{r},t)$ if the following relationship is satisfied:

$$\frac{[(xy) + (y^2 - r^2/3)\tan\theta]}{[(x^2 - r^2/3) + (xy)\tan\theta]} = \tan\gamma = \frac{y}{x}. \qquad (21)$$

Equation (21) may be solved to yield the following:

$$\tan\theta = \tan\gamma = \frac{y}{x}, \qquad (22)$$

or, more simply:

$$\theta = +\gamma + n\cdot\pi \qquad (23)$$

where n is an integer.

Note that the ambiguity in direction (n·π) is not an impediment in locating the observation point 52 in a practical drilling situation, since the general direction from the observation point 52 to the magnetic dipole 28 will be known. Applying the rotation angle from Equation (22) to Equation (19) may yield the following:

$$H_x(\vec{r}, t) = \frac{3\mu_0 M}{4\pi r^5}\cos\theta$$
$$\left\{\cos(\omega t)\left[(x^2 - r^2/3) + (xy)\left(\frac{y}{x}\right)\right] + \sin(\omega t)\left[(xy) + (y^2 - r^2/3)\left(\frac{y}{x}\right)\right]\right\},$$

which may be rearranged and simplified as follows:

$$H_x(\vec{r}, t) = \frac{3\mu_0 M}{4\pi r^5}\left(\frac{2}{3}r^2 - z^2\right)\cos(\omega t - \theta). \qquad (24)$$

When Equation (22) is satisfied, $H_y(\vec{r},t)$ is $\pi/2$ radians out-of-phase with $B_z(\vec{r},t)$. To demonstrate this, substitute Equations (13a) and (13b) into Equation (14):

$$H_x(\vec{r}, t) = -\sin\theta\frac{3\mu_0 M}{4\pi r^5}\sqrt{x^2y^2 + (x^2 - r^2/3)^2}\cos(\omega t - \alpha) +$$
$$\cos\theta\frac{3\mu_0 M}{4\pi r^5}\sqrt{x^2y^2 + (y^2 - r^2/3)^2}\cos(\omega t - \beta),$$

insert Equations (17) and (18):

$$H_y(\vec{r}, t) = \frac{3\mu_0 M}{4\pi r^5}\{-\sin\theta[(x^2 - r^2/3)\cos(\omega t) + (xy)\sin(\omega t)] +$$
$$\cos\theta[(xy)\cos(\omega t) + (y^2 - r^2/3)\sin(\omega t)]\};$$

$$H_y(\vec{r}, t) = \frac{3\mu_0 M}{4\pi r^5}\{\cos(\omega t)[-(x^2 - r^2/3)\sin\theta + (xy)\cos\theta] +$$
$$\sin(\omega t)[-(xy)\sin\theta + (y^2 - r^2/3)\cos\theta]\};$$

and factor the $\cos\theta$ term and using Equation (22) for $\tan\theta$:

$$H_y(\vec{r}, t) = \frac{3\mu_0 M}{4\pi r^5}\cos\theta\left\{\cos(\omega t)\left[-(x^2 - r^2/3)\frac{y}{x} + (xy)\right] +\right.$$
$$\left.\sin(\omega t)\left[-(xy)\frac{y}{x} + (y^2 - r^2/3)\right]\right\} \qquad (25)$$

$$H_y(\vec{r}, t) = \frac{3\mu_0 M}{4\pi r^5}\cos\theta\left\{\cos(\omega t)\left[\frac{r^2 y}{3x}\right] + \sin(\omega t)\left[-\frac{r^2}{3}\right]\right\}$$

$$H_y(\vec{r}, t) = \frac{\mu_0 M}{4\pi r^3}\cos\theta\left\{\cos(\omega t)\frac{y}{x} - \sin(\omega t)\right\}$$

$$= \frac{\mu_0 M}{4\pi r^3}\cos\theta\{\cos(\omega t)\tan\theta - \sin(\omega t)\}$$

$$H_y(\vec{r}, t) = \frac{\mu_0 M}{4\pi r^3}\{\cos(\omega t)\sin\theta - \sin(\omega t)\cos\theta\}$$

$$= -\frac{\mu_0 M}{4\pi r^3}\sin(\omega t - \theta).$$

With the condition $\tan\theta = \tan\gamma$ and comparing Equation (25) to $B_z(\vec{r},t) = B_{oz}(\vec{r})\cos(\omega t - \gamma)$, it is clear that $H_y(\vec{r},t)$ is $\pi/2$ radians out-of-phase with $B_z(\vec{r},t)$.

The above-described situation may be understood by referring again to the magnetic field lines of FIGS. 6A-C and 7A-C. For example, consider the instant when the magnetic dipole 28 is aligned with the +x axis as illustrated in FIGS. 6A-C. Note that under the above-described conditions, the observation point 52 may be located in the upper right quadrant of the x-z plane (i.e., at a point (x,0,z)). Referring to FIG. 6A, the magnetic field components $B_z(\vec{r},t)$ and $B_x(\vec{r},t)$ will reach maximum amplitudes when the magnetic dipole 28 is aligned with the +x axis, as illustrated. However, the magnetic field component $B_y(\vec{r},t)$ will be zero at this instant, as indicated by FIG. 6B. At the instant when the magnetic dipole 28 is aligned with the +y axis, as illustrated in FIGS. 7A-C, the magnetic field component $B_y(\vec{r},t)$ will reach a maximum amplitude at the observation point 52. This circumstance is apparent in FIG. 7B. Meanwhile, magnetic field components $B_z(\vec{r},t)$ and $B_x(\vec{r},t)$ will be zero at this instant, as indicated by FIGS. 7B and 7C. Hence, $B_x(\vec{r},t)$ is in-phase with $B_z(\vec{r},t)$, while $B_y(\vec{r},t)$ is $\pi/2$ radians out-of-phase with $B_z(\vec{r},t)$. However, this condition exists only for observation points in the x-z plane. For points off the x-z plane, the rotation of $B_x(\vec{r},t)$ and $B_y(\vec{r},t)$ to $H_x(\vec{r},t)$ and $H_y(\vec{r},t)$ described by Equations (14) and (22) should be applied.

FIG. 8 illustrates a relationship between the transverse vector $\vec{\rho}$ from the origin, which represents the location of the magnetic dipole 28, to the observation point 52, which represents the location of the magnetometer 30. According to Equation (10), and as illustrated in FIG. 8, the angle between $\vec{\rho}$ and x is $\gamma = \tan^{-1}(y/x)$. Thus, because the condition for $H_x(\vec{r},t)$ to be in phase with $B_z(\vec{r},t)$ is given by Equation (22), $\tan\theta = \tan\gamma$, the desired phase coherence may be obtained when frame of reference is rotated by the angle $\theta$ from the x-axis. FIG. 9 illustrates the situation where a rotated (x',y',z) coordinate system is defined when the (x,y,z) coordinate system is rotated by the angle $\theta$, according to the following relationship:

$$\begin{bmatrix} x' \\ y' \end{bmatrix} = \begin{bmatrix} \cos\theta & \sin\theta \\ -\sin\theta & \cos\theta \end{bmatrix} \begin{bmatrix} x \\ y \end{bmatrix}. \quad (26)$$

Thus, when the observation point is located off of the x-z plane by an angle $\gamma$, rotating the coordinate system by an angle $\theta = \gamma + n\pi$ provides the required phase coherence. In the (x',y',z) coordinate system $H_x(\vec{r},t)$ is in phase with $B_z(\vec{r},t)$.

FIG. 12 represents a plot 68 of the measurements of FIG. 11, rotated to a frame of reference such that $H_x(\vec{r},t)$ is in phase with $B_z(\vec{r},t)$. An ordinate 70 represents the rotated measurement of the magnetic field in units of nanoTesla, and an abscissa 72 represents time in units of seconds. Recalling that the phases of the idealized measured magnetic field components are $\alpha = 0.559$ radians, $\beta = -1.268$ radians, and $\gamma = 0.197$ radians, rotating the magnetic field such that $H_x(\vec{r},t)$ is in phase with $B_z(\vec{r},t)$ may occur by applying Equation (14) with $\theta = 0.197$ radians to the data illustrated in the plot 62 of FIG. 11. In the resulting plot 68, a dash-dotted line represents the x'-component of the magnetic field, $H_x(\vec{r},t)$, a dashed line represents the y'-component of the magnetic field, $H_y(\vec{r},t)$, and a solid line represents the original z-component of the magnetic field, $B_z(\vec{r},t)$. Note that $H_x(\vec{r},t)$ is in-phase with $B_z(\vec{r},t)$, while $H_y(\vec{r},t)$ is $\pi/2$ out-of-phase with $B_z(\vec{r},t)$.

Figure 13:
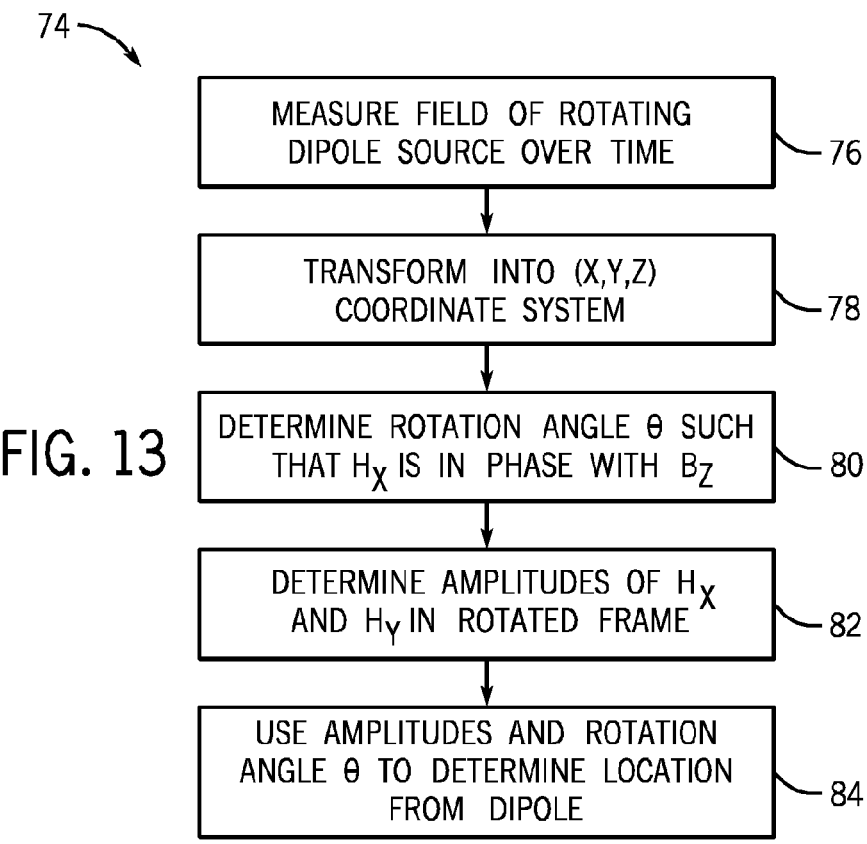
FIG. 13 is a flowchart describing a method of determining a relative location between a rotating magnetic dipole and a magnetometer by transforming magnetic field measurements into a rotated reference frame, in accordance with an embodiment.

FIG. 13 is a flowchart 74 that describes a manner of determining the relative location of the magnetometer 30 to the magnetic dipole 28 based on the equations disclosed above. It should be appreciated that further embodiments are discussed below for several, more specific, situations that may arise while drilling a new well in the proximity of an existing well.

In a first step 76, the magnetometer 30 may take a series of measurements of the magnetic field $\vec{B}$ over a predetermined period of time (e.g., 1-2 seconds or one or more periods of rotation of the magnetic dipole 28). If the magnetometer 30 in the producer well 14 is not completely aligned with the (x,y,z) coordinate system of the magnetic dipole 28 in the injector well 12, in step 78, the raw measurements from the magnetometer 30 may be transformed into the (x,y,z) coordinate system using known survey information for the two wells and a reading from the inclinometer 36.

In step 80, the data processing circuitry 46 may receive the measurements of the magnetic field $\vec{B}$ taken for the predetermined period of time. The data processing circuitry 46 may rotate the frame of reference of the measurements of the magnetic field $\vec{B}$ such that the x'-component of the magnetic field, $H_x(\vec{r},t)$, is in phase with the z-component of the magnetic field, $B_z(\vec{r},t)$. It should be noted that the y'-component of the magnetic field, $H_y(\vec{r},t)$, may be $\pi/2$ out of phase with $H_x(\vec{r},t)$.

In step 82, the data processing circuitry 46 may determine the amplitudes of $H_x(\vec{r},t)$ and $H_y(\vec{r},t)$, as will be described further below. In step 84, the data processing circuitry 46 may determine the relative location of the magnetometer 30 to the magnetic dipole 28 using the amplitudes determined in step 82 and the angle of rotation of the rotated frame of reference. Particularly, the data processing circuitry 46 may employ Equations (35)-(41) to perform steps 82 and 84, which are discussed in greater detail below.

Figure 14:
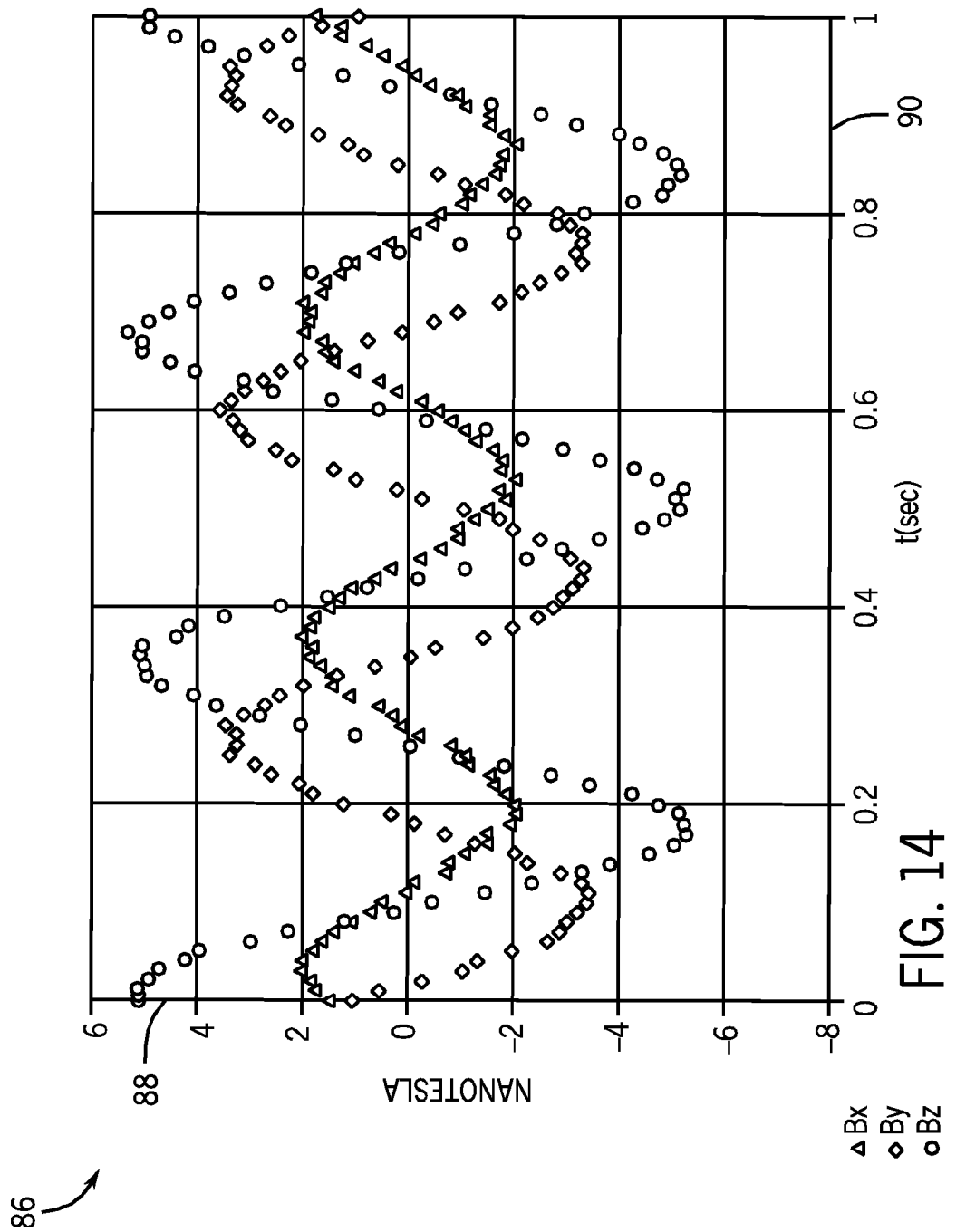
FIG. 14 is a plot simulating noisy three-axis measurements of a magnetic dipole rotating at a constant frequency, in accordance with an embodiment.
Figure 15:
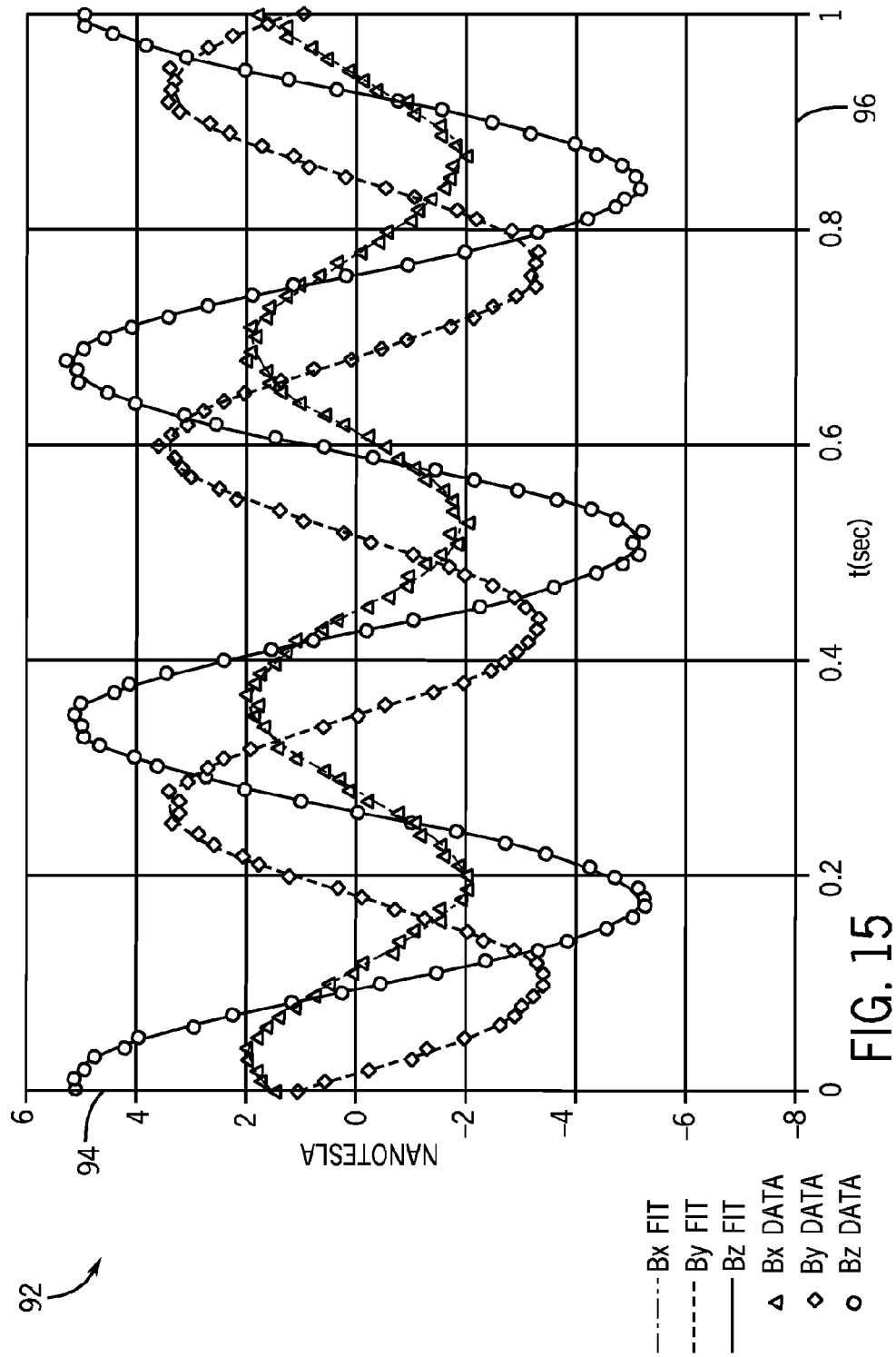
FIG. 15 is a plot of sinusoids fitting least squares fit sinusoids to the noisy three-axis measurements of FIG. 14, in accordance with an embodiment.
Figure 16:
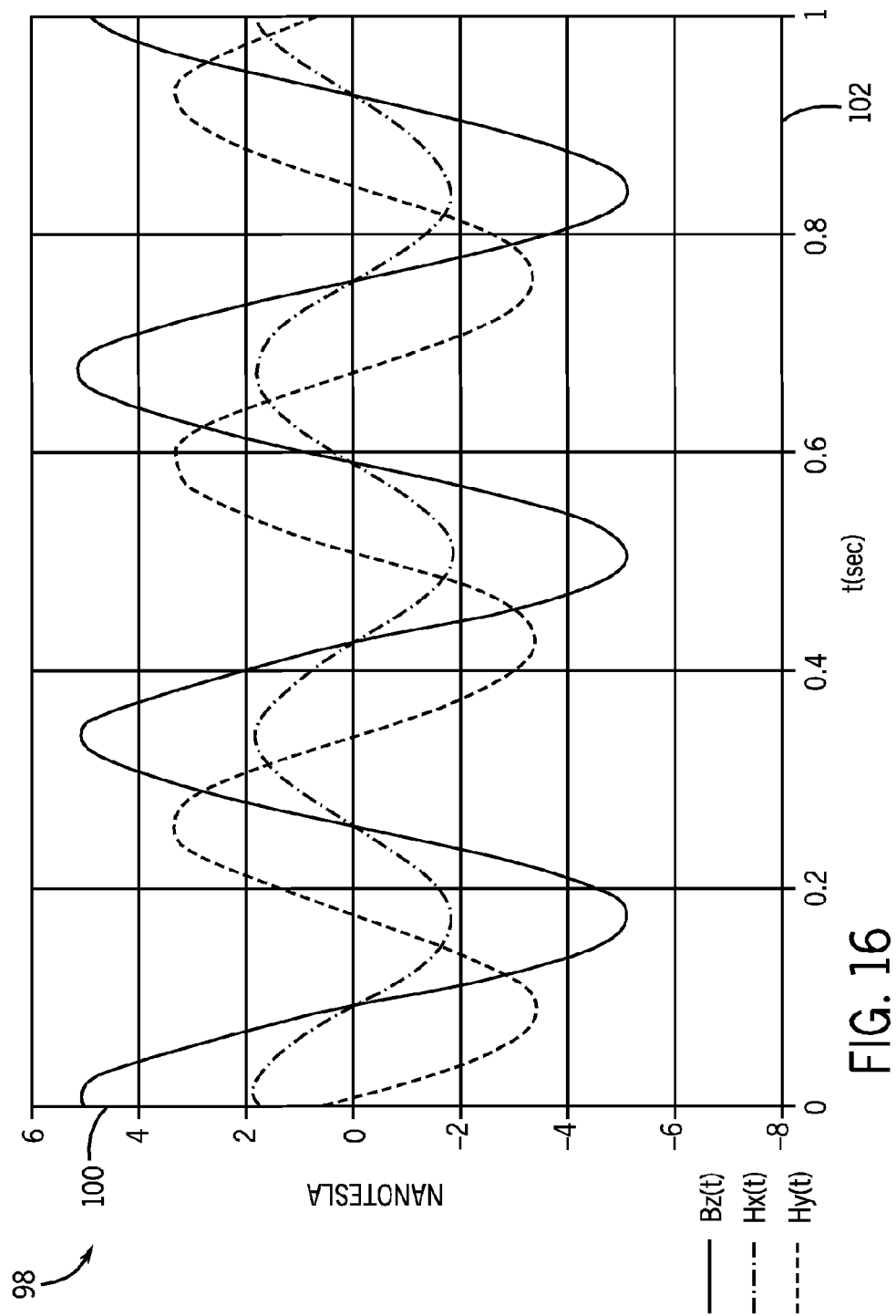
FIG. 16 is a plot in which the least squares sinusoids of FIG. 15 have been transformed into a rotated frame of reference, in accordance with an embodiment.
Figure 17:
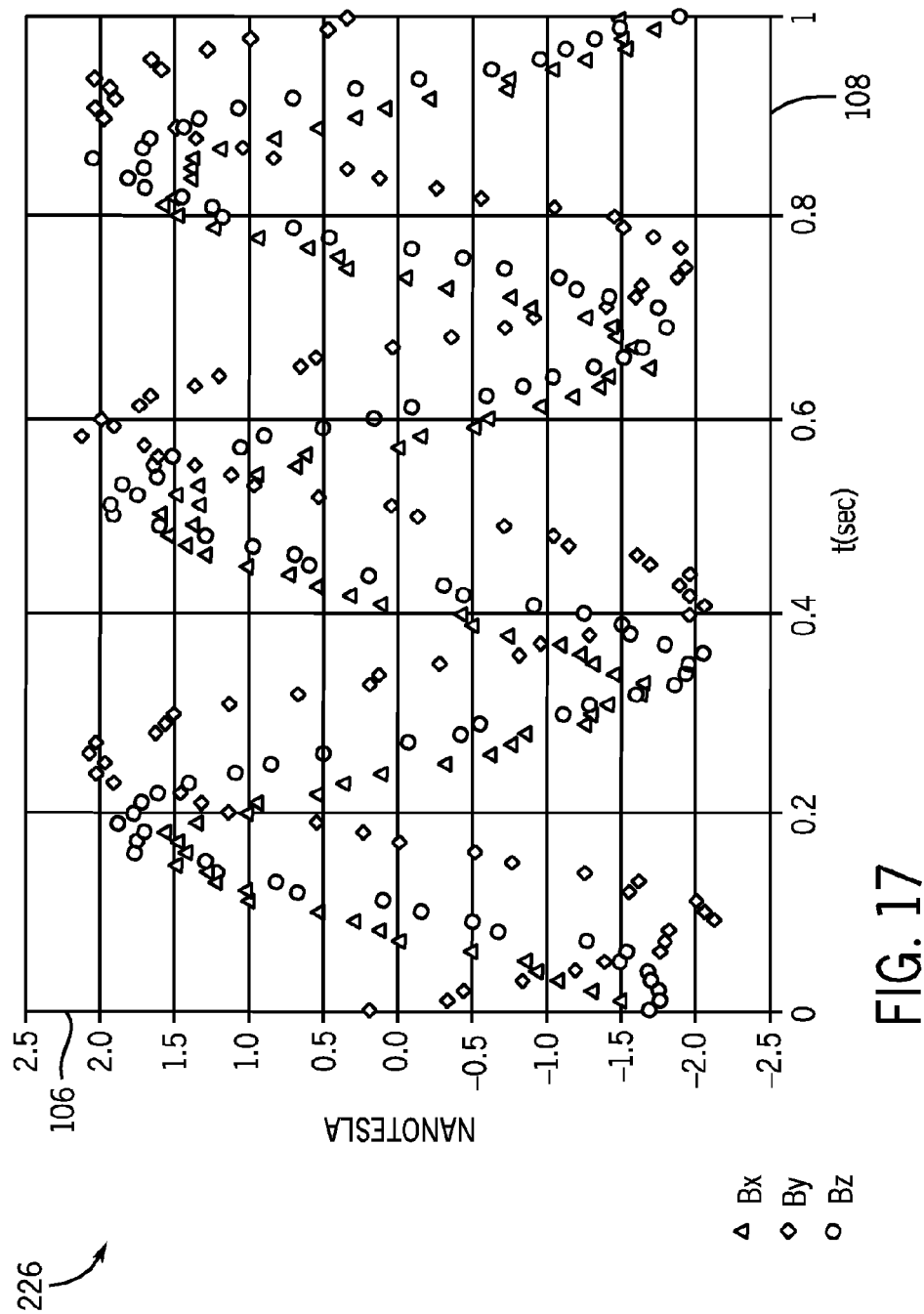
FIG. 17 is another plot simulating noisy three-axis measurements of a magnetic dipole rotating at a constant frequency, in accordance with an embodiment.
Figure 18:
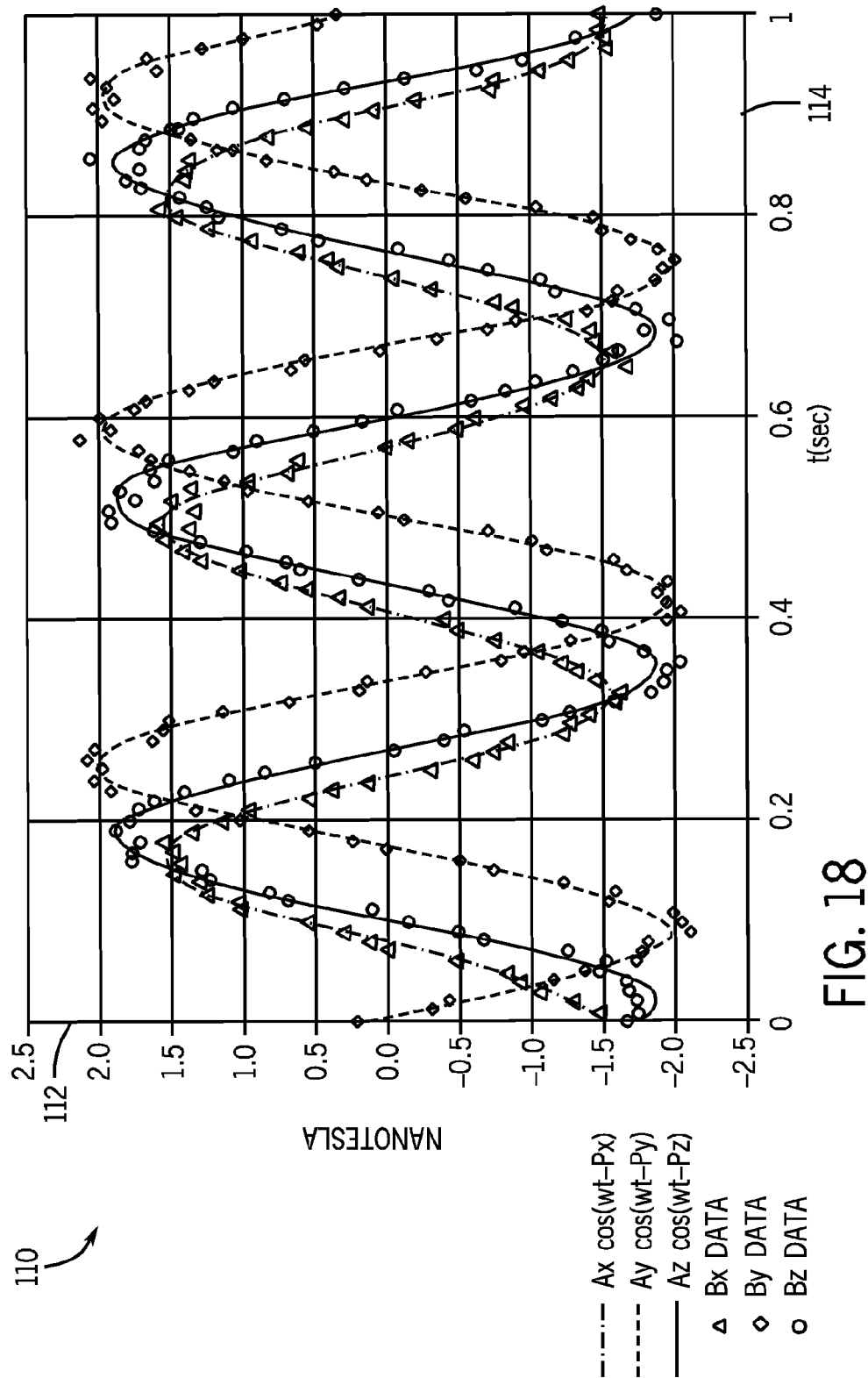
FIG. 18 is a plot of sinusoids least squares fit to the noisy three-axis measurements of FIG. 17, in accordance with an embodiment.

In the example illustrated in FIGS. 11-12, discussed above, the measurements of the magnetic field $\vec{B}$ were idealized and without error. However, measurements taken in the field may contain noise or other errors. FIGS. 14-18 represent examples of the presently disclosed technique that simulate errors in measurement for a magnetic dipole 28 rotating at a constant frequency. Particularly, FIGS. 14-16 represent a first example, while FIGS. 17 and 18 represent a second example. In the example of FIGS. 14-16, as in the example of FIGS. 9-12, f=3 Hz, M=100 Amp-m$^2$, and the coordinates of the observation point 52 are x=10 m, y=2 m, and z=10 m. However, because real data will be noisy, random numbers will be used to simulate noise with a standard deviation of 0.1 nanoTesla. The noise is added to magnetic field components calculated using Equations (13a), (13b), and (13c). Additionally, to indicate measured quantities, a tilde will be used in the following equations. For example, $\{\tilde{B}_x(t_i)\}$, $\{\tilde{B}_y(t_i)\}$, and $\{\tilde{B}_z(t_i)\}$ refer to N measured signals obtained at times $t_i$, $i = 0, \ldots, N-1$. The vector $\vec{r}$ will be suppressed in the notation for measured quantities. It should be noted that the objective is to determine the observation point ($\vec{r}$) with respect to the rotating magnetic dipole located at (0,0,0). The three unknown quantities are x, y, and z, while the four known quantities are M and the three-axis magnetometer 30 readings. Based on the following discussion, the unknown quantities may be determined.

Turning to FIG. 14, a plot 86 represents simulated data obtained by the magnetometer 30 when f=3 Hz, M=100 Amp-m$^2$, and the coordinates of the observation point 52 are x=10 m, y=2 m, and z=10 m. An ordinate 88 represents a measurement of the magnetic field components of $\vec{B}$ in units of nanoTesla, and an abscissa 90 represents time in units of seconds. In the plot 86, a triangle represents a data point of a measurement of the x-component of the magnetic field, $\{\tilde{B}_x$ $(t_i)$}, a diamond represents a data point of a measurement of the y-component of the magnetic field, {$B_y(t_i)$}, and a circle represents a data point of a measurement of the z-component of the magnetic field, {$B_z(t_i)$}. The magnetometer 30 is assumed to have taken 100 measurements of each component per second.

For constant rotation, it may be more convenient to work with functions than raw data points. As such, FIG. 15 illustrates a plot 92 the measured data of FIG. 14 that has been least squares fit to sinusoidal functions of the form: $B_j(t)=A_j \cos(\omega_j t - P_j)$, where $A_j$ is the amplitude, $P_j$ is the phase, and $\omega_j$ is the angular frequency, and where j=x, y, z. An ordinate 94 represents the magnetic field components of $\vec{B}$ in units of nanoTesla, and an abscissa 96 represents time in units of seconds. In the plot 92, a triangle represents a data point of a measurement of the x-component of the magnetic field, {$B_x(t_i)$}, a diamond represents a data point of a measurement of the y-component of the magnetic field, {$B_y(t_i)$}, and a circle represents a data point of a measurement of the z-component of the magnetic field, {$B_z(t_i)$}. Additionally, a dash-dotted line represents a least squares fit sinusoid to the x-component of the magnetic field, $B_x(t)$, a dashed line represents the least squares fit of a sinusoid to the y-component of the magnetic field, $B_y(t)$, and a solid line represents the least squares fit of a sinusoid to the z-component of the magnetic field, $B_z(t)$.

To obtain the least squares fitting of the measured magnetic field $\vec{B}$ data, the frequency for each field component is allowed to float initially (since the rotation frequency may not be known at the observation point 52). There are nine parameters to be obtained by minimizing the following quantities:

$$\chi_x^2 = \sum_i \{B_x(t_i) - A_x \cos(\omega_x t_i - P_x)\}^2; \quad (27a)$$

$$\chi_y^2 = \sum_i \{B_y(t_i) - A_y \cos(\omega_y t_i - P_y)\}^2; \quad (27b)$$

and $$\chi_z^2 = \sum_i \{B_z(t_i) - A_z \cos(\omega_z t_i - P_z)\}^2. \quad (27c)$$

Once the nine parameters $A_x$, $A_y$, $A_z$, $P_x$, $P_y$, $P_z$, $\omega_x$, $\omega_y$, and $\omega_z$ are obtained from the three least squares calculations, a further condition can be imposed:

$$\overline{\omega} = (\omega_x + \omega_y + \omega_z)/3 \quad (28),$$

since the rotation rate must be the same for all magnetic field components.

Using the average value for the angular frequency obtained from Equation (28), Equations (27a), (27b), and (27c) can be minimized a second time with the constraint: $\omega_x = \omega_y = \omega_z = \overline{\omega}$. The final values for $A_x$, $A_y$, $A_z$, $P_x$, $P_y$, and $P_z$ will be then used in subsequent calculations rather than the raw measurements. For the plot 92 of FIG. 15, the fitting parameters are $A_x$=1.91 nanoTesla, $P_x$=0.561 radians, $A_y$=3.38 nanoTesla, $P_y$=−1.271 radians, $A_z$=5.14 nanoTesla, and $P_z$=0.199 radians. As illustrated in FIG. 15, the agreement between raw data and the fitting functions is very good.

Using the fitted curves of the magnetic field $\vec{B}$ measurements, an angle of rotation θ may be determined such that a rotated x-component of the magnetic field, $H_x(t)$, is in phase with the z-component of the magnetic field $B_z(t)$. From Equation (14), the fields in the rotated frame can be written as follows:

$$H_x(t) = A_x \cos(\overline{\omega}t - P_x)\cos\theta + A_y \cos(\overline{\omega}t - P_y)\sin\theta \quad (29a);$$

$$H_y(t) = -A_x \cos(\overline{\omega}t - P_x)\sin\theta + A_y \cos(\overline{\omega}t - P_y)\cos\theta \quad (29b); \text{ and}$$

$$B_z(t) = A_z \cos(\overline{\omega}t - P_z) \quad (29c).$$

Equation (29a) can be re-arranged as follows:

$$H_x(t) = \cos(\overline{\omega}t)[A_x \cos P_x \cos\tilde{\theta} + A_y \cos P_y \sin\tilde{\theta}] + \sin(\overline{\omega}t)[A_x \sin P_x \cos\tilde{\theta} + A_y \sin P_y \sin\tilde{\theta}] \quad (30).$$

Equation (29c) can be similarly re-arranged as follows:

$$B_z(t) = \cos(\overline{\omega}t)[A_z \cos P_z] + \sin(\overline{\omega}t)[A_z \sin P_z] \quad (31).$$

Forcing the phase of $H_x(t)$ to be the same as $B_z(t)$ indicates the following relationship:

$$\frac{[A_z \sin P_z]}{[A_z \cos P_z]} \equiv \frac{[A_x \sin P_x \cos\theta + A_y \sin P_y \sin\theta]}{[A_x \cos P_x \cos\theta + A_y \cos P_y \sin\theta]}. \quad (32)$$

Re-arranging Equation (32) produces the following:

$$\tan\tilde{\theta} = -\frac{A_x}{A_y} \frac{[\cos P_x \tan P_z - \sin P_x]}{[\cos P_y \tan P_z - \sin P_y]}. \quad (33)$$

The tilde over the determined rotation angle indicates that the value for the rotation angle is derived from measured data, i.e. from the parameters fit to the data. Equation (33) also provides the direction from the point of observation to the z-axis (i.e., toward the line defined by (0,0,z)). Moreover, tan $\tilde{\theta}$=tan γ=y/x, so one unknown quantity (x or y) can be eliminated.

FIG. 16 illustrates a plot 98 of the rotated magnetic field data, which may be obtained by using Equation (33) to obtain $\tilde{\theta}$=0.199 radians and applying Equations (29a) and (29b). An ordinate 100 represents the least squares fits of the magnetic field components in units of nanoTesla, and an abscissa 102 represents time in units of seconds. In the plot 98, a dashed line represents the rotated x'-component of the magnetic field, $H_x(t)$, a dotted line represents the rotated y'-component of the magnetic field, $H_y(t)$, and a solid line represents the z-component of the magnetic field, $B_z(t)$. The rotated magnetic field component, $H_x(t)$, is in-phase with $B_z(t)$, while $H_y(t)$ is π/2 radians out-of-phase with $B_z(t)$.

Having determined the rotated frame of reference, the transformed magnetic field data may be employed in the rotated frame by the data processing circuitry 46 to determine the relative location of the magnetometer 30 to the magnetic dipole 28. To determine the relative location, the data processing circuitry 46 may employ the amplitude values of the rotated magnetic fields in conjunction with the angle of rotation, as discussed below with reference to Equations (34)-(41). As discussed above, in the rotated frame where tan θ=tan γ, the magnetic field components have the forms:

$$H_x(\vec{r}, t) = \frac{3\mu_0 M}{4\pi r^5}\left(\frac{2}{3}r^2 - z^2\right)\cos(\omega t - \theta); \quad (24)$$

$$H_y(\vec{r}, t) = -\frac{\mu_0 M}{4\pi r^3}\sin(\omega t - \theta); \quad (25)$$

and $$B_z(\vec{r}, t) = \frac{3\mu_0 M}{4\pi r^5} z\sqrt{x^2 + y^2}\cos(\omega t - \theta). \quad (13c)$$

In the rotated frame that satisfies Equation (33), and except for noise, the three measured magnetic field components have the same form:

$$H_x(t) = H_{ox} \cos(\overline{\omega}t - P_z) \quad (34a)$$

$$H_y(t) = -H_{oy} \sin(\overline{\omega}t - P_z) \text{; and} \quad (34b)$$

$$B_z(t) = A_z \cos(\overline{\omega}t - P_z), \quad (34c)$$

where $H_{ox}$ and $H_{oy}$ are constants.

The same phase $P_z$ occurs in Equations (34a), (34b) and (34c). This is simply a restatement that the phase of $H_x(t)$ is in the same as the phase of $B_z(t)$ and that the phase of $H_y(t)$ is $\pi/2$ radians out-of phase with $B_z(t)$. The amplitude $H_{ox}$ is obtained by setting Equation (29a) equal to Equation (34a):

$$H_x(t) = \cos(\overline{\omega}t)[A_x \cos P_x \cos\tilde{\theta} + A_y \cos P_y \sin\tilde{\theta}] +$$
$$\sin(\overline{\omega}t)[A_x \sin P_x \cos\tilde{\theta} + A_y \sin P_y \sin\tilde{\theta}]$$
$$= H_{ox} \cos(\overline{\omega}t - P_z)$$
$$= H_{ox}[\cos\overline{\omega}t \cos P_z + \sin\overline{\omega}t \sin P_z];$$

hence:

$$H_{ox} = \frac{[A_x \cos P_x \cos\tilde{\theta} + A_y \cos P_y \sin\tilde{\theta}]}{\cos P_z}. \quad (35)$$

Similarly, the amplitude $H_{oy}$ is obtained by setting Equation (29b) equal to Equation (34b) as follows:

$$H_y(t) = -A_x \cos(\overline{\omega}t - P_x)\sin\tilde{\theta} + A_y \cos(\overline{\omega}t - P_y)\cos\tilde{\theta}; \quad (36)$$

$$H_y(t) = \cos(\overline{\omega}t)[-A_x \cos P_x \sin\tilde{\theta} + A_y \cos P_y \cos\tilde{\theta}] +$$
$$\sin(\overline{\omega}t)[-A_x \sin P_x \sin\tilde{\theta} + A_y \sin P_y \cos\tilde{\theta}]$$
$$= -H_{oy} \sin(\overline{\omega}t - P_z)$$
$$= -H_{oy}[\sin\overline{\omega}t \cos P_z - \cos\overline{\omega}t \sin P_z];$$

hence, $$H_{oy} = \frac{[A_x \cos P_x \sin\tilde{\theta} - A_y \cos P_y \cos\tilde{\theta}]}{\sin P_z}.$$

Equations (34c), (35) and (36) define the amplitudes of the three magnetic field components in the rotated frame in terms of the parameters obtained by least squares fitting the raw data to the cosine functions in Equations (27a), (27b), and (27c). Comparing Equations (24), (25), and (13c) to Equations (34a), (34b) and (34c) yields the following:

$$H_{ox} = \frac{3\mu_0 M}{4\pi r^5}\left(\frac{2}{3}r^2 - z^2\right); \quad (37a)$$

$$H_{oy} = \frac{\mu_0 M}{4\pi r^3}; \text{ and} \quad (37b)$$

$$A_z = \frac{3\mu_0 M}{4\pi r^5} z\sqrt{x^2 + y^2}. \quad (37c)$$

Inverting Equation (37b) yields the estimated distance between the magnetometer 30 and the magnetic dipole 28:

$$\tilde{r} = \sqrt[3]{\frac{\mu_0 M}{4\pi |H_{oy}|}}, \quad (38)$$

where the tilde indicates that $\tilde{r}$ is obtained from inverting the measurements.

Equation (37a) may be recast as:

$$z^2 = \frac{2}{3}\tilde{r}^2 \pm \frac{4\pi\tilde{r}^5}{3\mu_0 M}|H_{ox}| = \tilde{r}^2\left(\frac{2}{3} \pm \frac{1}{3}\left|\frac{H_{ox}}{H_{oy}}\right|\right), \text{ or} \quad (39)$$

$$\tilde{z} = \pm\tilde{r}\sqrt{\frac{2}{3}}\sqrt{1 \pm \frac{1}{2}\left|\frac{H_{ox}}{H_{oy}}\right|}.$$

Note that the proper sign must be chosen inside and outside of the square root to produce a physically reasonable answer. Again, the tilde indicates that $\tilde{z}$ is obtained from inverting measurements. Noting that:

$$\sqrt{x^2 + y^2} = x\sqrt{1 + (\tan\tilde{\theta})^2},$$

Equation (37c) can be recast as follows:

$$A_z = \frac{3\mu_0 M}{4\pi\tilde{r}^5}\tilde{z}x\sqrt{1 + (\tan\tilde{\theta})^2}, \text{ or} \quad (40)$$

$$x = \pm\frac{\tilde{r}^2}{3\tilde{z}\sqrt{1 + (\tan\tilde{\theta})^2}}\left|\frac{A_z}{H_{oy}}\right|.$$

Finally, the last unknown is determined from the following relationship:

$$y = x \tan\tilde{\theta} \quad (41).$$

FIGS. 17 and 18 illustrate an example similar to that of FIGS. 14-16 for using the presently disclosed technique. As in the example of FIGS. 14-16 above, FIGS. 17 and 18 simulate slight errors in measurement for a magnetic dipole 28 rotating at a constant frequency. In the example of FIGS. 17 and 18, f=3 Hz, M=100 Amp-m², and the coordinates of the observation point 52 are x=10 m, y=2 m, and z=−10 m. However, because real data will be noisy, random numbers will be used to simulate noise with a standard deviation of 0.1 nanoTesla. The noise is added to magnetic field components calculated using Equations (13a), (13b), and (13c). Additionally, to indicate measured quantities, a tilde will be used in the following equations. For example, $\{B_x(t_i)\}$, $\{B_y(t_i)\}$, and $\{B_z(t_i)\}$ refer to N measured signals obtained at times i=0, . . . , N−1. The vector $\vec{r}$ will be suppressed in the notation for measured quantities. It should be noted that the objective is to determine the observation point ($\vec{r}$) with respect to the rotating magnetic dipole located at (0,0,0). The three unknown quantities are x, y, and z, while the four known quantities are M and the three-axis magnetometer 30 readings. Based on the following discussion, the unknown quantities may be determined.

Turning to FIG. 17, a plot 104 represents simulated data obtained by the magnetometer 30 when f=3 Hz, M=100 Amp-m², and the coordinates of the observation point 52 are x=10 m, y=2 m, and z=−10 m. An ordinate 106 represents a measurement of the magnetic field components of $\vec{B}$ in units of nanoTesla, and an abscissa 108 represents time in units of seconds. In the plot 104, a triangle represents a data point of a measurement of the x-component of the magnetic field, $\{B_x(t_i)\}$, a diamond represents a data point of a measurement of the y-component of the magnetic field, $\{B_y(t_i)\}$, and a circle represents a data point of a measurement of the z-component of the magnetic field, $\{B_z(t_i)\}$. The magnetometer 30 is assumed to have simultaneously sampled each magnetic field component every 0.01 seconds for a total measurement time of one second.

FIG. 18 illustrates a plot 110 of the measured data of FIG. 17 that has been least squares fit to sinusoids. An ordinate 110 represents a least squares fitting of the magnetic field components of $\vec{B}$ in units of nanoTesla, and an abscissa 114 represents time in units of seconds. In the plot 110, a triangle represents a data point of a measurement of the x-component of the magnetic field, $\{B_x(t_i)\}$, a diamond represents a data point of a measurement of the y-component of the magnetic field, $\{B_y(t_i)\}$, and a circle represents a data point of a measurement of the z-component of the magnetic field, $\{B_z(t_i)\}$.

The least squares fitting of FIG. 18 may be determined in two steps. A first least squares fitting may employ Equations (27a), (27b), and (27c) to obtain $A_x$, $A_y$, $A_z$, $P_x$, $P_y$, $P_z$, $\omega_x$, $\omega_y$, and $\omega_z$. As such, the angular frequencies are $\omega_x$=18.83 radian/sec, $\omega_y$=18.87 radian/sec, $\omega_z$=18.86 radian/sec, and $\overline{\omega}$=18.85 radian/sec. A second least squares fitting may employ Equations (27a), (27b), and (27c) using $\omega_x=\omega_y=\omega_z=\overline{\omega}$=18.85 radian/sec. The fit parameters are thus $A_x$=1.55 nanoTesla, $P_x$=3.013 radians, $A_y$=1.99 nanoTesla, $P_y$=−1.451 radians, $A_z$=1.88 nanoTesla, and $P_z$=3.538 radians. The resulting functions, $A_x \cos(\omega t - P_x)$, $A_y \cos(\omega t - P_y)$, and $A_z \cos(\omega t - P_z)$, are illustrated as a dash-dotted line, a dashed line, and a solid line, respectively, in the plot 110 of FIG. 18.

Based on the least squares fitting of FIG. 18, the relative location of the magnetometer 30 to the magnetic dipole 28 may be determined. Equation (33) may be used to compute the angle $\tilde{\theta}$, which gives the direction from the observation point to the z-axis, and where $\tan\tilde{\theta}=y/x$ can be used to eliminate one unknown quantity. The results are thus $\tan\tilde{\theta}$=0.407 and $\tilde{\theta}$=0.386 radians. Next, Equations (35) and (36) may be used to obtain $H_{ox}$=1.45 nanoTesla, and $H_{oy}$=2.07 nanoTesla, and Equation (38) yields $\tilde{r}$=16.90 m with an error $\Delta r=\tilde{r}-r$=0.02 m, where the "true" value for r was obtained from the initial conditions in the calculation. Finally, Equation (39) yields $\tilde{z}$=−16.03 m with an error $\Delta z=\tilde{z}-z$=−0.03 m, Equation (40) yields x=4.99 m with an error $\Delta x=\tilde{x}-x$=−0.01 m, and Equation (41) yields y=2.03 m with an error $\Delta y=\tilde{y}-y$=0.03 m.

Figure 19:
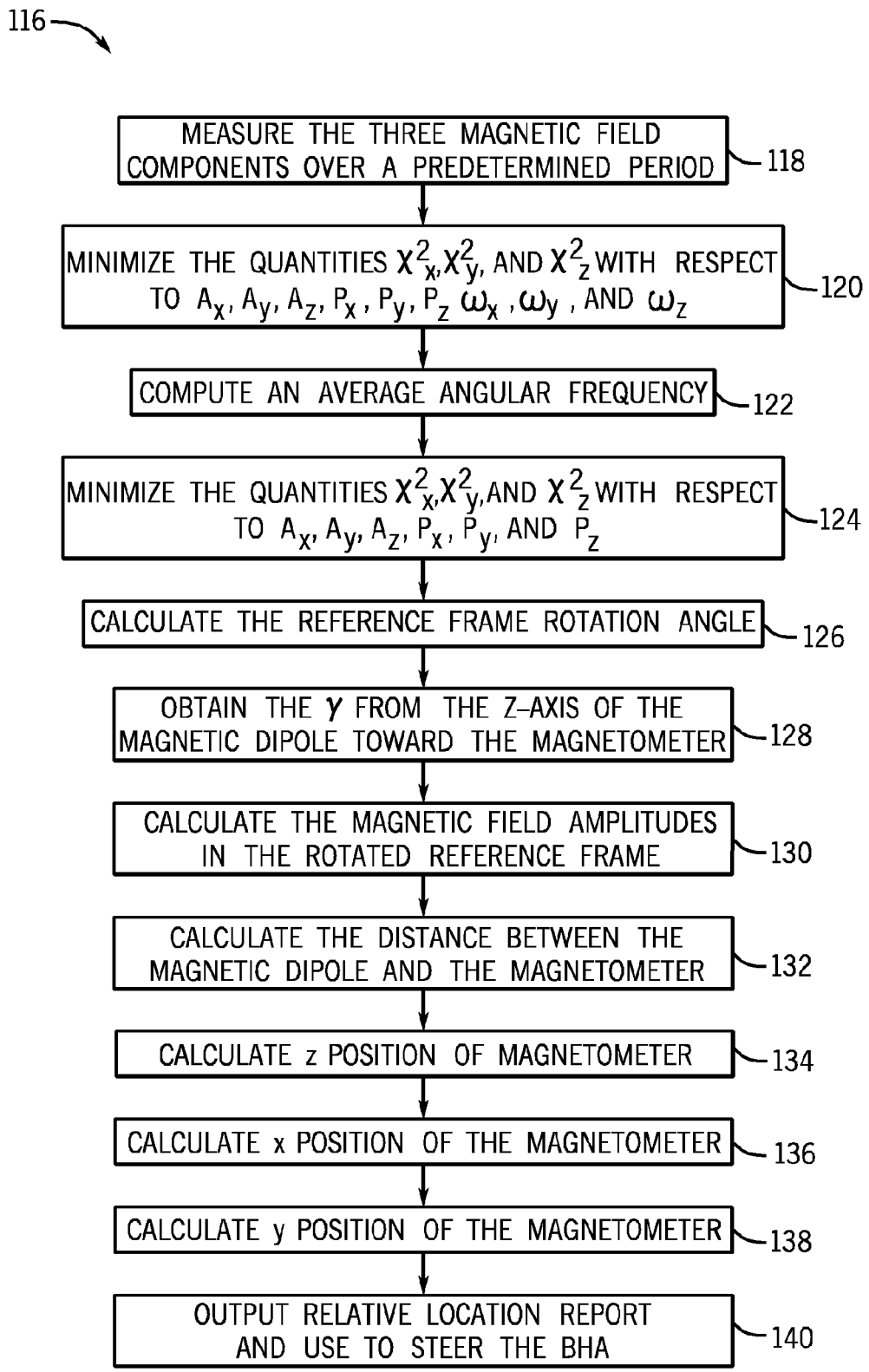
FIG. 19 is a flowchart describing a method of determining a relative location between a magnetometer and a magnetic dipole rotating at a constant frequency by transforming magnetic field measurements into a rotated reference frame, in accordance with an embodiment.

FIG. 19 is a flowchart 116, which describes a general manner of drilling a new well, such as the injector well 12, proximate to an existing well, such as the producer well 14. The flowchart 116 generally recounts the techniques described above, for use when the magnetometer 30 in the producer well 14 takes measurements when the magnetic dipole 28 is rotating at a constant frequency in the injector well 12.

In a first step 118, the three magnetic field $\vec{B}$ components from the rotating magnetic dipole 28 may be measured by the magnetometer 30 for a predetermined period of time (e.g., one second or one or more periods of rotation of the magnetic dipole 28). Such measurements may be denoted as $\{B_x(t_i)\}$, $\{B_y(t_i)\}$, and $\{B_z(t_i)\}$ for i=0, 2, 3, ..., N−1. The magnetic field components are represented in the (x,y,z) coordinate system defined by the magnetic dipole 28, in which the magnetic dipole 28 rotates around the z-axis in the plane of the x and y axes. The raw magnetometer 30 readings may be received by the data acquisition circuitry 42 before being stored in the database 44 or transmitted to the data processing circuitry 46. Particular examples of simulated magnetometer 30 readings are discussed above with reference to FIGS. 14 and 17.

In steps 120-124, the raw data collected in step 118 may be least squares fitted to sinusoidal curves. As such, in step 120, the data processing circuitry may minimize the quantities;

$$\chi_x^2 = \sum_i \{B_x(t_i) - A_x\cos(\omega_x t_i - P_x)\}^2,$$

$$\chi_y^2 = \sum_i \{B_y(t_i) - A_y\cos(\omega_y t_i - P_y)\}^2, \text{ and}$$

$$\chi_z^2 = \sum_i \{B_z(t_i) - A_z\cos(\omega_z t_i - P_z)\}^2,$$

where i=0, 2, 3, ..., N−1 with respect to $A_x$, $A_y$, $A_z$, $P_x$, $P_y$, $P_z$, $\omega_x$, $\omega_y$, and $\omega_z$. In step 122, the data processing circuitry 46 may compute an average angular frequency according to the equation $\overline{\omega}=(\omega_x+\omega_y+\omega_z)/3$. In step 124, the data processing circuitry may next minimize the quantities $$\chi_x^2 = \sum_i \{B_x(t_i) - A_x\cos(\overline{\omega} t_i - P_x)\}^2,$$

$$\chi_y^2 = \sum_i \{B_y(t_i) - A_y\cos(\overline{\omega} t_i - P_y)\}^2, \text{ and}$$

$$\chi_z^2 = \sum_i \{B_z(t_i) - A_z\cos(\overline{\omega} t_i - P_z)\}^2,$$

with respect to $A_x$, $A_y$, $A_z$, $P_x$, $P_y$, and $P_z$. Particular examples of the least squares fitting of step 124 are discussed above with reference to FIGS. 15 and 18.

The rotated frame of reference may be determined in steps 126 and 128. In step 126, the data processing circuitry 46 may calculate the rotation angle using the relationship $$\tan\tilde{\theta} = -\frac{A_x}{A_y}\frac{[\cos P_x \tan P_z - \sin P_x]}{[\cos P_y \tan P_z - \sin P_y]}.$$

In step 128, the data processing circuitry may obtain the direction γ from the z-axis of the magnetic dipole toward the magnetometer from γ=θ+n·π, where n=0,1.

In steps 130-138, the data processing circuitry 46 may determine the relative location of the magnetometer 30 to the rotating magnetic dipole 28. In step 130, the data processing circuitry 46 may calculate the magnetic field amplitudes $$H_{ox} = \frac{[A_x\cos P_x\cos\tilde{\theta} + A_y\cos P_y\sin\tilde{\theta}]}{\cos P_z} \text{ and}$$

$$H_{oy} = \frac{[A_x\cos P_x\sin\tilde{\theta} - A_y\cos P_y\cos\tilde{\theta}]}{\sin P_z}.$$

Based on the calculation of step 130, in step 132, the data processing circuitry 46 may next calculate the distance between the magnetic dipole and the magnetometer with $$\tilde{r} = \sqrt[3]{\frac{\mu_0 M}{4\pi |H_{oy}|}}.$$

In step 134, the data processing circuitry 46 may calculate the magnetometer's z position with $$\tilde{z} = \pm \tilde{r} \sqrt{\frac{2}{3}} \sqrt{1 \pm \frac{1}{2} \left| \frac{H_{ox}}{H_{oy}} \right|},$$

and in step 136, the data processing circuitry 46 may calculate the magnetometer's x position with $$x = \pm \frac{\tilde{r}^2}{3\tilde{z}\sqrt{1 + (\tan\tilde{\theta})^2}} \left| \frac{A_z}{H_{oy}} \right|.$$

The data processing circuitry 46 may finally calculate the magnetometer's y position with y=x tan θ̃ in step 138.

Based on the above steps 134-138, in step 140, the data processing circuitry 46 may output a relative location report 48 indicating the relative location of the magnetometer 30 to the magnetic dipole 28. Thus, the position of the magnetic dipole 28 in a coordinate system attached to the magnetometer is (−x,−y,−z̃). The information provided by the report 48 may be employed to steer the BHA 18 to drill a desired configuration. For example, the BHA 18 may be steered by the BHA control/MWD interface 50 such that the BHA 18 drills at an approximately constant distance (e.g., 4-6 m) above an existing well containing the magnetometer 30, which may create a SAGD well pair as illustrated in the well-drilling operation 10 of FIG. 1.

Figure 20A:
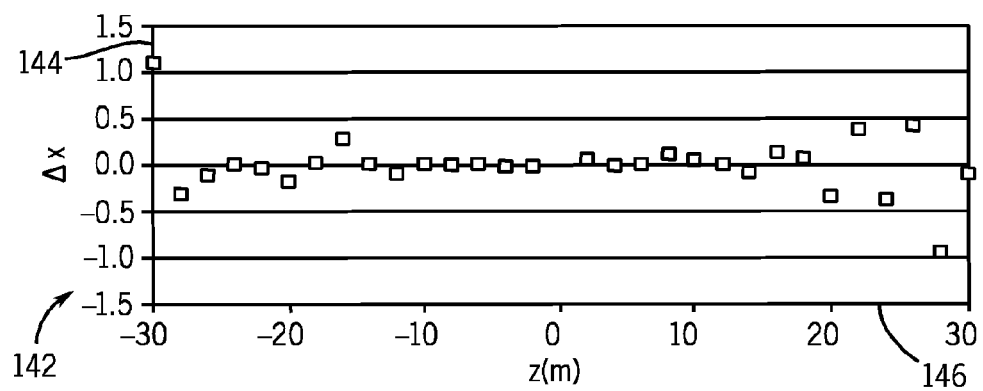
FIGS. 20A-C are plots illustrating distance errors using the technique of FIG. 19 in the x, y, and z directions, respectively.
Figure 20B:
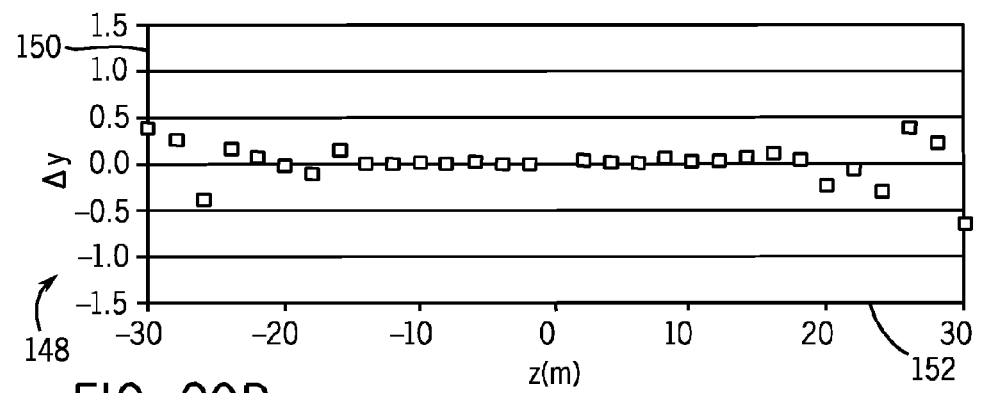
Figure 20C:
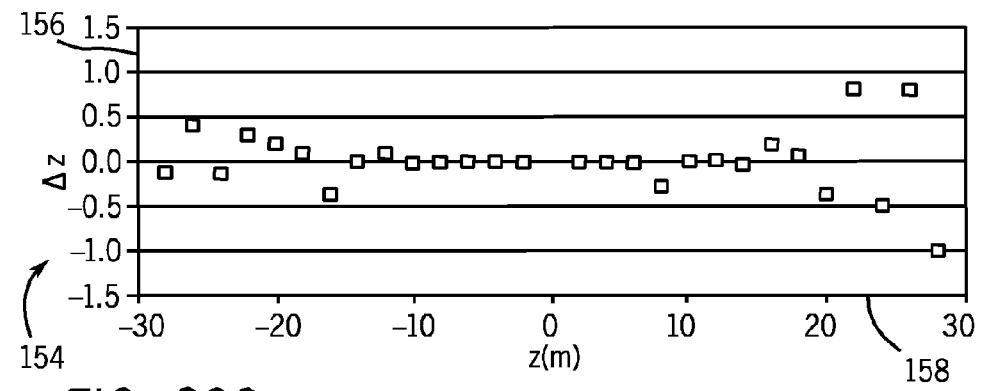

FIGS. 20A-C illustrate the amount of error associated with the above techniques when the magnetometer 30 is located at various distances from the magnetic dipole 28 along the z-axis. In FIGS. 20A-C, measurements are simulated as being taken along the line defined by x=5 m and y=2 m, with data points every 2 meters along the z direction at the points: z=−30, −28, −26, . . . , +28, +30 m. In this simulation, the coordinates of the observation point 52 are changing, while the magnetic dipole source remains at the origin. At the point z=0 m, the magnetometer 30 is directly below the magnetic dipole 28 in the (x,y,z) coordinate system. FIGS. 20A-C simulate what may occur when drilling the injector well 12, which contains the rotating magnetic dipole 28, while measuring the magnetic field $\vec{B}$ using the magnetometer 30 in the producer well 14 at a fixed location. Each data point in FIGS. 20A-C corresponds to a solution of the position of the magnetometer 30 using data from a single relative location to the magnetic dipole 28. The inferred position (x,y,z̃) of the magnetometer 30 relative to the magnetic dipole 28 can be compared to the "true" position (x,y,z) used to initially simulate the magnetic field $\vec{B}$. In practice, the desired quantity is the inferred position of the magnetic dipole relative to the magnetometer 30. This is given simply by (−x,−y,−z̃) in the coordinate system centered on the magnetometer 30. Hence, the information from the known position of the magnetometer 30 and the measured magnetic field $\vec{B}$ components can be used to steer the drill bit 20 in the injector well 12.

FIG. 20A represents a plot 142 of an error Δx=x̃−x, which indicates the difference between the value in the x-direction calculated according to the above-described techniques and the actual value of the x-direction, at various points in the z-direction. An ordinate 144 represents the error Δx=x̃−x in units of meters, while an abscissa 146 represents points in the z-direction in units of meters at which the magnetometer 30 obtained (simulated) measurements. As illustrated in the plot 142, the errors are less than 0.5 m over the range of z=−20 m to z=+20 m, and generally less than 1 m over the range of z=−30 m to z=+30 m. Note that there is no calculation possible at z=0 m since $B_z(t)$=0 at this location.

FIG. 20B similarly represents a plot 148 of an error Δy=ỹ−y, which indicates the difference between the value in the y-direction calculated according to the above-described techniques and the actual value of the y-direction, at various points in the z-direction. An ordinate 148 represents the error Δy=ỹ−y in units of meters, while an abscissa 152 represents points in the z-direction in units of meters at which the magnetometer 30 obtained (simulated) measurements. As illustrated in the plot 148, the errors are less than 0.5 m over the range of z=−20 m to z=+20 m, and generally less than 1 m over the range of z=−30 m to z=+30 m.

FIG. 20C similarly represents a plot 154 of an error Δz=z̃−z, which indicates the difference between the value in the z-direction calculated according to the above-described techniques and the actual value in the z-direction, at various points in the z-direction. An ordinate 156 represents the error Δz=z̃−z in units of meters, while an abscissa 158 represents points in the z-direction in units of meters at which the magnetometer 30 obtained (simulated) measurements. As illustrated in the plot 154, the errors are less than 0.5 m over the range of z=−20 m to z=+20 m, and generally less than 1 m over the range of z=−30 m to z=+30 m.

In the discussion above, the rotation of the magnetic dipole 28 in the BHA 18 has been assumed to be constant. However, the BHA 18 may not have a constant rotation frequency. Indeed, stick-slip and other drilling dynamics may cause the frequency to vary during a measurement cycle. Variations in frequency may be accommodated by modifying the previous formulas slightly. For example, the instantaneous frequency may increase or decrease during the measurement period as a chirp according to the following relationship:

$$f(t) = f_0 + f_1 t \quad (42),$$

where $f_0$ and $f_1$ are constants.

This type of variation is not unrealistic as the BHA rotation can be accelerating or decelerating. The angular frequency term becomes $$\omega(t) = \omega_0 + \omega_1 t = 2\pi(f_0 + f_1 t) \quad (43).$$

The measurements can be least squares fit to based on equations similar to Equation (27a):

$$\chi_x^2 = \sum_i \{B_x(t_i) - A_x \cos(\omega_x(t_i)t_i - P_x)\}^2; \quad (44a)$$

$$\chi_y^2 = \sum_i \{B_y(t_i) - A_y \cos(\omega_y(t_i)t_i - P_y)\}^2; \text{ and} \quad (44b)$$

$$\chi_z^2 = \sum_i \{B_z(t_i) - A_z \cos(\omega_z(t_i)t_i - P_z)\}^2, \quad (44c)$$

except that $\omega_j(t) = 2\pi(f_{0j} + f_{1j}t)$ for j=x, y, z are functions of time; the fitting parameters are: $A_x$, $P_x$, $f_{0x}$, $f_{1x}$, $A_y$, $P_y$, $f_{0y}$, $f_{1y}$, $A_z$, $P_z$, $f_{0z}$, and $f_{1z}$.

FIG. 21 illustrates a flowchart 160, which describes a general manner of drilling a new well, such as the injector well 12, proximate to an existing well, such as the producer well 14. The flowchart 160 generally recounts the techniques described above, as modified for use when the magnetometer 30 in the producer well 14 takes measurements when the magnetic dipole 28 is rotating at an increasing or decreasing frequency in the injector well 12, rather than when the magnetic dipole 28 is rotating at a constant frequency.

In a first step 162, the three magnetic field $\vec{B}$ components from the rotating magnetic dipole 28 may be measured by the magnetometer 30 for a predetermined period of time (e.g., two seconds or one or more periods of rotation of the magnetic dipole 28). Such measurements may be denoted as $\{B_x(t_i)\}$, $\{B_y(t_i)\}$, and $\{B_z(t_i)\}$ for i=0, 2, 3, ..., N–1. The magnetic field components are represented in the (x,y,z) coordinate system defined by the magnetic dipole 28, in which the magnetic dipole 28 rotates around the z-axis in the plane of the x and y axes. The raw magnetometer 30 readings may be received by the data acquisition circuitry 42 before being stored in the database 44 or transmitted to the data processing circuitry 46.

In steps 164-168, the raw data collected in step 162 may be least squares fitted to sinusoidal curves. As such, in step 164, the data processing circuitry may minimize the quantities $$\chi_x^2 = \sum_i \{B_x(t_i) - A_x\cos(2\pi(f_{0x} + f_{1x}t_i)t_i - P_x)\}^2,$$

$$\chi_y^2 = \sum_i \{B_y(t_i) - A_y\cos(2\pi(f_{0y} + f_{1y}t_i)t_i - P_y)\}^2, \text{ and}$$

$$\chi_z^2 = \sum_i \{B_z(t_i) - A_z\cos(2\pi(f_{0z} + f_{1z}t_i)t_i - P_z)\}^2,$$

where i=0, 2, 3, ..., N–1, with respect to $A_x$, $A_y$, $A_z$, $P_x$, $P_y$, $P_z$, $f_{0x}$, $f_{1x}$, $f_{0y}$, $f_{1y}$, $f_{0z}$, and $f_{1z}$. In step 166, the data processing circuitry 46 may compute an average angular frequency according to the equations $\overline{f}_0 = (f_{0x}+f_{0y}+f_{0z})/3$ and $\overline{f}_1 = (f_{1x}+f_{1y}+f_{1z})/3$. In step 168, the data processing circuitry may next minimize the quantities $$\chi_x^2 = \sum_i \{B_x(t_i) - A_x\cos(2\pi(\overline{f}_0 + \overline{f}_1 t_i)t_i - P_x)\}^2,$$

$$\chi_y^2 = \sum_i \{B_y(t_i) - A_y\cos(2\pi(\overline{f}_0 + \overline{f}_1 t_i)t_i - P_y)\}^2, \text{ and}$$

$$\chi_z^2 = \sum_i \{B_z(t_i) - A_z\cos(2\pi(\overline{f}_0 + \overline{f}_1 t_i)t_i - P_z)\}^2,$$

with respect to $A_x$, $A_y$, $A_z$, $P_x$, $P_y$, and $P_z$. A particular example of the least squares fitting of step 168 is discussed below with reference to FIG. 22.

The rotated frame of reference may be determined in steps 170 and 172. In step 170, the data processing circuitry 46 may calculate the rotation angle using the relationship $$\tan\tilde{\theta} = -\frac{A_x}{A_y}\frac{[\cos P_x \tan P_z - \sin P_x]}{[\cos P_y \tan P_z - \sin P_y]}.$$

In step 172, the data processing circuitry may obtain the direction γ from the z-axis of the magnetic dipole toward the magnetometer from γ=θ+n·π, where n=0,1.

In steps 174-182, the data processing circuitry 46 may determine the relative location of the magnetometer 30 to the rotating magnetic dipole 28. In step 174, the data processing circuitry 46 may calculate the magnetic field amplitudes $$H_{ox} = \frac{[A_x\cos P_x\cos\tilde{\theta} + A_y\cos P_y\sin\tilde{\theta}]}{\cos P_z} \text{ and}$$

$$H_{oy} = \frac{[A_x\cos P_x\sin\tilde{\theta} - A_y\cos P_y\cos\tilde{\theta}]}{\sin P_z}.$$

Based on the calculation of step 174, in step 176, the data processing circuitry 46 may next calculate the distance between the magnetic dipole and the magnetometer with $$\tilde{r} = \sqrt[3]{\frac{\mu_0 M}{4\pi|H_{oy}|}}.$$

In step 178, the data processing circuitry 46 may calculate the magnetometer's z position with $$\tilde{z} = \pm\tilde{r}\sqrt{\frac{2}{3}}\sqrt{1 \pm \frac{1}{2}\left|\frac{H_{ox}}{H_{oy}}\right|},$$

and in step 180, the data processing circuitry 46 may calculate the magnetometer's x position with $$x = \pm\frac{\tilde{r}^2}{3\tilde{z}\sqrt{1+(\tan\tilde{\theta})^2}}\left|\frac{A_z}{H_{oy}}\right|.$$

The data processing circuitry 46 may finally calculate the magnetometer's y position with y=x tan $\tilde{\theta}$ in step 182.

Based on the above steps 174-182, in step 184, the data processing circuitry 46 may output a relative location report 48 indicating the relative location of the magnetometer 30 to the magnetic dipole 28. Thus, the position of the magnetic dipole 28 in a coordinate system attached to the magnetometer is (−x,−y,−$\tilde{z}$). The information provided by the report 48 may be employed to steer the BHA 18 to drill a desired configuration. For example, the BHA 18 may be steered by the BHA control/MWD interface 50 such that the BHA 18 drills at an approximately constant distance (e.g., 4-6 m) above an existing well containing the magnetometer 30, which may create a SAGD well pair as illustrated in the well-drilling operation 10 of FIG. 1.

Figure 22:
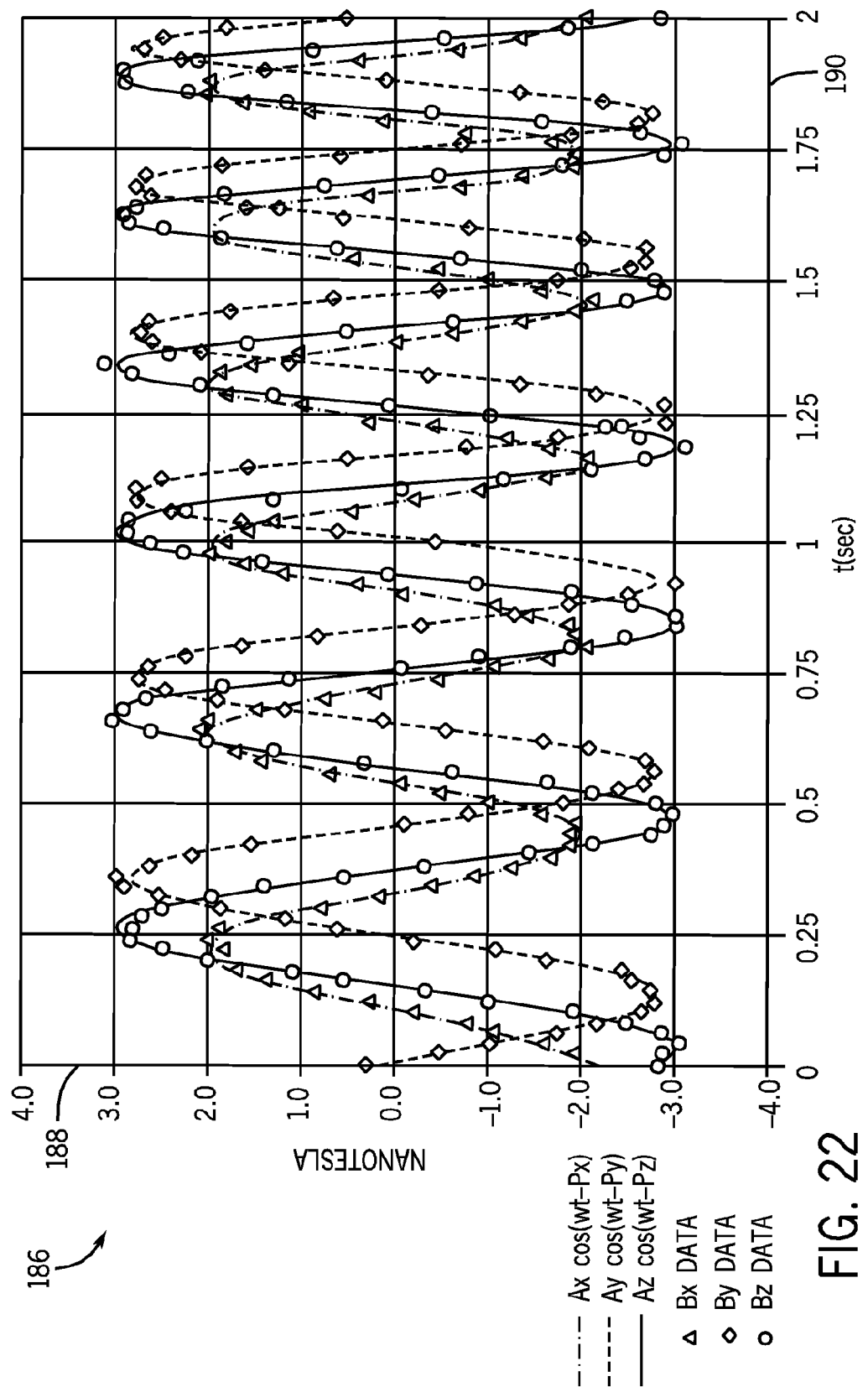
FIG. 22 is a plot of sinusoids least squares fit to noisy three-axis measurements of a magnetic field caused by a magnetic dipole rotating at an increasing frequency, in accordance with an embodiment.

FIG. 22 provides a plot 186 of simulated measurements for a magnetic dipole 28 rotating at an increasing or decreasing frequency. In the example of FIG. 22, M=100 Amp-m², and the coordinates of the observation point 52 are x=5 m, y=2 m, and z=−14 m, with $f_0$=2 Hz and $f_1$=0.5 Hz/sec. As such, the instantaneous frequency is 2 Hz at the beginning of the measurement and 3 Hz at the end of the measurement. Because real data will be noisy, random numbers will be used to simulate noise with a standard deviation of 0.1 nanoTesla. The noise is added to magnetic field components calculated using Equations (13a), (13b), and (13c) and, as in the examples described above, a tilde will be used in the following equations to indicate measured quantities. For example, $\{B_x(t_i)\}$, $\{B_y(t_i)\}$, and $\{B_z(t_i)\}$ refer to N measured signals obtained at times $t_i$, $i=0, \ldots, N-1$. The vector $\vec{r}$ will be suppressed in the notation for measured quantities. It should be noted that the objective is to determine the observation point ($\vec{r}$) with respect to the rotating magnetic dipole located at (0,0,0). The three unknown quantities are x, y, and z, while the four known quantities are M and the three-axis magnetometer 30 readings.

In FIG. 22, the plot 186 represents simulated data obtained by the magnetometer 30 that has been least squares fit to sinusoids. An ordinate 188 represents a least squares fitting of the magnetic field components of $\vec{B}$ in units of nanoTesla, and an abscissa 190 represents time in units of seconds. In the plot 186, a triangle represents a data point of a measurement of the x-component of the magnetic field, $\{B_x(t_i)\}$, a diamond represents a data point of a measurement of the y-component of the magnetic field, $\{B_y(t_i)\}$, and a circle represents a data point of a measurement of the z-component of the magnetic field, $\{B_z(t_i)\}$. The three field components are simulated as sampled 100 times with a time interval of 0.02 seconds, for a total measurement time of 2 seconds.

The least squares fitting of FIG. 22 may be determined in two steps. A first least squares fitting may employ Equations (44a), (44b), and (44c) to obtain $A_x$, $A_y$, $A_z$, $P_x$, $P_y$, $P_z$, $f_{x0}$, $f_{x1}$, $f_{y0}$, $f_{y1}$, $f_{z0}$, and $f_{z1}$. Next, the frequencies may be averaged to provide the results $\overline{f_0}=(f_{0x}+f_{0y}+f_{0z})/3=1.99$ Hz and $\overline{f_1}=(f_{1x}+f_{1y}+f_{1z})/3=0.5004$ Hz/sec. A second least squares fitting may employ Equations (44a), (44b), and (44c) with all three magnetic field components forced to have the same time dependence with $\overline{f_0}$ and $\overline{f_1}$. The parameters, $A_x$, $A_y$, $A_z$, $P_x$, $P_y$, and $P_z$ may be allowed to float in minimizing $\chi_x^2$, $\chi_y^2$, and $\chi_z^2$. The resulting functions $A_x \cos(2\pi(\overline{f_0}+\overline{f_1}t)t-P_x)$, $A_y \cos(2\pi(\overline{f_0}+\overline{f_1}t)t-P_y)$, and $A_z \cos(2\pi(\overline{f_0}+\overline{f_1}t)t-P_z)$ may be fit to the data $\{B_x(t_i)\}$, $\{B_y(t_i)\}$ and $\{B_z(t_i)\}$, and appear as a dash-dotted line, a dashed line, and a solid line, respectively, in the plot 186 of FIG. 22.

Based on the least squares fitting of FIG. 22, the relative location of the magnetometer 30 to the magnetic dipole 28 may be determined. Equation (33) may be used to compute the angle $\tilde{\theta}$, which gives the direction from the observation point to the z-axis, and where $\tan \tilde{\theta}=y/x$ can be used to eliminate one unknown quantity. The results are thus $\tan \tilde{\theta}=0.395$ and $\tilde{\theta}=0.376$ radians. Next, Equations (35) and (36) may respectively be used to obtain $H_{ox}=1.81$ nanoTesla and $H_{oy}=3.01$ nanoTesla, and yields $\tilde{r}=14.93$ m with an error $\Delta r=\tilde{r}-r=-0.07$ m. Finally, Equation (39) yields $\tilde{z}=-13.90$ m with an error $\Delta z=\tilde{z}-z=0.10$ m, Equation (40) yields $\tilde{x}=4.91$ m with an error $\Delta x=\tilde{x}-x=-0.09$ m, and Equation (41) yields $\tilde{y}=1.94$ m with an error $\Delta y=\tilde{y}-y=-0.06$ m.

Figure 23A:
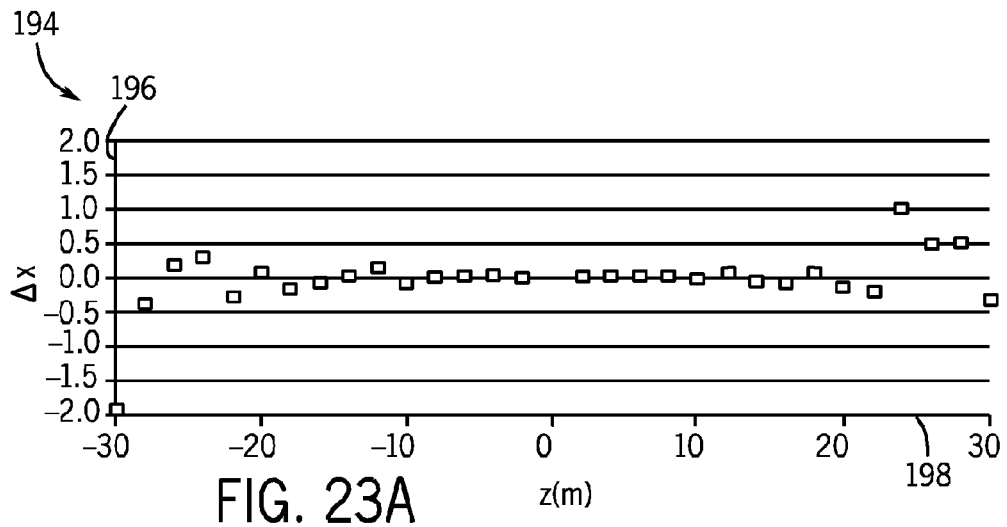
FIGS. 23A-C are plots illustrating distance errors using the technique of FIG. 21 in the x, y, and z directions, respectively.
Figure 23B:
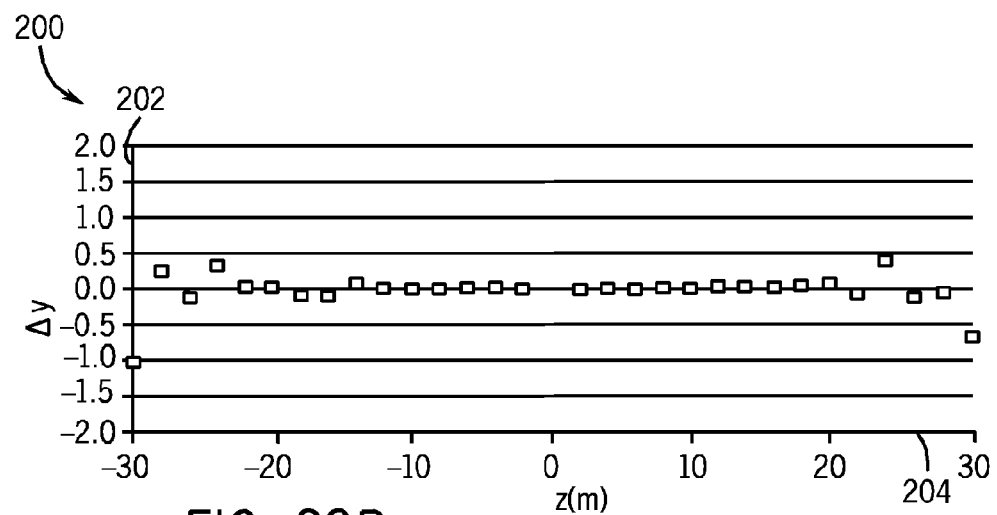
Figure 23C:
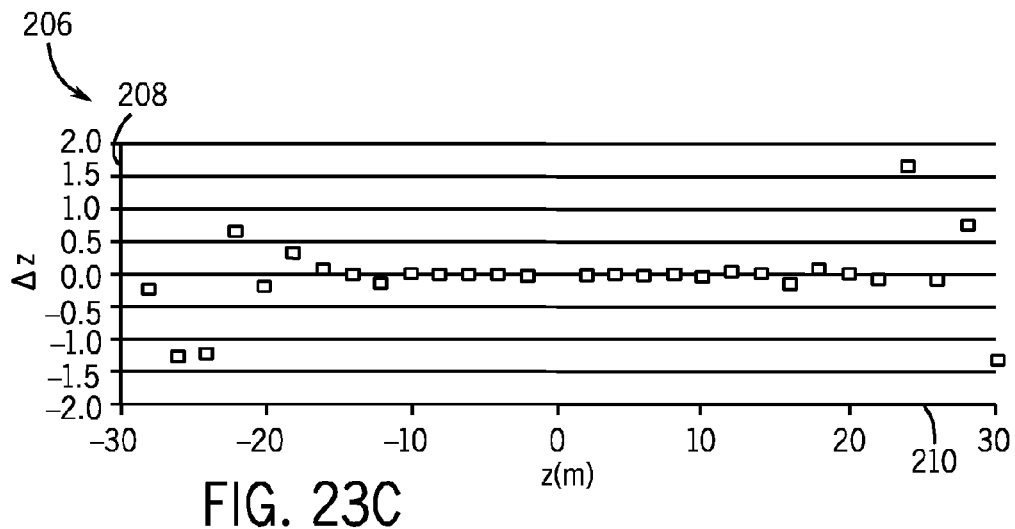

FIGS. 23A-C illustrate the error of the above-described techniques used when the magnetic dipole 28 is rotating at an increasing or decreasing frequency for a series of (simulated) magnetometer 30 readings at various distances from the magnetic dipole 28 in the z-direction. In FIGS. 23A-C, measurements are simulated as being taken along the line defined by x=5 m and y=2 m, with data points every 2 meters along the z direction at the points: z=−30, −28, −26, . . . , +28, +30 m. At the point z=0 m, the magnetometer 30 is directly below the magnetic dipole 28 in the (x, y, z) coordinate system. FIGS. 23A-C simulate what may occur when drilling the injector well 12, which contains the rotating magnetic dipole 28, while measuring the magnetic field $\vec{B}$ using the magnetometer 30 in the producer well 14 at various fixed locations. Each data point in FIGS. 23A-C corresponds to a solution of the position of the magnetometer 30 using data from a single relative location to the magnetic dipole 28. The inferred position $(\tilde{x}, \tilde{y}, \tilde{z})$ of the magnetometer 30 relative to the magnetic dipole 28 can be compared to the "true" position (x,y,z) used to initially simulate the magnetic field $\vec{B}$.

FIG. 23A represents a plot 194 of an error $\Delta x = \tilde{x}-x$, which indicates the difference between the value in the x-direction calculated according to the techniques described with reference to the flowchart 160 of FIG. 21, and the actual value of the x-direction, determined at various points in the z direction. An ordinate 196 represents the error $\Delta x = \tilde{x}-x$ in units of meters, while an abscissa 198 represents points in the z-direction in units of meters at which the magnetometer 30 obtained (simulated) measurements. As illustrated in the plot 194, the errors are less than 0.5 m over the range of z=−20 m to z=+20 m, and generally less than 1 m over the range of z=−30 m to z=+30 m. Note that there is no calculation possible at z=0 m since $B_z(t)=0$ at this location.

FIG. 23B similarly represents a plot 200 of an error $\Delta y = \tilde{y} - y$, which indicates the difference between the value in the y-direction calculated according to the techniques described with reference to the flowchart 160 of FIG. 21, and the actual value of the y-direction, determined at various points in the z direction. An ordinate 202 represents the error $\Delta y = \tilde{y}-y$ in units of meters, while an abscissa 204 represents points in the z-direction in units of meters at which the magnetometer 30 obtained (simulated) measurements. As illustrated in the plot 200, the errors are less than 0.5 m over the range of z=−20 m to z=+20 m, and generally less than 1 m over the range of z=−30 m to z=+30 m.

FIG. 23C similarly represents a plot 206 of an error $\Delta z = \tilde{z}-z$, which indicates the difference between the value in the z-direction calculated according to the techniques described with reference to the flowchart 160 of FIG. 21, and the actual value of the z-direction, determined at various points in the z direction. An ordinate 208 represents the error $\Delta z = \tilde{z}-z$ in units of meters, while an abscissa 210 represents points in the z-direction in units of meters at which the magnetometer 30 obtained (simulated) measurements. As illustrated in the plot 148, the errors are less than 0.5 m over the range of z=−20 m to z=+20 m, and generally less than 1 m over the range of z=−30 m to z=+30 m.

Figure 24:
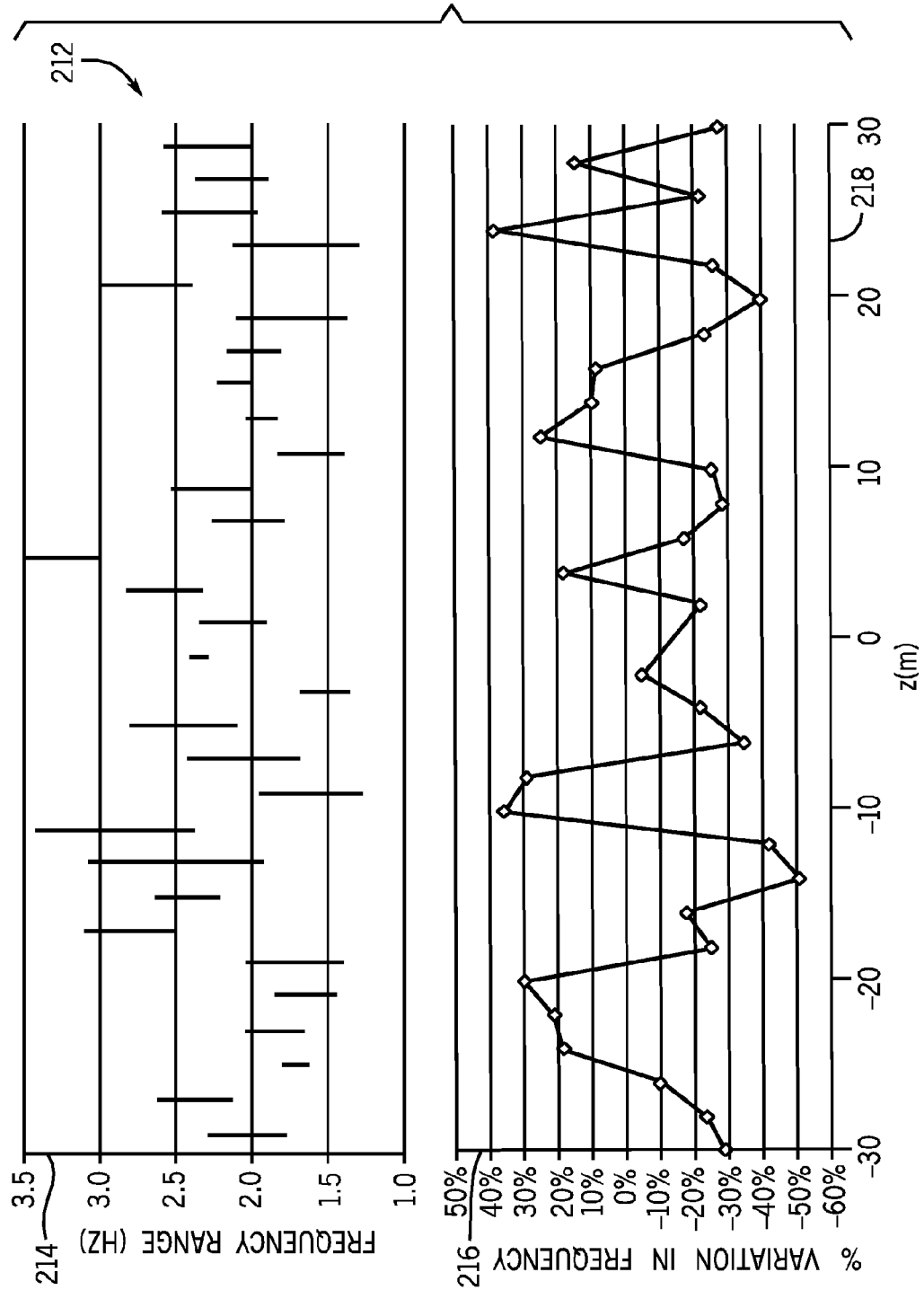
FIG. 24 is a plot describing variations in frequency and frequency range associated with simulated measurements taken at various points along in the z-direction using the technique of FIG. 21, in accordance with an embodiment.

FIG. 24 provides a plot 212 comparing variations in frequency simulated in the data obtained relating to the plots 194, 200, and 206 of FIGS. 23A-C, respectively. In the plot 212, a first ordinate 214 represents a range of the frequency of rotation of the magnetic dipole 28 in units of Hertz, a second ordinate 216 represents the variation in the frequency of rotation of the magnetic dipole 28 that occurred in each magnetometer 30 reading, and an abscissa 218 represents points in the z-direction in units of meters at which the magnetometer 30 obtained (simulated) measurements. As illustrated in the plot 212 and in view of the plots 194, 200, and 206 of FIGS. 23A-C, variations in frequency may reach beyond ±40% and the least squares process may successfully determine the relative location of the magnetometer 30 to the magnetic dipole 28.

The method of the flowchart 160 of FIG. 21 may be modified to include a second order term. The second order term, $f_2$, may be incorporated in the definition of the frequency of rotation of the magnetic dipole 28 as follows:

$$f(t)=f_0+f_1t+f_2t^2 \tag{45}$$

The method of the flowchart 160 may be otherwise unchanged. However, including such higher order terms may particularly benefit from a good signal to noise ratio.

Under certain circumstances, the rotation of the magnetic dipole 28 may be arbitrary. A more general approach is possible where the measured magnetic field components, $\{B_x(t_i)\}$, $\{B_y(t_i)\}$, and $\{B_z(t_i)\}$, are used directly without fitting them to sinusoidal or other functions. Note that the three magnetic field components are measured at the same times $\{t_i\}$ for i=0, 2, 3, ..., N−1. A more general approach may not make assumptions about the time dependence other than that the magnetic dipole rotates and data are obtained over at least one rotation. From Equation (14), the magnetic field in the rotated frame can be written as follows:

$$H_x(t) = \cos\theta B_x(t) + \sin\theta B_y(t) \tag{46}$$

The angle of rotation θ should be chosen such that $\{H_x(t_i)\}$ is in phase with $\{B_z(t_i)\}$. The angle θ may be determined by minimizing the following quantity with respect to the parameters θ and C as follows:

$$\chi^2 = \sum_i \{CH_x(t_i) - B_z(t_i)\}^2 \tag{47}$$
$$= \sum_i \{C[\cos\theta B_x(t_i) + \sin\theta B_y(t_i)] - B_z(t_i)\}^2.$$

The scaling factor, C, from least squares fitting Equation (47) relates $\{H_x(t_i)\}$ to $\{B_z(t_i)\}$ in an average sense via the following relationship:

$$\frac{H_x(t)}{B_z(t)} = \frac{1}{C}. \tag{48}$$

Hence, the angle of rotation $\tilde{\theta}$ and C may be obtained from the three magnetic field components. The two transverse magnetic field components in the rotated frame may be determined as follows:

$$\begin{bmatrix} H_x(t_i) \\ H_y(t_i) \end{bmatrix} = \begin{bmatrix} \cos\tilde{\theta} & \sin\tilde{\theta} \\ -\sin\tilde{\theta} & \cos\tilde{\theta} \end{bmatrix} \begin{bmatrix} B_x(t_i) \\ B_y(t_i) \end{bmatrix}. \tag{49}$$

FIGS. 25-28 illustrate an example in which the magnetic dipole 28 may rotate arbitrarily. In the example of FIGS. 25-28, the magnetic dipole strength is M=100 Amp-m², the simulated noise is 0.1 nanoTesla, x=5 m, y=2 m, and z=12 m, and 100 samples are simulated over a 2 second measurement period. To indicate measured quantities, a tilde will be used in the following equations. For example, $\{\tilde{B}_x(t_i)\}$, $\{\tilde{B}_y(t_i)\}$, and $\{\tilde{B}_z(t_i)\}$ refer to N measured signals obtained at times $t_i$, i= 0, ..., N−1. The three unknown quantities are x, y, and z, while the four known quantities are M and the three-axis magnetometer 30 readings. Based on the following discussion, the unknown quantities may be determined.

Figure 25:
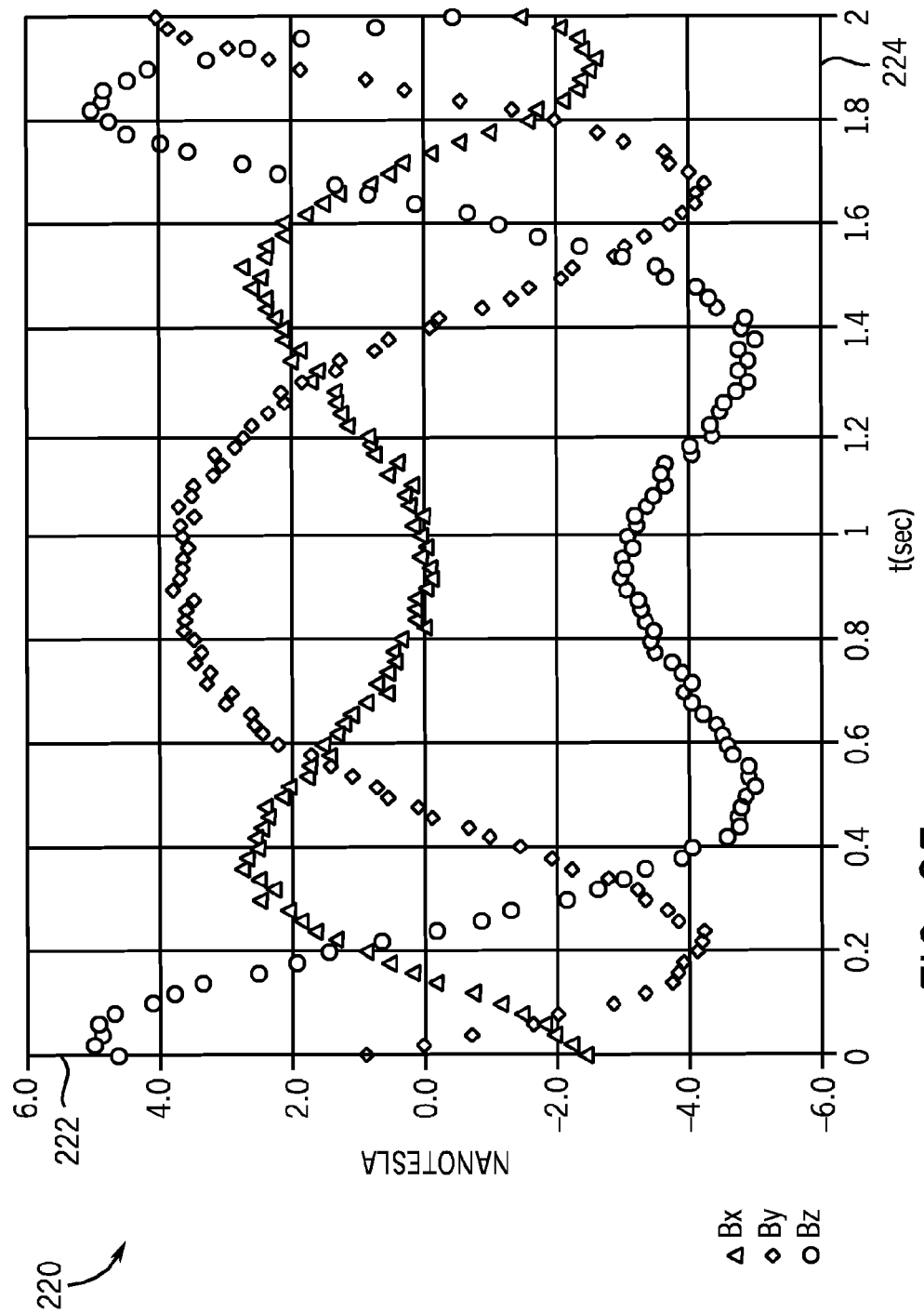
FIG. 25 is a plot simulating noisy three-axis measurements of a magnetic dipole rotating at an arbitrary frequency, in accordance with an embodiment.

Turning to FIG. 25, a plot 220 represents simulated data obtained by the magnetometer 30 when the magnetic dipole 28 is rotating arbitrarily, M=100 Amp-m², x=5 m, y=2 m, and z=12 m. An ordinate 222 represents a measurement of the magnetic field components of $\vec{B}$ in units of nanoTesla, and an abscissa 224 represents time in units of seconds. In the plot 220, a triangle represents a data point of a measurement of the x-component of the magnetic field, $\{\tilde{B}_x(t_i)\}$, a diamond represents a data point of a measurement of the y-component of the magnetic field, $\{\tilde{B}_y(t_i)\}$, and a circle represents a data point of a measurement of the z-component of the magnetic field, $\{\tilde{B}_z(t_i)\}$. The magnetometer 30 is assumed to have simultaneously sampled each magnetic field component every 0.02 seconds for a total measurement time of two seconds, producing 100 data points for each magnetic field component. As apparent in the plot 220 of FIG. 25, there is a significant slowdown of the BHA 18 rotation from 1.5 Hz to 0.7 Hz in 2 seconds, with non-periodic time dependence.

Figure 26:
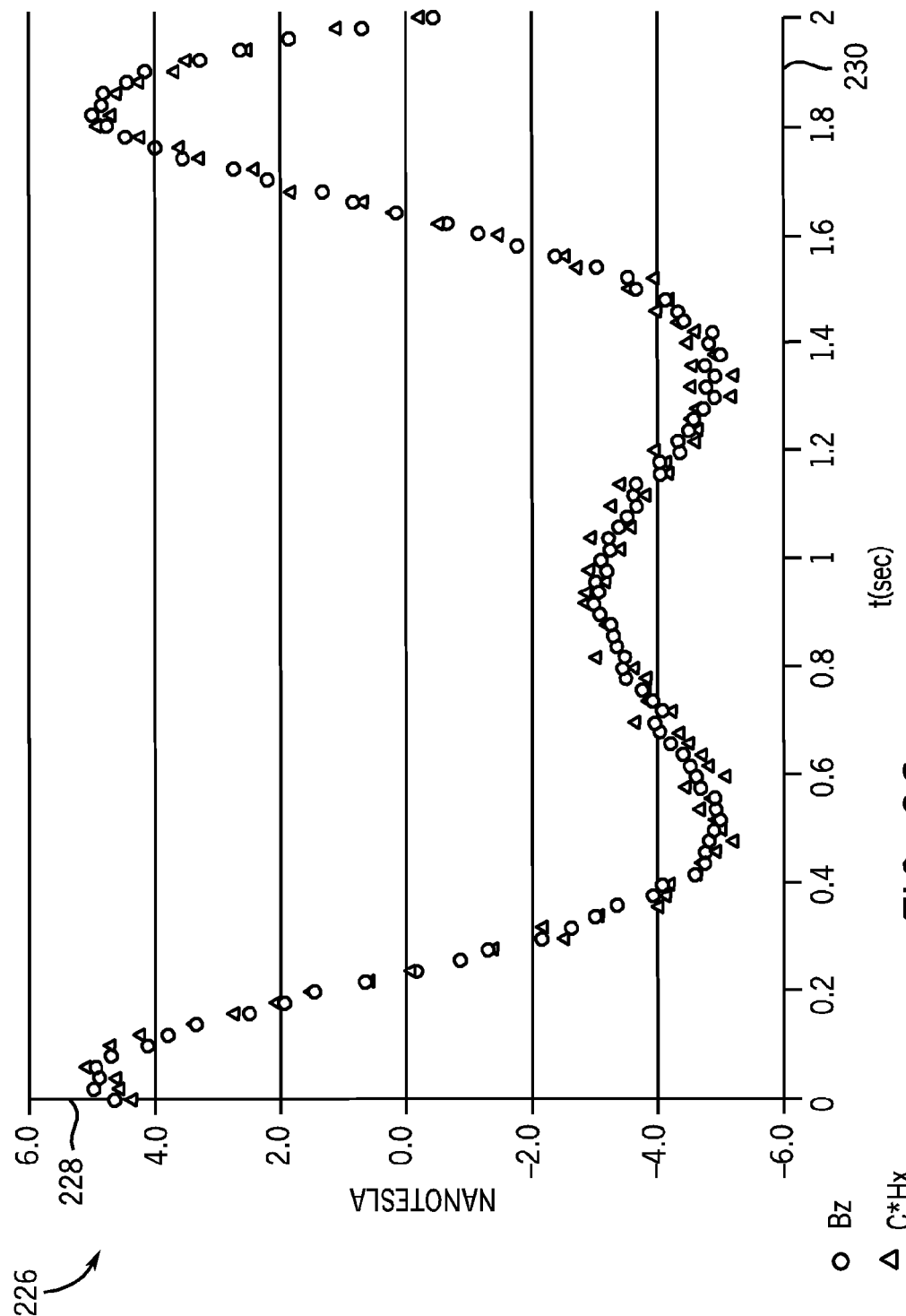
FIG. 26 is a plot in which the simulated measurements of FIG. 25 are rotated and scaled such that the phase of a transverse magnetic field component has the same phase as the is aligned with an axial magnetic field component, in accordance with an embodiment.

FIG. 26 illustrates a plot 226 of the measured data of FIG. 25 that has been least squares fit such that $\{C \tilde{H}_x(t_i)\}$ is fit to $\{\tilde{B}_z(t_i)\}$. An ordinate 228 represents a least squares fitting of $\{C \tilde{H}_x(t_i)\}$ to $\{\tilde{B}_z(t_i)\}$ in units of nanoTesla, and an abscissa 230 represents time in units of seconds. In the plot 226, a triangle represents a data point of a measurement of the rotated and scaled x'-component of the magnetic field, $\{C \tilde{H}_x(t_i)\}$, and a circle represents a data point of a measurement of the z-component of the magnetic field, $\{\tilde{B}_z(t_i)\}$. The least squares fitting of FIG. 26 may be determined by minimizing $\chi^2$ in Equation (47) to produce $\tilde{\theta}$=3.515 radians and C=2.259. As illustrated in FIG. 26, the two data sets $\{C \tilde{H}_x(t_i)\}$ and $\{\tilde{B}_z(t_i)\}$ now overlay in the rotated frame.

Figure 27:
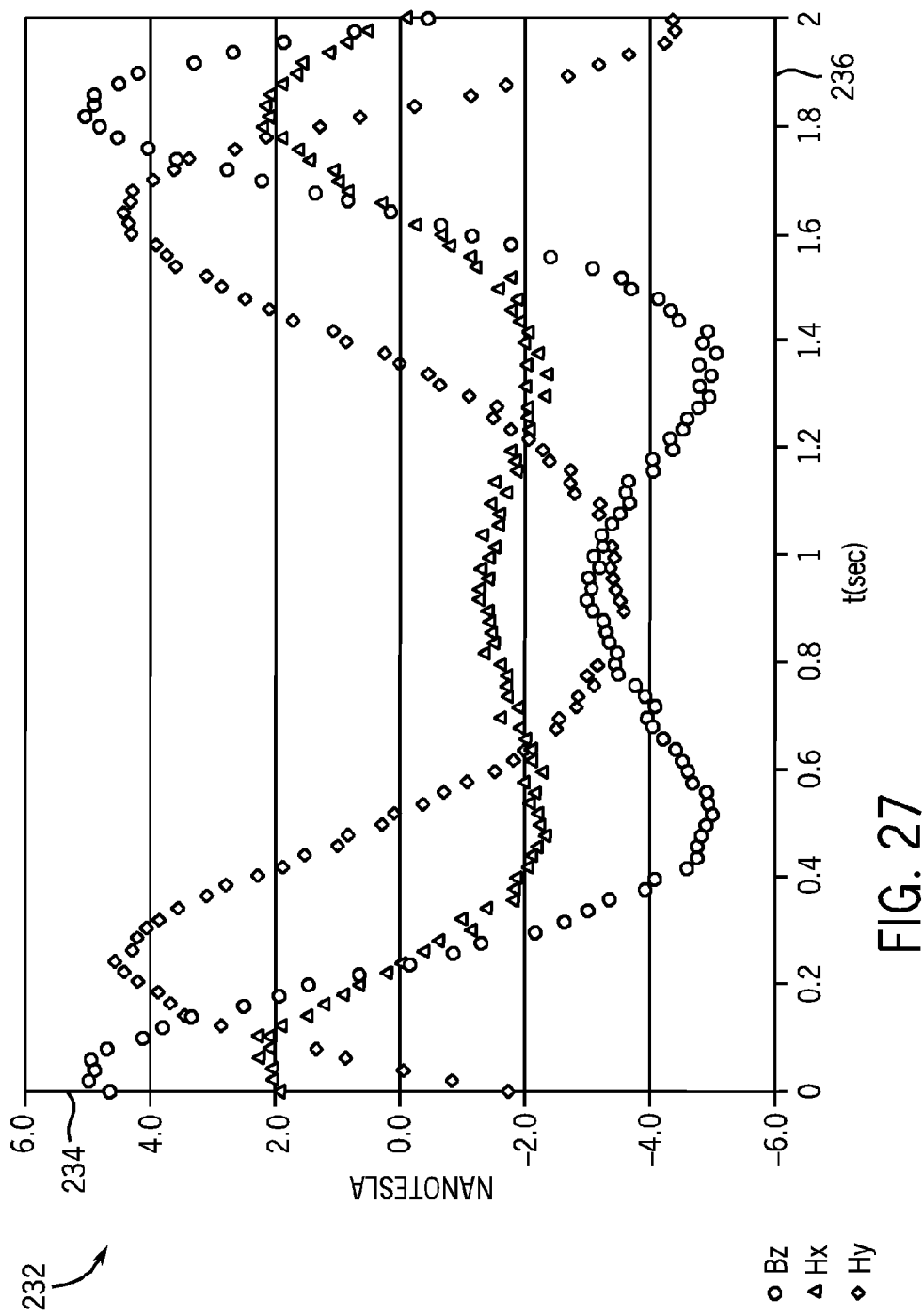
FIG. 27 is a plot in which the simulated measurements of FIG. 25 are transformed based on the rotation of FIG. 26, in accordance with an embodiment.

FIG. 27 illustrates a plot 232 of the rotated magnetic field data, which may be obtained by applying Equation (49) with $\tilde{\theta}$=3.515 radians. An ordinate 234 represents the magnetic field components in the rotated frame in units of nanoTesla, and an abscissa 236 represents time in units of seconds. In the plot 232, a triangle represents a data point of a measurement of the rotated x'-component of the magnetic field, $\{\tilde{H}_x(t_i)\}$, a diamond represents a data point of a measurement of the rotated y'-component of the magnetic field, $\{\tilde{H}_y(t_i)\}$, and a circle represents a data point of a measurement of the z-component of the magnetic field, $\{\tilde{B}_z(t_i)\}$. The rotated magnetic field component, $\{\tilde{H}_x(t_i)\}$, is in-phase with $\{\tilde{B}_z(t_i)\}$.

Once the fields in the rotated frame have been obtained, as illustrated in FIG. 27, it may be possible to calculate the location of the observation point with respect to the arbitrarily rotating magnetic dipole 28. In the prior examples, the amplitudes and phases of the sinusoidal functions were used; in this case, the maximum values for the magnetic field components are used. First, maximum amplitudes of the magnetic field components in the rotated frame of reference may be defined according to the following relationships:

$$H_{xm} = \max\{|\tilde{H}_x(t_i)|\} \tag{50a}$$

$$H_{ym} = \max\{|\tilde{H}_y(t_i)|\} \tag{50b); and}$$

$$B_{zm} = \max\{|\tilde{B}_z(t_i)|\} \tag{50c}$$

For good accuracy, there should be a sufficient density of measurements such that the true peak values are obtained. The distance $\tilde{r}$ may be obtained from the following relationship:

$$\tilde{r} = \sqrt[3]{\frac{\mu_0 M}{4\pi |H_{ym}|}}. \tag{51}$$

The $\tilde{z}$ coordinate may be obtained from the following relationship:

$$\tilde{z} = \pm \tilde{r}\sqrt{\frac{2}{3}}\sqrt{1 \pm \frac{1}{2}\left|\frac{H_{xm}}{H_{ym}}\right|}. \tag{52}$$

As in the techniques described above, the correct signs must be chosen for the result to be reasonable. The x coordinate may be obtained from the following equation:

$$x = \pm \frac{\tilde{r}^2}{3\tilde{z}\sqrt{1+(\tan\tilde{\theta})^2}}\left|\frac{B_{zm}}{H_{ym}}\right|. \quad (53)$$

The y coordinate may be obtained from the following relationship:

$$y = x \tan\tilde{\theta}. \quad (54)$$

For the data employed by the example illustrated by FIGS. 25-28, $H_{xm}$=2.30 nanoTesla, $H_{ym}$=4.54 nanoTesla, and $B_{zm}$=5.02 nanoTesla. The results for the observation point are x=4.89 m, y=1.92 m, and $\tilde{z}$=11.90 m, with errors of $\Delta x$=−0.11 m, $\Delta y$=−0.08 m, and $\Delta z$=−0.10 m.

One advantage of the approach discussed above with reference to Equations (50)-(54) is that no assumption is made regarding the time dependence of the magnetic dipole 28; thus, arbitrary rotation may be accommodated. A disadvantage, however, is that the measurement accuracy may be worse because Equations (51)-(53) rely on a single data point for each magnetic field component. The statistical accuracy for a single datum is poorer than that for a large number of points fit to function. In addition, if the sample density is too small, then the true peak value of the field may not be obtained.

Figure 28:
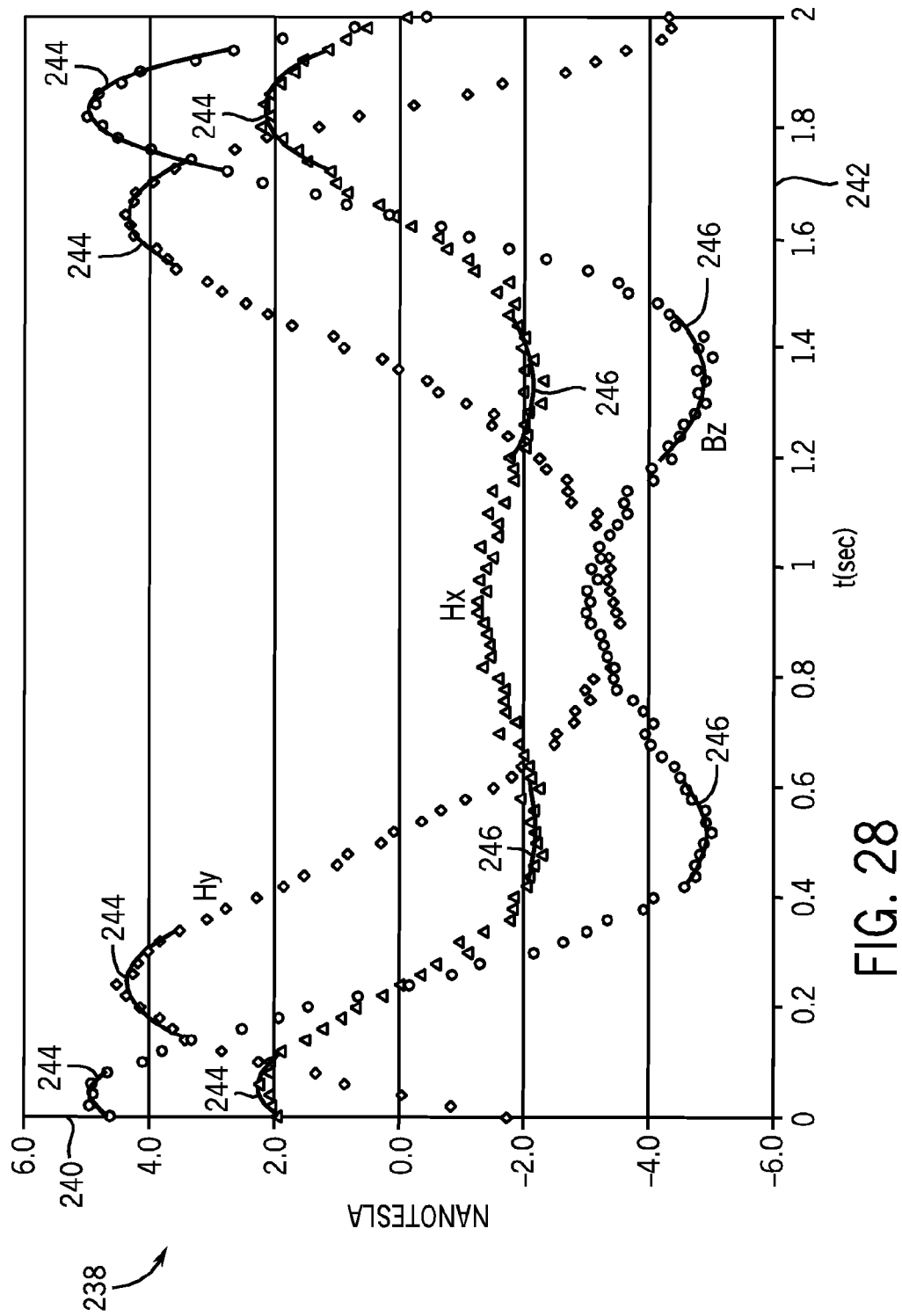
FIG. 28 is a plot in which extrema of the transformed measurements of FIG. 27 are fitted to determine a maximum amplitude of each component of the measurements, in accordance with an embodiment.

FIG. 28 illustrates a plot 238 illustrating an alternative manner of determining the peak amplitudes of the rotated magnetic field components. The two deficiencies discussed above may be ameliorated by fitting the data to a function of the following form:

$$F(t) = A + B(T-t)^2 \quad (55),$$

where A, B, and T are fitting parameters, and the extremum A is obtained at t=T.

The plot 238 of FIG. 28 illustrates the application of Equation (55) to the data of the plot 232 of FIG. 27. Particularly, an ordinate 240 represents the fitting of the magnetic field maxima and minima in units of nanoTesla, and an abscissa 242 represents time in units of seconds. In the plot 238, a triangle represents a data point of a measurement of the rotated x'-component of the magnetic field, $\{H_x(t_i)\}$, a diamond represents a data point of a measurement of the rotated y'-component of the magnetic field, $\{H_y(t_i)\}$, and a circle represents a data point of a measurement of the z-component of the magnetic field, $\{B_z(t_i)\}$. Fittings of the maxima 244 and minima 246 of the data are illustrated with a solid line. Averaging the peak absolute values for the three magnetic field components yields $H_{xm}$=2.16±0.01 nanoTesla, $H_{ym}$=4.35±0.01 nanoTesla, and $B_{zm}$=4.94±0.04 nanoTesla, where the standard deviations of the individual peaks are also quoted. Using these values in Equations (51) to (54) produces an improvement in the results: x=5.10 m, y=2.00 m, and $\tilde{z}$=12.03 m, with errors of $\Delta x$=0.10 m, $\Delta y$=0.00 m, and $\Delta z$=0.03 m.

Other approaches to obtaining the extrema of $H_{xm}$, $H_{ym}$, and $B_{zm}$ may be followed. For example, the magnetic field $\vec{B}$ measurement data can be least squares fit to polynomials before or after rotation by the angle $\tilde{\theta}$. Another approach is to perform a Fourier transform into the frequency domain, filtering the data in the frequency domain to reduce noise, and then transforming into the time domain. Such an approach may result in smoothed functions from which the extrema may be selected.

Figure 29:
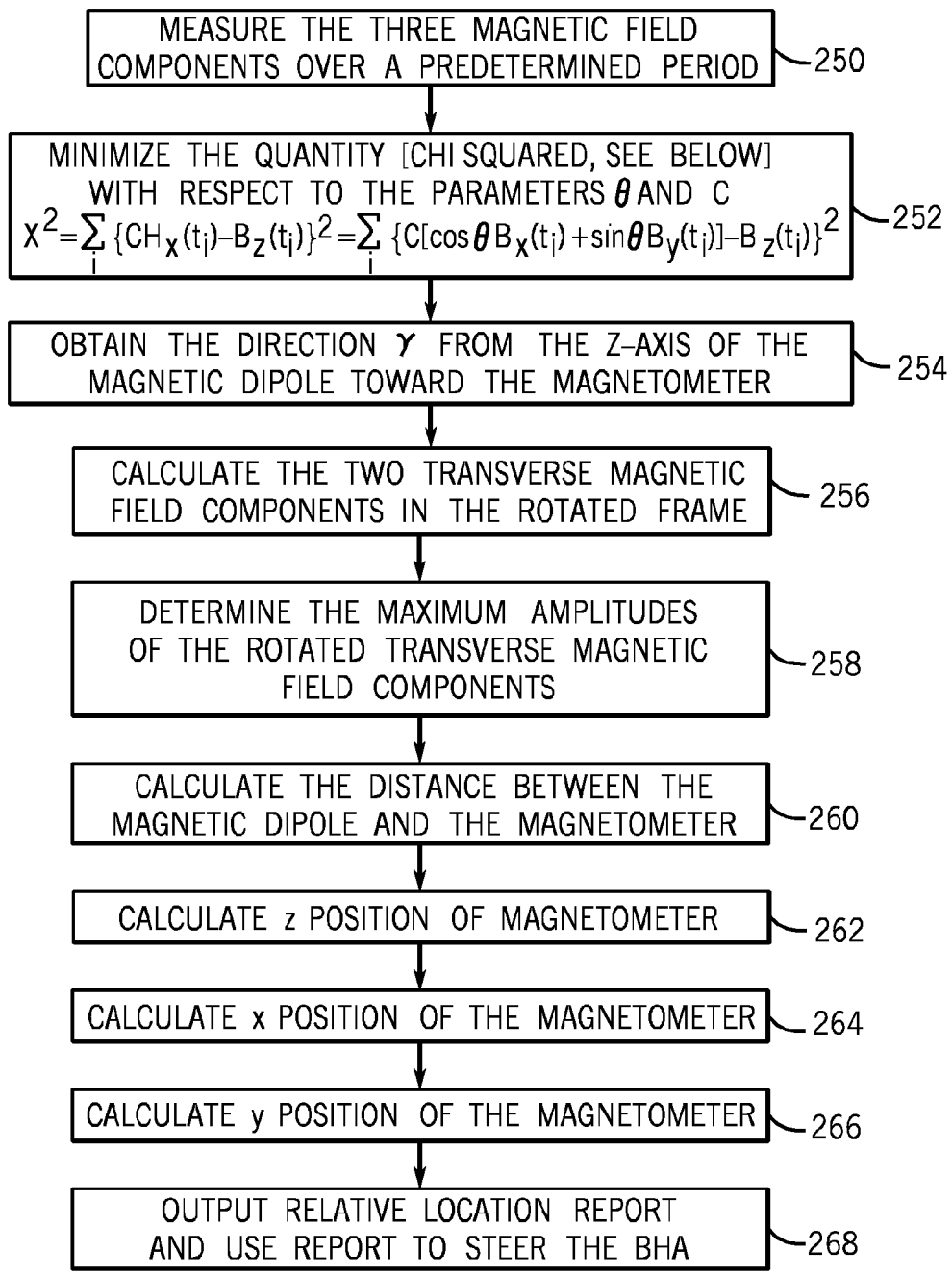
FIG. 29 is a flowchart describing a method of determining a relative location between a magnetometer and a magnetic dipole rotating at an arbitrary frequency by transforming magnetic field measurements into a rotated reference frame, in accordance with an embodiment.

FIG. 29 illustrates a flowchart 248, which describes a general manner of drilling a new well, such as the injector well 12, proximate to an existing well, such as the producer well 14, when the magnetic dipole 28 rotates arbitrarily. The flowchart 248 generally recounts the techniques described above, as modified for use when the magnetometer 30 in the producer well 14 takes measurements when the magnetic dipole 28 is rotating at an arbitrary frequency in the injector well 12, rather than when the magnetic dipole 28 is rotating at a constant, increasing, or decreasing frequency.

In a first step 250, the three magnetic field components of $\vec{B}$ from the arbitrarily rotating magnetic dipole 28 may be measured by the magnetometer 30 for a predetermined period of time (e.g., two seconds or one or more periods of rotation of the magnetic dipole 28). Such measurements may be denoted as $\{B_x(t_i)\}$, $\{B_y(t_i)\}$, and $\{B_z(t_i)\}$ for i=0, 2, 3, ..., N−1. The magnetic field components are represented in the (x,y,z) coordinate system defined by the magnetic dipole 28, in which the magnetic dipole 28 rotates around the z-axis in the plane of the x and y axes. The raw magnetometer 30 readings may be received by the data acquisition circuitry 42 before being stored in the database 44 or transmitted to the data processing circuitry 46.

In step 252, the raw data collected in step 250 may be scaled and fitted such that the rotated magnetic field component, $\{H_x(t_i)\}$, is in-phase with $\{B_z(t_i)\}$. As such, in step 252, the data processing circuitry may minimize the quantity with respect to the parameters $\theta$ and C, $$\chi^2 = \sum_i \{CH_x(t_i) - B_z(t_i)\}^2$$
$$= \sum_i \{C[\cos\theta B_x(t_i) + \sin\theta B_y(t_i)] - B_z(t_i)\}^2.$$

A particular example of the least squares fitting of step 252 is discussed above with reference to FIG. 26.

The rotated frame of reference may be determined in steps 254 and 256. In step 254, the data processing circuitry 46 may obtain the direction γ from the z-axis of the magnetic dipole toward the magnetometer from γ=$\tilde{\theta}$+n·π, where n=0,1. It should be noted that $\tilde{\theta}$ may be obtained from step 252. In step 256, the data processing circuitry may calculate the two transverse magnetic field components in the rotated frame using the relationship $$\begin{bmatrix} H_x(t_i) \\ H_y(t_i) \end{bmatrix} = \begin{bmatrix} \cos\tilde{\theta} & \sin\tilde{\theta} \\ -\sin\tilde{\theta} & \cos\tilde{\theta} \end{bmatrix} \begin{bmatrix} B_x(t_i) \\ B_y(t_i) \end{bmatrix}$$

and using the angle $\tilde{\theta}$.

In steps 258-266, the data processing circuitry 46 may determine the relative location of the magnetometer 30 to the rotating magnetic dipole 28. In step 258, the data processing circuitry 46 may calculate the magnetic field maximum amplitudes in any manner. For example, the data processing circuitry 46 may determine the maximum amplitudes from the relationships $H_{xm}$≡max$\{|H_x(t_i)|\}$, $H_{ym}$≡max$\{|H_y(t_i)|\}$, and $B_{zm}$≡max$\{|B_z(t_i)|\}$. Alternatively, the data processing circuitry 46 may fit the region near each extremum of the measured data to a function of the form $F(t) = A + B(T-t)^2$ and determine the maximum amplitudes from the set of values for A for each magnetic field component in the rotated frame.

Based on the calculation of step 258, in step 260, the data processing circuitry 46 may next calculate the distance between the magnetic dipole and the magnetometer with $$\tilde{r} = \sqrt[3]{\frac{\mu_0 M}{4\pi |H_{ym}|}}.$$

In step 262, the data processing circuitry 46 may calculate the magnetometer's z position with $$\tilde{z} = \pm \tilde{r}\sqrt{\frac{2}{3}}\sqrt{1 \pm \frac{1}{2}\left|\frac{H_{xm}}{H_{ym}}\right|},$$

and in step 264, the data processing circuitry 46 may calculate the magnetometer's x position with $$x = \pm \frac{\tilde{r}^2}{3\tilde{z}\sqrt{1 + (\tan\tilde{\theta})^2}}\left|\frac{B_{zm}}{H_{ym}}\right|.$$

The data processing circuitry 46 may finally calculate the magnetometer's y position with y=x tan $\tilde{\theta}$ in step 266.

Based on the above steps 258-266, in step 268, the data processing circuitry 46 may output a relative location report 48 indicating the relative location of the magnetometer 30 to the magnetic dipole 28. Thus, the position of the magnetic dipole 28 in a coordinate system attached to the magnetometer is $(-x, -y, -\tilde{z})$. The information provided by the report 48 may be employed to steer the BHA 18 to drill a desired configuration. For example, the BHA 18 may be steered by the BHA control/MWD interface 50 such that the BHA 18 drills at an approximately constant distance (e.g., 4-6 m) above an existing well containing the magnetometer 30, which may create a SAGD well pair as illustrated in the well-drilling operation 10 of FIG. 1.

The foregoing analysis has focused on forcing $H_x(t)$ to be in-phase with $B_z(t)$ by choosing the proper rotation angle θ. An alternative approach would be to force $H_y(t)$ to be π/2 radians out-of-phase with $B_z(t)$ by the proper choice of the rotation angle θ. Both methods are equivalent and based on the same fundamental concept. Based on the least squares fitting of FIG. 26, the relative location of the magnetometer 30 to the magnetic dipole 28. Equation (33) may be used to compute the angle $\tilde{\theta}$, which gives the direction from the observation point to the z-axis, and where tan $\tilde{\theta}$=y/x can be used to eliminate one unknown quantity. The results are thus tan $\tilde{\theta}$=0.407 and $\tilde{\theta}$=0.386 radians. Next, Equations (35) and (36) may be used to obtain $H_{ox}$=1.45 nanoTesla, and $H_{oy}$=2.07 nanoTesla, and Equation (38) yields $\tilde{r}$=16.90 m with an error $\Delta r = \tilde{r} - r = 0.02$ m, where the "true" value for r was obtained from the initial conditions in the calculation. Finally, Equation (39) yields $\tilde{z}$=−16.03 m with an error $\Delta z = \tilde{z} - z = -0.03$ m, Equation (40) yields x=4.99 m with an error $\Delta x = x - x = -0.01$ m, and Equation (41) yields y=2.03 m with an error $\Delta y = y - y = 0.03$ m.

As described, the entire process may be done without the requirement of human intervention. It can be operated as a closed loop feedback system with human oversight. Various steps in the process, such as computing the corrections and generating the steering correction can of course be done by wellsite personnel in accordance with an exemplary embodiment. However, automated computing may be more efficient. It should be noted that the automated method described above in accordance with an exemplary embodiment may be applied to any pair of wells, and is not limited to SAGD applications.

The two wells may be non-parallel in general, and may even be perpendicular. Furthermore, an exemplary embodiment may be used with the magnetometer 30 deployed on a wireline or coiled tubing string, in addition to being mounted in the BHA 18.

Present embodiments may be more efficient than conventional techniques for magnetic ranging. For example, present embodiments may facilitate efficient determination of the relative location of a magnetometer to a borehole assembly (BHA). Indeed, a rotating magnetic dipole in a BHA may be measured over time from a single remote location. Based on the measurement data from the single remote location, data processing circuitry may determine the remote location. Thus, by refraining from multiple measurement locations, the above-disclosed techniques may conserve rig time. Present embodiments may also facilitate automation of all or a substantial portion of the entire process for determining the position of a BHA from an adjacent well and steering it based on the relative distance to the remote location.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system comprising:
   a three-axis magnetometer configured to determine a set of measurements over a period of time of a time-dependent magnetic field caused by one magnetic source at a single position rotating about an axis, wherein the set of measurements includes one axial component aligned with the axis and two transverse components transverse to the axis, wherein the two transverse components are perpendicular to one another and the measurements are made from a single location of the magnetometer at an observation point; and
   data processing circuitry configured to determine a transverse angle of rotation of the set of measurements, such that one of the two transverse components is in phase with the one axial component when the transverse angle of rotation is used to transform the set of measurements, and to determine a spatial relationship between the magnetic source and the three-axis magnetometer based at least in part on the transverse angle of rotation, wherein two or more bore holes or two or more wells are drilled having the spatial relationship with respect to one another.

2. The system of claim 1, wherein the data processing circuitry is configured to determine sinusoidal functions that fit to the one axial component and the two transverse components.

3. The system of claim 1, wherein the data processing circuitry is configured to determine amplitudes of the one axial component and of the two transverse components in the reference frame rotated transversely by the rotation angle and wherein the data processing circuitry is configured to determine the spatial relationship based at least in part on the determined amplitudes.

4. The system of claim 1, comprising a borehole assembly having the magnetic dipole source, wherein the axis is aligned with an axis of the borehole assembly.

5. The system of claim 4, wherein the magnetic source is a permanent magnet, a solenoid, or any combination thereof.

6. The system of claim 4, comprising control circuitry configured to provide a drilling trajectory to the borehole assembly based at least in part on the spatial relationship between the magnetic dipole source and the three-axis magnetometer.

7. The system of claim 6, wherein the drilling trajectory is configured to cause the borehole assembly to drill the well at an approximately constant distance from the magnetometer.

8. A system comprising:
a memory device having a plurality of routines stored therein;
a processor configured to execute the plurality of routines stored in the memory device, the plurality of routines comprising:
a routine configured to effect, when executed, receiving of a three-component measurement taken at a single position of a magnetometer and made at an observation point by a three-axis magnetometer of a time-dependent magnetic field caused by one magnetic source rotating about an axis at a single position, wherein the three-component measurement includes an axial component aligned with the axis and two transverse components transverse to the axis, and wherein the two transverse components are perpendicular to one another;
a routine configured to effect, when executed, transformation of the three-component measurement by a transverse angle of rotation such that one of the two transverse components is π/2 radians out of phase with the axial component;
a routine configured to effect, when executed, determination of a relative location between the magnetometer and the magnetic source based at least in part on the transverse angle of rotation; and
a routine configured to effect, when executed, outputting of a report indicating the relative location determined from magnetic field measurements made at the observation point and with the single position of the magnetic field source wherein a borehole assembly control or measuring while drilling tool interface steers a drill bit based on the report.

9. The system of claim 8, wherein the plurality of routines comprises a routine configured to effect, when executed, fitting of the three-component measurement to sinusoidal curves.

10. The system of claim 8, wherein two transverse components include a vertical component and a horizontal component and wherein the one of the two transverse components transformed to be π/2 radians out of phase with the axial component is the horizontal component.

11. The system of claim 8, wherein the plurality of routines comprises a routine configured to effect, when executed, determination of amplitudes of the transformed three-component measurement.

12. The system of claim 11, wherein the routine configured to effect determination of the relative location is configured to effect determination of the relative location based at least in part on the determined amplitudes of the transformed three-component measurement.

13. The system of claim 12, wherein the routine configured to effect determination of the relative location is configured to effect determination of the relative location based at least in part on a determination of a distance between the magnetometer and the magnetic source, wherein the distance between the magnetometer and the magnetic source is determined based at least in part on one of the determined amplitudes of the transformed three-component measurement.

14. A method comprising:
generating a time-dependent magnetic field using one magnetic source at a single position rotating about an axis, wherein the magnetic source is located in a first well;
measuring the time-dependent magnetic field using a three-axis magnetometer located in a second well at a single location, wherein the measurements are capable of indicating one axial component aligned with the axis and two transverse components transverse to the axis and are made at an observation point from the single position of the magnetic source, wherein the two transverse components are perpendicular to one another;
determining a transverse angle of rotation that, when used in a transformation of the measurements of the time-dependent magnetic field, causes extrema of one of the transverse components to occur when extrema of the axial component occur;
determining a relative location between the magnetic source and the magnetometer based at least in part on the transverse angle of rotation and determined from magnetic field measurements made at the observation point and with the single position of the magnetic field source; and
drilling a borehole or a producer well having the relative location with respect to an existing borehole or an existing well.

15. The method of claim 14, wherein the transverse angle of rotation is determined such that, when used in the transformation of the measurements of the time-dependent magnetic field, the one of the transverse components aligns with the axial component when the one of the transverse components is multiplied by a scalar quantity.

16. The method of claim 14, wherein the relative location is determined based at least in part on a determination of maximum amplitudes of one axial component and two transverse components of the transformed measurements of the time-dependent magnetic field.

17. The method of claim 16, wherein the maximum amplitudes are determined based on curves fit to maxima of the one axial component and the two transverse components of the transformed measurements of the time-dependent magnetic field.

18. A method comprising:
drilling a new well using a borehole assembly having one magnetic source at a single position, wherein the magnetic source is configured to rotate about the axis of the borehole assembly, wherein the magnetic source is configured to generate a time-dependent magnetic field;
measuring a time-dependent magnetic field using a three-axis magnetometer located in an existing well and at a single location, wherein the measurement of the time-dependent magnetic field includes one axial component aligned with the axis of the borehole assembly and two transverse components transverse to the axis of the borehole assembly, wherein the two transverse components are perpendicular to one another;
determining a relative location of the magnetometer to the magnetic dipole source based at least in part on a transverse angle of rotation that, when used in a transformation of the measurements of the time-dependent magnetic field, causes extrema of one of the transverse components to occur when extrema of the axial component occur;
communicating a drilling trajectory to the borehole assembly based at least in part on the relative location of the magnetometer to the magnetic source wherein the location is determined by the measurements made at an observation point with a single position of the magnetic source; and drilling the new well in a direction and an inclination of the trajectory.

19. The method of claim 18, wherein measuring the time-dependent magnetic field comprises measuring the time-dependent magnetic field from a single location of the magnetometer.

20. The method of claim 18, wherein determining the relative location of the magnetometer to the magnetic source comprises determining maximum amplitudes of the one axial component and two transverse components of the transformed measurements of the time-dependent magnetic field.

* * * * *